(12) United States Patent
Ives-Halperin et al.

(10) Patent No.: US 11,847,590 B2
(45) Date of Patent: Dec. 19, 2023

(54) SHORT-RANGE DEVICE COMMUNICATIONS FOR SECURED RESOURCE ACCESS

(71) Applicant: Live Nation Entertainment, Inc., Beverly Hills, CA (US)

(72) Inventors: Kenneth Ives-Halperin, Los Angeles, CA (US); Harry C. Evans, III, Los Angeles, CA (US); David Johnson, San Marino, CA (US); Scott Wall, Tempe, AZ (US); David Lilly, Tempe, AZ (US); Ajay Pondicherry, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 17/874,195

(22) Filed: Jul. 26, 2022

(65) Prior Publication Data

US 2023/0049718 A1 Feb. 16, 2023

Related U.S. Application Data

(63) Continuation of application No. 16/871,488, filed on May 11, 2020, now Pat. No. 11,397,903, which is a (Continued)

(51) Int. Cl.
*G06Q 10/02* (2012.01)
*H04W 4/80* (2018.01)
(Continued)

(52) U.S. Cl.
CPC ......... *G06Q 10/02* (2013.01); *G06Q 20/3274* (2013.01); *G06Q 20/40145* (2013.01);
(Continued)

(58) Field of Classification Search
CPC .............. G06Q 10/02; G06Q 20/3274; G06Q 20/40145; G06Q 30/0241; H04W 4/80; H04W 12/068; H04W 12/084; H04W 12/041; H04W 12/065; H04W 4/021; G07C 9/29; G07C 9/257; G07C 9/00563; G07C 2009/00412; G07C 2209/08; G07C 2209/12; H04L 63/0492; H04L 63/0861
See application file for complete search history.

(56) References Cited

U.S. PATENT DOCUMENTS 6,182,114 B1 * 1/2001 Yap ..................... G06F 16/9577
707/E17.121
11,140,158 B1 * 10/2021 Adam ................... H04L 63/102
(Continued)

*Primary Examiner* — Chico A Foxx
(74) *Attorney, Agent, or Firm* — MUGHAL GAUDRY & FRANKLIN PC

(57) ABSTRACT

Communications over short-range connections are used to facilitate whether access to resources is to be granted. For example, upon device discovery of one of an electronic user device and an electronic client device by the other device over a Bluetooth Low Energy connection, an access-enabling code associated with a user device or account can be evaluated for validity and applicability with respect to one or more particular resource specifications. User identity can be verified by comparing the user against previously obtained biometric information.

15 Claims, 28 Drawing Sheets

Related U.S. Application Data continuation of application No. 16/017,150, filed on Jun. 25, 2018, now Pat. No. 10,650,625, which is a continuation of application No. 14/950,758, filed on Nov. 24, 2015, now Pat. No. 10,008,057, which is a continuation-in-part of application No. 14/592,590, filed on Jan. 8, 2015, now Pat. No. 9,489,787.

(60) Provisional application No. 62/095,597, filed on Dec. 22, 2014, provisional application No. 62/035,096, filed on Aug. 8, 2014.

(51) Int. Cl.
| | | |
|---|---|---|
| *G06Q 20/32* | (2012.01) | |
| *G06Q 30/02* | (2023.01) | |
| *H04L 9/40* | (2022.01) | |
| *H04W 4/021* | (2018.01) | |
| *G07C 9/00* | (2020.01) | |
| *G06Q 20/40* | (2012.01) | |
| *G07C 9/29* | (2020.01) | |
| *G07C 9/25* | (2020.01) | |
| *H04W 12/041* | (2021.01) | |
| *H04W 12/065* | (2021.01) | |
| *H04W 12/06* | (2021.01) | |
| *H04W 12/084* | (2021.01) | |
| *G06Q 30/0241* | (2023.01) | |

(52) U.S. Cl.
CPC ..... *G06Q 30/0241* (2013.01); *G07C 9/00563* (2013.01); *G07C 9/257* (2020.01); *G07C 9/29* (2020.01); *H04L 63/0492* (2013.01); *H04L 63/0861* (2013.01); *H04W 4/021* (2013.01); *H04W 4/80* (2018.02); *H04W 12/041* (2021.01); *H04W 12/065* (2021.01); *H04W 12/068* (2021.01); *H04W 12/084* (2021.01); *G07C 2009/00412* (2013.01); *G07C 2209/08* (2013.01); *G07C 2209/12* (2013.01)

(56) References Cited

U.S. PATENT DOCUMENTS

| | | | | |
|---|---|---|---|---|
| 2002/0010603 | A1* | 1/2002 | Doi | G06Q 30/0235 340/5.2 |
| 2013/0121541 | A1* | 5/2013 | Hwang | H04L 63/0861 382/118 |
| 2014/0095227 | A1* | 4/2014 | Parker | G07B 15/00 705/5 |
| 2015/0084741 | A1* | 3/2015 | Bergdale | G07C 9/29 340/5.61 |
| 2015/0193701 | A1* | 7/2015 | Sohn | G06Q 10/02 705/5 |
| 2015/0193702 | A1* | 7/2015 | Grbavac | G06Q 10/02 705/51 |
| 2016/0055428 | A1* | 2/2016 | Raina | H04W 4/33 705/5 |
| 2016/0180326 | A1* | 6/2016 | Gray | G06Q 20/047 705/23 |
| 2017/0346817 | A1* | 11/2017 | Gordon | G06V 40/10 |
| 2019/0392660 | A1* | 12/2019 | Eichenblatt | G07C 9/00309 |
| 2021/0074107 | A1* | 3/2021 | Eichenblatt | G06Q 20/4014 |

\* cited by examiner

SHORT-RANGE DEVICE COMMUNICATIONS FOR SECURED RESOURCE ACCESS

CROSS-REFERENCE TO RELATED APPLICATIONS

This application is a continuation of U.S. application Ser. No. 16/871,488, filed May 11, 2020, which is a continuation of U.S. application Ser. No. 16/017,150, filed on Jun. 25, 2018, now U.S. Pat. No. 10,650,625, issued on May 12, 2020, which is a continuation of U.S. application Ser. No. 14/950,758, filed on Nov. 24, 2015, now U.S. Pat. No. 10,008,057, issued on Jun. 26, 2018, which is a continuation in part of U.S. application Ser. No. 14/592,590, filed on Jan. 8, 2015, now U.S. Pat. No. 9,489,787, issued on Nov. 8, 2016, which claims priority to U.S. Provisional Application 62/095,597, filed on Dec. 22, 2014 and U.S. Provisional Application 62/035,096, filed on Aug. 8, 2014, the disclosures of each of which are hereby incorporated by reference in their entirety for all purposes.

FIELD

The present disclosure relates to short-range device communications and resource access, and in particular, to methods and systems for using short-range communications to facilitate validation analyses of resource access requests.

BACKGROUND

Electronic devices can communicate with each other using a variety of types of networks. For example, devices can communicate over a cellular network, Wi-Fi or a local area network. One other category of connections is short-range connections. For example, devices can communicate using a Bluetooth or Bluetooth Low Energy connection, a Radio Frequency Identification Connection or a Near Field Communication Connection. Short-range communications can facilitate communications with reduced reliance on external network connections and/or large power supplies. They can further facilitate discovery of nearby devices of interest without relying on previous information about such devices.

SUMMARY

Described herein are methods and related devices for selectively granting access to resources to authorized users based communication exchanges between devices, such as user devices and client devices. The methods and devices described herein advantageously make use of short-range communications to allow devices to exchange data with one another and facilitate access or denial of access to users associated with devices based on the exchanged data. In some embodiments, biometric data of users associated with particular devices are obtained, stored, and retrieved by various devices, such as to prevent another user, lacking the authorized user's biometrics, from using a device obtained from an authorized user for access to a restricted resource, such as a facility, geographic location, or other resource.

In a first aspect, an electronic user device is provided. In an embodiment, an electronic user device of this aspect includes one or more transceivers for receiving signals. Optionally, a transceiver of the one or more transceivers can be configured to receive signals transmitted over a short-range connection. The electronic user device can further include a communication engine that detects a first wireless signal having been transmitted over a short-range connection by an electronic client device and having been received by the one or more transceivers at the electronic user device. Optionally, the electronic user device can include an access-right detection engine that, in response to the detection of the first wireless signal having been transmitted over the short-range connection from the electronic client device, identifies a specification of a limited-access resource; and that facilitates a query of a data store using the specification of the limited-access resource for an access-enabling code. The electronic user device can also further include an access-right evaluation engine that generates a second wireless signal to be transmitted by the one or more transceivers. The second wireless signal can include a request for stimulus data; and the access-enabling code. The electronic user device can optionally include an interface engine that detects the stimulus data having been included in a third wireless signal received by the one or more transceivers; and that facilitates a presentation of a visual stimulus that corresponds to the stimulus data.

Optionally, biometric credentials can be obtained from an authorized user and, in real-time, stored in an electronic user device that is to be assigned to or otherwise provided to the authorized user. These biometric credentials can be useful for preventing unauthorized users from using a user device assigned to another authorized user. For example, an electronic user device optionally comprises one or more transceivers for receiving and transmitting wireless signals, such as over a short-range connection; an electronic data store for storage of user device data; and a communication engine that detects a first wireless signal having been transmitted over a short-range connection by an electronic client device and having been received by the one or more transceivers at the electronic user device, in response to the detection of the first wireless signal having been transmitted over the short-range connection from the electronic client device, facilitates transmission of a second wireless signal over the short range connection using the one or more transceivers, such as a second wireless signal that includes an identifier associated with the electronic user device, detects a third wireless signal having been transmitted over the short-range connection by the electronic client device and having been received by the one or more transceivers at the electronic user device, such as a third wireless signal that includes a biometric credential of an authorized user associated with the electronic user device, and facilitates storage of the biometric credential in the electronic data store.

Optionally, the electronic user device may be probed to provide the stored biometric credential on demand, such that a user possessing the electronic user device may be compared against the stored biometric credential. In this way, enhanced security can be provided. For example, the communication engine of a user device of this aspect may optionally further detect a fourth wireless signal having been transmitted over the second short-range connection by the second electronic client device and having been received by the one or more transceivers at the electronic user device, such as a fourth wireless signal that includes a biometric credential request, facilitate retrieval of the biometric credential stored in the electronic data store, and facilitate transmission of a seventh wireless signal over the second short range connection using the one or more transceivers, such as a fifth wireless signal that includes the biometric credential.

Optionally, electronic user devices can be provided with access-enabling codes that are encrypted or otherwise broken into multiple portions such that additional information is needed to convert the access-enabling code into a usable form. For example, in an embodiment, an electronic client device comprises one or more transceivers for receiving and transmitting wireless signals, such as over a short-range connection; an electronic data store for storage of user device data; a communication engine that detects a first wireless signal having been transmitted over a short-range connection by an electronic client device and having been received by the one or more transceivers at the electronic user device, in response to the detection of the first wireless signal having been transmitted over the short-range connection from the electronic client device, facilitates transmission of a second wireless signal over the short range connection using the one or more transceivers, such as a second wireless signal that includes an identifier associated with the electronic user device, detects a third wireless signal having been transmitted over the short-range connection by the electronic client device and having been received by the one or more transceivers at the electronic user device, such as a third wireless signal that includes an encrypted access-enabling code, and facilitates storage of the encrypted access-enabling code in the electronic data store; an input device for receiving input providing a decryption key; and a decoding engine that facilitates retrieval of the encrypted access-enabling code from the electronic data store and decrypts the encrypted access-enabling code using the decryption key to generate a decrypted access-enabling code.

It will be appreciated that encryption and decryption may be performed by one or more devices, such as a client device and/or a user device, depending on the particular configuration. For example, a user device may perform a decryption provided that it first obtains encrypted data and a suitable encryption key. Similarly, a client device may perform an encryption to generate encrypted data using a decryption key. For example, a client device may perform a decryption provided that it first obtains encrypted data and a suitable encryption key. Similarly, a client device may perform an encryption to generate encrypted data using a decryption key. In some embodiments, a decryption key is tied to a single user device or user account such that other user devices or accounts may be unable to make use of the decryption key. The skilled artisan will appreciate that a variety of techniques may be used to prevent use of a decryption key, such as by making use of salt data when generating the decryption key, where the salt data is known only to a limited number of devices. Other implementations are possible.

It will be appreciated that the decryption keys and processes described herein may make use of a time-based decryption key, such as a decryption key that includes a time-based component and/or is a time-based decryption key. For example, a time-based decryption key may only be useful for decrypting an encrypted access-enabling code during a particular time period. Optionally, a decryption key may be generated by use of a time-based component, such as a rotating-time based salt. Such a process may be useful for limiting use of a time-based decryption key for decryption during one or more time windows, otherwise, for example, a different or new decryption key is needed.

It will also be appreciated that various other limitations may be placed on use of a decryption key, an encryption process, a decryption process, a transmission process and/or a receive process. For example, in one embodiment, an encoding engine, a decoding engine and/or a communication engine may further identify one or more limits, such as one or more encryption limits, one or more decryption limits or one or more communication limits, and further confirm that the one or more limits are satisfied before moving forward with an encryption process, a decryption process, a transmission process and/or a receive process. For example, useful limits that may be put into place include time-based limits, such that encryption, decryption, transmission and/or receiving may only take place during pre-determined time windows, location-based limits, such that encryption, decryption, transmission and/or receiving may only take place when a device is located at or within detection range of one or more predetermined locations. For example, a limit may include a date and/or time and if this date and/or time limit is not satisfied (i.e., a current time falls outside of a time window specified by the date and/or time limit), then a process may not be performed. To the contrary, however, in some embodiments, if a current time falls within the time window specified by the date and/or time limit, a process may be performed. As another example, for a location-based decryption limit, a global position system (GPS) location of a device may be obtained and used in a decision process for determining whether to perform one or more processes, such as to obtain a decryption key and/or proceed with a decryption process. Alternatively or additionally, location specific signals that may only be received in proximity to a particular location, such as a Bluetooth beacon or a code or code sequence displayed only at the particular location, may be used to determine whether a location-based limit is satisfied.

Optionally, electronic user devices can obtain the biometric credentials for authorized users themselves, such as fingerprints or facial photographs, etc., rather than having the biometric credentials obtained from an electronic client device. In various embodiments, however, the biometric credentials can be sent to an electronic client device for encryption and/or storage and returned, optionally in encrypted form, to the electronic user device for later decryption and/or presentation. For example, an electronic user device may optionally comprise one or more transceivers for receiving and transmitting wireless signals, such as over a short-range connection; an electronic data store for storage of user data; one or more biometric capture devices, such as for obtaining a biometric credential from an authorized user associated with the electronic user device; a communication engine that detects a first wireless signal having been transmitted over a short-range connection by an electronic client device and having been received by the one or more transceivers at the electronic user device, in response to the detection of the first wireless signal having been transmitted over the short-range connection from the electronic client device, facilitates transmission of a second wireless signal over the short range connection using the one or more transceivers, such as a second wireless signal that includes an identifier associated with the electronic user device, detects a third wireless signal having been transmitted over the short-range connection by the electronic client device and having been received by the one or more transceivers at the electronic user device, such as a third wireless signal that includes a biometric credential request, facilitates transmission of a fourth wireless signal over the short range connection using the one or more transceivers, such as a fourth wireless that signal includes the biometric credential, detects a fifth wireless signal having been transmitted over the short-range connection by the electronic client device and having been received by the one or more transceivers at the electronic user device, such as a wireless signal that includes an encrypted biometric credential, and facilitates storage of the encrypted biometric credential in the electronic data store; an input device configured to receive input providing a decryption key, such as a user interface, one of the one or more transceivers, a camera, etc., and a decoding engine that facilitates retrieval of the encrypted biometric credential from the electronic data store, and decrypts the encrypted biometric credential using the decryption key to generate a decrypted biometric credential; and an interface engine that facilitates a presentation of the decrypted biometric credential.

Optionally, input may be provided using a variety of different input devices. For example, useful input devices include but are not limited to, wireless transceivers, such as Bluetooth, RFID, NFC, and other radio transceivers, human interface devices, such as keyboards, touchscreen interfaces, pointing devices, joysticks, mice, cameras, etc. Optionally, input may be received by obtaining one or more images using a camera, such as an image including a computer readable code. Optionally, the computer readable code may be imperceptible to a human and may be provided, for example, as a digital watermark or graphical noise. Optionally, input may be provided as a sequence of images, such as multiple frames of a video or non-static image. Optionally, the input may be overlayed or otherwise encoded into a live video stream such as a video stream that includes a first digital watermark and a second overlayed digital watermark that loops such that both the first digital watermark and the second digital watermark are used to require that the second digital watermark be presented in a live video stream and not a recording.

Optionally, the electronic user device can use a public/private key combination for encryption and decryption of the biometric credential. In this way, information received from or transmitted to an electronic user device can be authenticated and/or protected. For example, optionally, an electronic user device comprises one or more transceivers for receiving and transmitting wireless signals, such as over a short-range connection; an electronic data store for storage of user data, such as including a public key and a private key; one or more biometric capture devices, such as configured to obtain a biometric credential from an authorized user associated with the electronic user device; a communication engine that detects a first wireless signal having been transmitted over a short-range connection by an electronic client device and having been received by the one or more transceivers at the electronic user device, in response to the detection of the first wireless signal having been transmitted over the short-range connection from the electronic client device, facilitates transmission of a second wireless signal over the short range connection using the one or more transceivers, such as a second wireless signal that includes an identifier associated with the electronic user device, detects a third wireless signal having been transmitted over the short-range connection by the electronic client device and having been received by the one or more transceivers at the electronic user device, such as a third wireless signal that includes a biometric credential request and a public key request, facilitates transmission of a fourth wireless signal over the short range connection using the one or more transceivers, such as a fourth wireless signal that includes the biometric credential and the public key, detects a fifth wireless signal having been transmitted over the short-range connection by the electronic client device and having been received by the one or more transceivers at the electronic user device, such as a fifth wireless signal that includes an encrypted biometric credential, wherein the encrypted biometric credential is encrypted using the public key, and facilitates storage of the encrypted biometric credential in the electronic data store; a decoding engine that facilitates retrieval of the encrypted biometric credential from the electronic data store, and decrypts the encrypted biometric credential using the private key to generate a decrypted biometric credential; and an interface engine that facilitates a presentation of the decrypted biometric credential.

In another aspect, electronic client devices are provided. Optionally, electronic client devices are useful for communicating with and verifying electronic user devices and information received from electronic user devices to ensure appropriate access is provided to users possessing or otherwise associated with the electronic user devices. In various embodiments, electronic client devices may include, for example, any of the components or aspects of the electronic user devices described above and may communicate with one another and/or be included in a larger system that includes multiple electronic client devices, including electronic client devices that are identical and/or not identical. Such a multi-electronic client device system may itself be referred to herein as an electronic client device.

Optionally, electronic client devices may be useful for obtaining biometric credentials, which may be transmitted to and stored by an electronic user device, and may be associated with electronic user device identifiers, access-enabling codes assigned to an authorized user associated with the electronic user device, and/or authorized users. For example, an electronic client device may comprise one or more transceivers for receiving and transmitting wireless signals, such as over a short-range connection; one or more biometric capture devices, such as a biometric capture device that obtains a biometric credential from an authorized user associated with an electronic user device; a communication engine that detects a first wireless signal having been transmitted over a short-range connection by the electronic user device and having been received by the one or more transceivers, such as a first wireless signal that includes an identifier or unique identifier associated with the electronic user device, such as a device identifier, a user identifier, an access-enabling code, or the like, and facilitates transmission of a second wireless signal over the short range connection using the one or more transceivers, such as a second wireless signal that includes the biometric credential; and an access-right determination engine that identifies a specification of a limited-access resource using the identifier associated with the electronic user device, facilitates determination of an access-enabling code using the specification of the limited-access resource, and facilitates association of the access-enabling code, the biometric credential, or both the access-enabling code and the biometric credential with the identifier associated with the electronic user device. Optionally, one or more of the access-enabling code and the biometric credential may be transmitted for receipt and/or storage by an electronic user device.

Optionally, electronic client devices may be useful for querying electronic user devices for electronic copies of biometric credentials for direct comparison with a user possessing the electronic user device or comparison with biometric credentials obtained in real-time from the user. For example, an electronic client device of this aspect may comprise one or more transceivers for receiving and transmitting wireless signals, such as over a short-range connection; a communication engine that detects a first wireless signal having been transmitted over a short-range connection by an electronic user device and having been received by the one or more transceivers, such as a first wireless signal that includes an identifier associated with the electronic user device, facilitates transmission of a second wireless signal over the short range connection using the one or more transceivers, such as a second wireless signal that includes a biometric credential request, and detects a third wireless signal having been transmitted over the short-range connection by the electronic user device in response to the second wireless signal and having been received by the one or more transceivers, such as a third wireless signal that includes a biometric credential; an access-right evaluation engine that facilitates a query of a data store for an access-enabling code of an authorized user associated with the electronic user device, and generates a stimulus data relating to results of the query for the access-enabling code; and an interface engine that generates a presentation of a visual stimulus that corresponds to the stimulus data, and facilitates verification of the biometric credential. For example, verification of the biometric credential may include transmitting or displaying the biometric credential or otherwise allowing comparison of the biometric credential with the user or with a biometric credential obtained from the user at the time of verification, for example by a computer or a client agent.

Electronic user devices of this aspect are further optionally useful for providing access-enabling codes in multiple parts, such as a first part that is immediately provided to an authorized user or an electronic user device associated with the authorized user and a second part that is later provided to the user or electronic user device upon or before accessing or attempting to access a resource. For example, an electronic client device may comprise one or more transceivers for receiving and transmitting wireless signals, such as over a short-range connection; a communication engine that detects a first wireless signal having been transmitted over a short-range connection by the electronic user device and having been received by the one or more transceivers, such as a first wireless signal that includes an identifier associated with the electronic user device; an access-right determination engine that identifies a specification of a limited-access resource using the identifier associated with the electronic user device; facilitates determination of an access-enabling code using the specification of the limited-access resource; and an encoding engine for encrypting the access-enabling code using an encryption key to generate an encrypted access-enabling code. Optionally, the communication engine further facilitates transmission of a second wireless signal over the short range connection to the electronic user device, such as a second wireless signal that includes the encrypted access-enabling code.

In some embodiments, electronic client devices of this aspect may also be useful for matching a biometric credential to a user based on the user's location. For example, an electronic client device may obtain photographic images of all users and may use location determination techniques to identify the location of an electronic user device and match the photographic image of the user possessing the electronic user device based on the user device location. Optionally, for example, an electronic client device may comprise one or more transceivers for receiving and transmitting wireless signals, such as over a short-range connection; a location-determination engine that: detects one or more wireless signals having been transmitted over a short-range connection by an electronic user device and having been received by a plurality of the one or more transceivers, such as one or more wireless signals that include an identifier associated with the electronic user device; determines a physical location of the electronic user device based on detection of the one or more wireless signals. Optionally, the location-determination engine determines a time at which the electronic user device was located at the physical location based on detection of the one or more wireless signals. Optionally, an electronic client device may further comprise a camera for obtaining images of authorized users. Optionally, an electronic client device may further comprise an image-location matching engine that identifies an image of an authorized user associated with the physical location and, optionally, the time determined by the location-determination engine. Optionally, an electronic client device may further comprise an access-right determination engine that identifies a specification of a limited-access resource using the identifier associated with the electronic user device; facilitates determination of an access-enabling code using the specification of the limited-access resource; and facilitates association of the access-enabling code, the image of the authorized user, or both the access-enabling code and the image of the authorized user with the identifier associated with the electronic user device.

As described above, in some embodiments, electronic user devices may include hardware for obtaining biometric credentials, allowing users to obtain their own biometrics for later use by an electronic client device, such as for identity verification, for encryption purposes, for associating with electronic user devices, etc. These electronic user device obtained biometric credentials may be provided to electronic client devices, such as for security or verification purposes. For example, an electronic client device may comprise one or more transceivers for receiving and transmitting wireless signals, such as over a short-range connection; a communication engine that detects a first wireless signal having been transmitted over a short-range connection by an electronic user device and having been received by the one or more transceivers at the electronic client device, such as a first wireless signal that includes an identifier associated with the user device, facilitates transmission of a second wireless signal over the short range connection using the one or more transceivers, such as a second wireless signal that includes a biometric credential request, detects a third wireless signal having been transmitted over the short-range connection by the electronic user device and having been received by the one or more transceivers at the electronic client device, such as a third wireless signal that includes a biometric credential; and an encoding engine that encrypts the biometric credential using an encryption key to generate an encrypted biometric credential. Optionally, the communication engine further facilitates transmission of a fourth wireless signal over the short range connection using the one or more transceivers, such as a fourth wireless signal that includes the encrypted biometric credential.

In some embodiments, instead of using a key provided by an electronic client device, a user's public/private key combination may be used for encryption/decryption of a biometric credential. For example, an electronic client device optionally comprises one or more transceivers for receiving and transmitting wireless signals, such as over a short-range connection; a communication engine that detects a first wireless signal having been transmitted over a short-range connection by an electronic user device and having been received by the one or more transceivers at the electronic client device, such as a first wireless signal that includes an identifier associated with the user device, facilitates transmission of a second wireless signal over the short range connection using the one or more transceivers, such as a second wireless signal that includes a biometric credential request and a public key request, detects a third wireless signal having been transmitted over the short-range connection by the electronic user device and having been received by the one or more transceivers at the electronic client device, such as a third wireless signal that includes a biometric credential and a public key; and an encoding engine that encrypts the biometric credential using the public key to generated an encrypted biometric credential. Optionally, the communication engine further facilitates transmission of a fourth wireless signal over the short range connection using the one or more transceivers, such as a fourth wireless signal that includes the encrypted biometric credential.

In some embodiments, values associated with an authorized user or an electronic user device may be modified, such as by an electronic client device or a client agent, for example. In this way, information about an authorized user may be changed, allowing tracking of the authorized user or providing additional permissions or flexibility to the authorized user. Optionally, the user may be compared against biometric credentials stored by an electronic client device or an electronic user device in advance of modification of a value associated with an authorized user, such as to provide enhanced security. For example, an electronic client device may comprise one or more transceivers for receiving and transmitting wireless signals, such as over a short-range connection; a communication engine that detects a first wireless signal having been transmitted over a short-range connection by an electronic user device and having been received by the one or more transceivers, such as a first wireless signal includes an identifier associated with the electronic user device, facilitates transmission of a second wireless signal over the short range connection using the one or more transceivers, such as a second wireless signal that includes a biometric credential request, and detects a third wireless signal having been transmitted over the short-range connection by the electronic user device in response to the second wireless signal and having been received by the one or more transceivers, such as a third wireless signal that includes a biometric credential; an interface engine that facilitates verification of the biometric credential; and an access-right evaluation engine that facilitates a query of a data store for an access-enabling code of an authorized user associated with the electronic user device, generates a first stimulus data relating to results of the query for the access-enabling code, facilitates modification of a value associated with the access-enabling code, the identifier associated with the electronic user device, or the biometric credential, and generates a second stimulus data relating to the value or the modification of the value. Optionally, the interface engine further generates a presentation of a visual stimulus that corresponds to the first stimulus data or the second stimulus data. Presentation of the visual stimulus may, for example, allow a client agent to confirm the verification of a user against the biometric credential as a further step to prevent unauthorized access.

Optionally, various values associated with an authorized user, authorized user's account, or electronic user device may be modified using the above described devices. For example, useful values include, but are not limited to a query count for the access-enabling code, a number of successful queries for the access-enabling code, a monetary value belonging to or otherwise associated with an authorized user, a number of unsuccessful queries for the access-enabling code, a time stamp for the query of the access-enabling code, a number of successful verifications of the biometric credential, a number of unsuccessful verifications of the biometric credential, a location of use of the access-enabling code, and the like, including any combinations of these.

In another aspect, computer-implemented methods for facilitating selective granting of resource access to authorized users based on short-range communication exchanges are provided. For example, methods of this aspect may correspond to techniques performed by the electronic user device and electronic client devices described above. In various embodiments, the methods of this aspect are useful for controlling access to resources in a way that prevents unauthorized users from accessing the resources or from allowing an authorized user's credentials from being used by another.

Optionally, a first wireless signal transmitted over a short-range connection from an electronic client device can be detected at an electronic user device. In response to the detecting, a specification of a limited-access resource can be identified. A query of a data store using the specification of the limited-access resource for an access-enabling code can optionally be facilitated. A second wireless signal that includes a request for stimulus data and the access-enabling code can further be transmitted by the electronic user device. A third wireless signal can be received at the electronic user device that includes the stimulus data. Advantageously, a presentation of a visual stimulus that corresponds to the stimulus data can be further facilitated.

Optionally, a first wireless signal can be received at an electronic client device from a first electronic user device. The first wireless signal can include a first request for stimulus data and a first access-enabling code. First stimulus data can be identified. A second wireless signal that includes the first stimulus data can be transmitted from the electronic client device and to the first electronic user device. A first presentation at the electronic client device of a first visual stimulus that corresponds to the first visual stimulus data can be facilitated. A third wireless signal can be received at the electronic client device and from a second electronic user device. The third wireless signal can include a second request for stimulus data and a second access-enabling code. Second stimulus data can be identified. A fourth wireless signal that includes the second stimulus data can be transmitted from the electronic client device and to the second electronic user device. A second presentation at the electronic client device of a second visual stimulus that corresponds to the second visual stimulus data can be facilitated.

Alternatively or in addition, a computer-implemented method of this aspect for facilitating selective granting of resource access to authorized users based on short-range communication exchanges comprises detecting, such as at an electronic user device, a first wireless signal transmitted over a short-range connection; in response to the detecting, transmitting a second wireless signal over the short-range connection, such as a second wireless signal that includes an identifier associated with the electronic user device; detecting a third wireless signal transmitted over the short-range connection, such as a third wireless signal that includes a biometric credential of an authorized user associated with the electronic user device; storing the biometric credential in an electronic data store of the electronic user device; detecting a fourth wireless signal transmitted over the short-range connection, such as a fourth wireless signal that includes a biometric credential request; retrieving the biometric credential from the electronic data store; and facilitating a presentation of the biometric credential.

Optionally, a method of this aspect for facilitating selective granting of resource access to authorized users based on short-range communication exchanges comprises detecting, such as at an electronic user device, a first wireless signal transmitted over a short-range connection; in response to the detecting, transmitting a second wireless signal over the short-range connection, such as a second wireless signal that includes an identifier associated with the electronic user device; detecting a third wireless signal transmitted over the short-range connection, such as a third wireless signal that includes an encrypted access-enabling code; storing the access-enabling code in an electronic data store of the electronic user device; receiving input corresponding to a determination of a decryption key; retrieving the encrypted access-enabling code from the electronic data store; decrypting the encrypted access-enabling code to generate a decrypted access-enabling code; and facilitating a presentation of the decrypted access-enabling code.

Optionally, a computer-implemented method of this aspect for facilitating selective granting of resource access to authorized users based on short-range communication exchanges comprises obtaining, such as by an electronic client device, a biometric credential from an authorized user associated with an electronic user device, such as where obtaining includes using a biometric capture device; detecting a first wireless signal transmitted over a short-range connection, such as a first wireless signal that includes an identifier associated with the electronic user device; transmitting a second wireless signal over the short-range connection, such as a second wireless signal that includes the biometric credential; in response to the detecting, identifying a specification of a limited-access resource using the identifier associated with the electronic user device; identifying a specification of a limited-access resource using the identifier associated with the electronic user device; querying a data store using the specification of the limited-access resource for an access-enabling code; and associating the access-enabling code, the biometric credential, or both the access-enabling code and the biometric credential with the identifier associated with the electronic user device.

Optionally, a computer-implemented method of this aspect for facilitating selective granting of resource access to authorized users based on short-range communication exchanges comprises detecting, for example at an electronic client device, a first wireless signal transmitted over a short-range connection, such as a first wireless signal that includes an identifier associated with an electronic user device; transmitting a second wireless signal over the short-range connection, such as a second wireless signal that includes a biometric credential request; detecting a third wireless signal transmitted over the short-range connection, such as a third wireless signal that includes a biometric credential; in response to the detecting, identifying a specification of a limited-access resource using the identifier associated with the electronic user device; facilitating a query of a data store for an access-enabling code of an authorized user associated with the electronic user device; generating a stimulus relating to results of the query; generating a presentation of a visual stimulus that corresponds to the stimulus data; and facilitating verification of the biometric credential.

Optionally, a computer-implemented method of this aspect for facilitating selective granting of resource access to authorized users based on short-range communication exchanges comprises detecting, for example at an electronic client device, a first wireless signal transmitted over a short-range connection, such as a first wireless signal that includes an identifier associated with an electronic user device; in response to the detecting, identifying a specification of a limited-access resource using the identifier associated with the electronic user device; querying a data store using the specification of the limited-access resource for an access-enabling code; encrypting the access-enabling code using an encryption key to generate an encrypted access-enabling code; transmitting a second wireless signal over the short-range connection, such as a second wireless signal that includes the encrypted access-enabling code; facilitating presentation of a decryption key, such as a decryption key for decrypting the encrypted access-enabling code.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
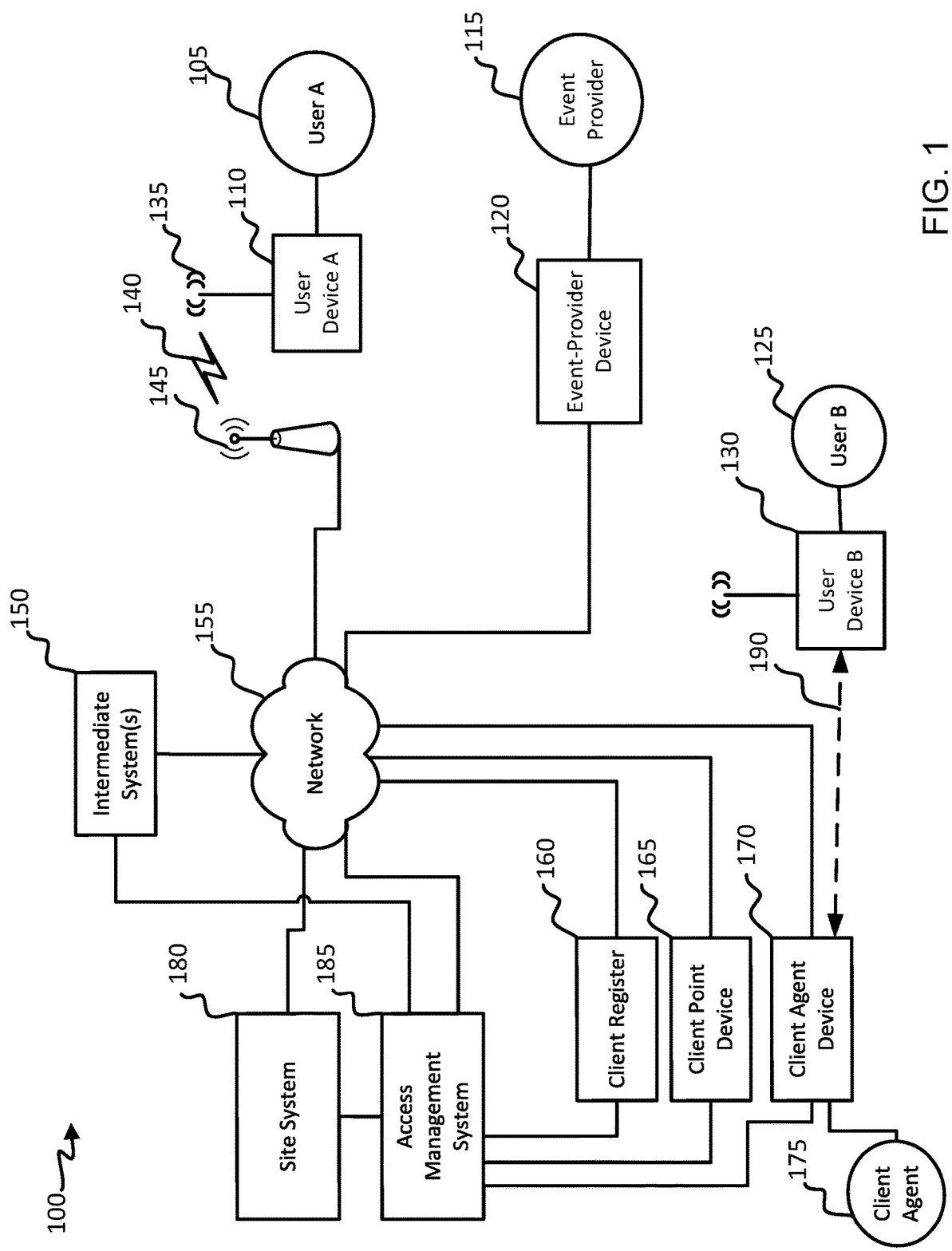
FIG. 1 depicts a block diagram of an embodiment of a resource access-facilitating interaction system.

Referring first to FIG. 1, a block diagram of an embodiment of a resource access-facilitating interaction system 100 is illustrated. User Device A 110 (which can be operated by a User A 105) and an event-provider device 120 (which can be operated, controlled, or used by an event provider 115) can communicate with an access management system 185 directly or via another system (e.g., via an intermediate system 150). User Device A may transmit data to access point 145, which is connected to network 155, over communication channel 140 using antennae 135. While FIG. 1 illustrates User Device A 110 communicating with access point 145 using a wireless connection (e.g., communication channel 140), in some embodiments, User Device A 110 may also communicate with access point 145 using a wired connection (e.g., an Ethernet connection). User Device A 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource access-facilitating interaction system 100 can be extended to include multiple of any given system(s), device(s), entity(ies), and/or networks.

Access management system 185 can be configured to manage a set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Thus, for a given resource, a plurality of access rights can be allocated. Each of the plurality of access rights can be configured to be assigned to a user or user device. Upon a presentation of an access-enabling code or other feature corresponding to the access right, a validity of the code or feature can be assessed to confirm that the access right was allocated and assigned (e.g., to a particular user or user device). Determining that the code or feature is valid can indicate that the user is to be permitted to access the resource. In some instances, an access characteristic of the access permitted by each access right in the plurality of access rights is unique across the plurality of access rights. For example, each access right can be configured to permit that an assigned user occupy a particular position while accessing the resource, and the particular positions can be unique across the plurality of access rights for a given resource.

Notifications of available access rights can be accompanied by options to request that one or more access rights be assigned to a user. Therefore, User A 105 can provide input to User Device A 110 via an interface to request such assignment and provide other pertinent information.

A request can be associated with one or more constraints, which may be specified via user input and/or identified based on a context in which a request was received (e.g., an access-right characteristic represented in a notification presented at a time or before (e.g., immediately before) request input was received. A constraint can identify a value or a range (e.g., a closed range or open-ended range) of a value of each of one or more characteristics of access rights. For example, a constraint can include a spatial constraint (e.g., identifying one or more sections or zones), a time constraint (e.g., identifying a date), or a price constraint. In some instances, a request includes one for access to a particular resource. In some instances, a request includes one including one or more constraints for selecting a resource (e.g., a resource location, involved entity, etc.). A request communication can be generated and transmitted from User Device A 110 to intermediate system 150 and/or access management system 185. The request communication can identify a resource and/or one or more constraints. The request communication can correspond to an indication that access-right identifications are being requested.

Intermediate system 150 and/or access management system 185 can process the request to query a data store to identify one or more access rights that correspond to the request. For example, each access right allocated for a resource can be associated with one or more characteristics (e.g., specifying an access time, access location, access level, and/or price). The query can identify a query result that identifies access rights associated with characteristics that match and/or are within a range of each of one or more constraints of a request.

Part of all of the query result can be identified within a request response. A notification can be generated, transmitted to and/or presented at a user device that identifies access rights (and/or characteristics thereof) in the request response. In some instances, intermediate system 150 and/or access management system 185 facilitate placing the identified access rights on hold for a defined (absolute, relative and/or functional) time period. In some instances, a hold need not be initiated.

In some instances, one or more communications can be exchanged between User Device A 110 and intermediate system 150 and/or access management system 185. Such communications can, for example, identify an incomplete subset of access rights identified in a notification requested for assignment, identify types of required information, identify values of required information, authorize payment, and so on. Upon receiving (e.g., and, in some instances, verifying) required information, intermediate system 150 and/or access management system 185 can assign one or more access rights to the user.

In some instances, however, User Device A 110 is a passive device and cannot receive input directly from a user. Optionally, access rights may be selected or requested by intermediate system 150, client agent device 170, client register 160 or client point device 165 and assigned to the user. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at User Device A 110 confirming the assignment and/or including data required for corresponding access to be permitted. Optionally, an identifier of a user may correspond to an identifier of the user device.

In some instances, a resource is at least partly controlled, offered or availed by a client. The resource may be offered or accessed at a particular location or structure, and a variety of client devices may be present at the location so as to facilitate usage of an access right and other offerings. Exemplary client devices can include client agent device 170, which can be one operated by a client agent (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances, client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, User Device A 105 performs particular functions upon detecting a client device and/or the contrary. For example, User Device A 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as User Device A 110.

In some instances, User A 105 can use multiple user devices to perform various operations (e.g., using one device to request an access right and another to interact with client devices). Some instances of User Device A 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store may include a list of identifiers for each user or user device having an assigned access right for a resource or associating an identifier for each user or user device with an identifier of a particular access right. In some instances, an indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to an intermediate systems 150 (e.g., upon payment of a fee or upon acceptance of terms to conditionally pay a fee). Intermediate system 150 can then collect data pertaining to the assigned access rights and/or a corresponding event, can format and/or edit the data, generate a notification of availability of the access rights that includes the formatted and/or edited data and facilitate presentation of the notification at a User Device A 110. When intermediate system 150 receives a communication from the User Device A 110 indicative of an access-right request, intermediate system 150 can facilitate assignment (or reassignment) of an access right to the user (e.g., by transmitting relevant information to access management system 185 identifying the user and/or user device and/or by transmitting relevant information to User Device A 110 pertaining to the access right).

A resource can include one managed or provided by a client, such as a performing entity or an entity operating a venue. A User Device A 110 can transmit data corresponding to the access right (e.g., an access-enabling code) to a client device upon, for example, detecting the client device, detecting that a location of the User Device A 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event or location can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on User Device A 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a cellular network, a private network, such as an intranet, extranet, or other backbone. In some instances, a network in the one or more networks 155 includes a short-range communication channel, such as Bluetooth or Bluetooth Low Energy (BLE) channel, a Radio Frequency Identifier channel or a Near Field Communication channel. Communicating using a short-range communication, such as BLE channel, can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS), etc. In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc. Public-key cryptography may also be utilized, such as for encryption and decryption of data, for identity verification, and the like.

It will be appreciated that, while a variety of devices and systems are shown in FIG. 1, in some instances, resource access-facilitating interaction system 100 can include fewer or more devices and/or systems. Further, some systems and/or devices can be combined. For example, a client agent device 170 may also serve as an access management system 185 or intermediate system 150 so as to as to facilitate assignment of access rights.

As described in further detail herein, an interaction between User Device A 110 and a client device (e.g., client agent device 170, client register 160 or client point device 165) can facilitate, for example, verification that User A 105 has a valid and applicable access right, obtaining an assignment of an access right, and/or obtaining an assignment of an upgraded access right.

In addition, User Device B 130, which may be operated by User B 125, may include a user device which is located at a stadium or concert hall during an event. User Device B 130 may directly interact with a client device (e.g., client agent device 170, client register 160 or client point device 165), which is also located at the stadium or concert hall during the event. As such, the access management system 185 may be updated or accessed by User Device B 130 via the client agent device 170. For example, User Device B 130 may communicate with the client agent device 170 over a short-range communication channel 190, such as Bluetooth or Bluetooth Low Energy channel, Near Field Communication (NFC), Wi-Fi, RFID, Zigbee, ANT, etc.

Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short range communication link 190 is established, User Device B 130 may communicate with the access management system 185 and access the item or items of resources. That is, while User Device B 130 is configured to communicate over network 155, User Device B 130 may communicate with the access management system 185 via the client agent device 170, instead of the network 155.

Figure 2:
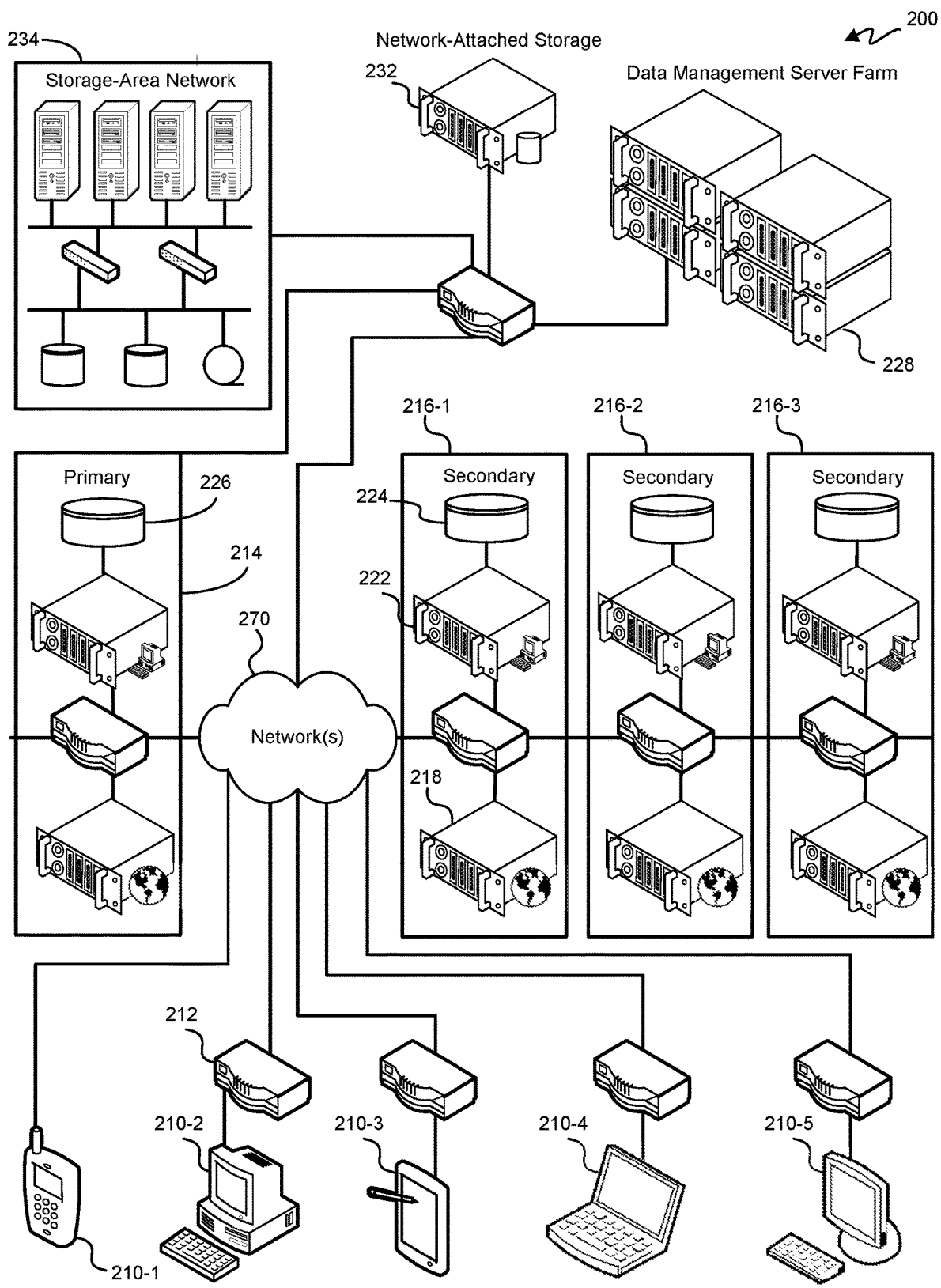
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 185 can include a primary access assignment system 214 and/or a secondary access assignment system 214; data management server farm 228; and/or a central data store (e.g., network-attached storage 232 or storage-area network 234). Each of one or more intermediate systems 150 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
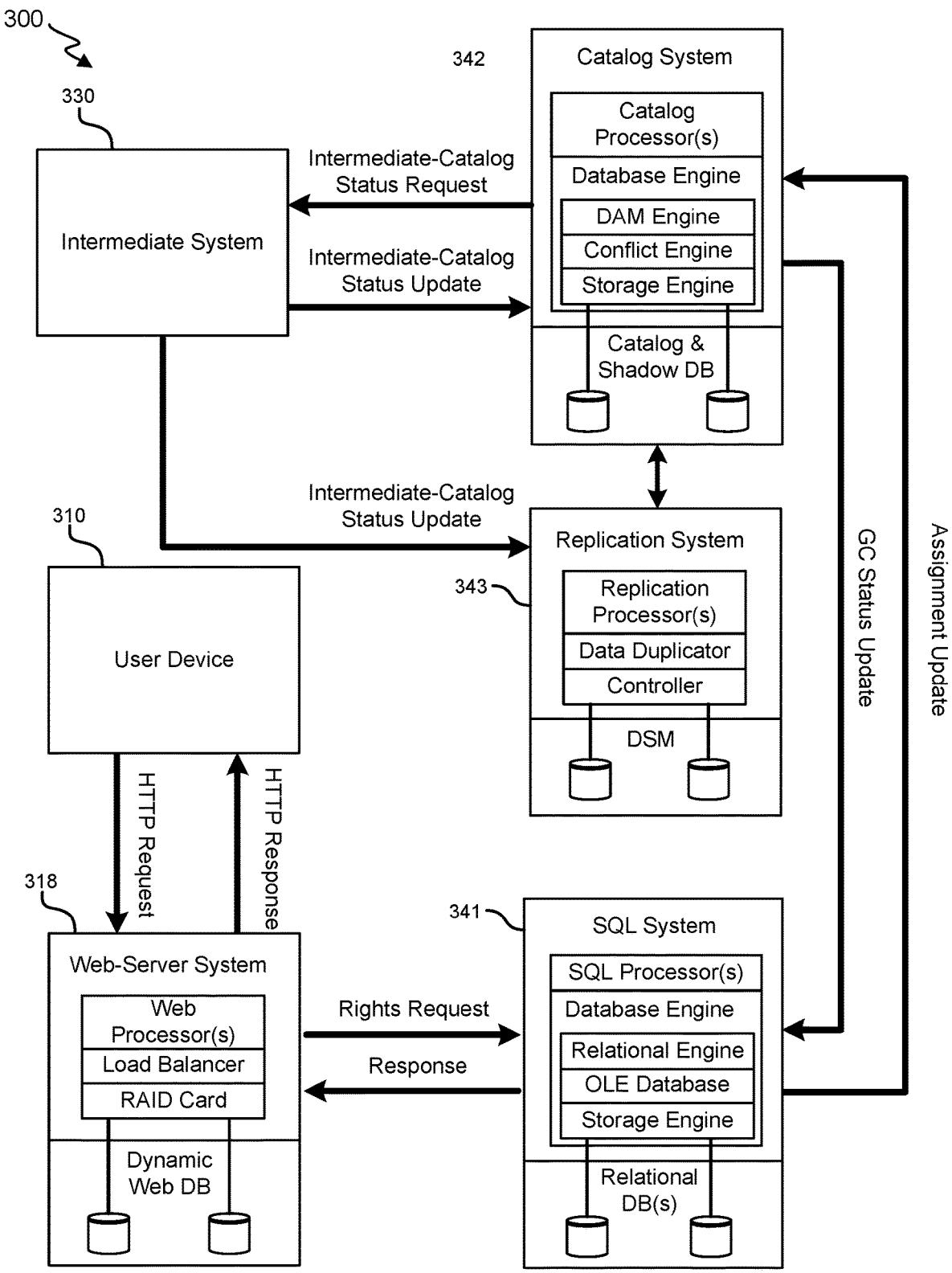
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication system 343 may be located in different geographic locations (e.g., different cities, states or countries).

Figure 4:
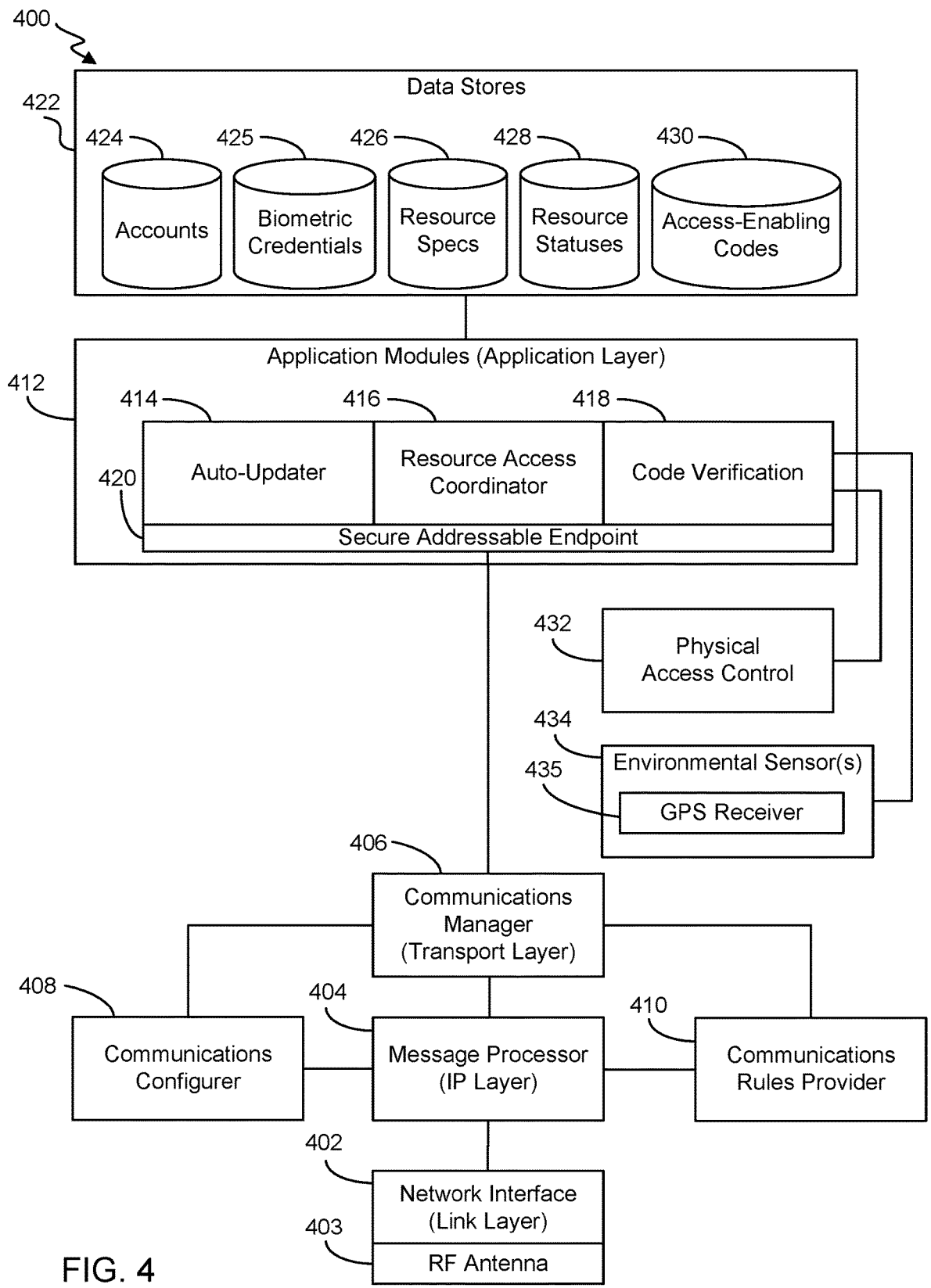
FIG. 4 illustrates example components of a device.

FIG. 4 illustrates example components of a device 400, such as a client device (e.g., client agent device 170, client register 160 and/or client point device 165), an intermediate system (e.g., intermediate system 150) and/or an access management system (e.g., access management system 185) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi-Fi (IEEE 802.11 family standards), Bluetooth® (a family of standards promulgated by Bluetooth SIG, Inc.), BLE, near-field communication (implementing the ISO/IEC 18092 standards or the like), Radio Frequency Identification communication.

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. Network interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive Wi-Fi signals, cellular signals, Bluetooth signals, Bluetooth Low Energy (BLE) signals, Zigbee signals, Near-Field Communication (NFC) signals, or Radio Frequency Identification signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource. As another example, device 400 can transmit a signal that includes an access-enabling code, and a responsive signal can indicate whether the code is applicable for access of a particular resource and/or is valid. As a further example, device 400 can transmit a signal that includes an biometric credential, and a responsive signal can indicate whether the biometric credential is valid and/or whether a user has passed an identity challenge. Further examples include where device 400 receives a signal that includes a piece of data that needs encryption or decryption, and a responsive signal can include the encrypted or decrypted data.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order for querying them. By way of further example, if the code determines that a new brand of router has been installed, it can adapt to that change, or to the change in network configuration or other changes.

Instead or in addition, the host server (e.g., via communications manager 406) can send specific instructions to auto-updater module 414 to specify tests or checks to be performed on device 400 to determine the changes to the system configurations (e.g., by performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects a port the management system is using to communicate, the management system (or operator) can communicate with the ISP, update it, change it back, or choose from a new available port, respectively.

The specific tests may be necessary to help establish the communication link, if, for example, the tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, a biometric credential data store, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such that a particular entity can be associated with one or more device types, IP addresses, browser identifier and/or operating system identifier).

Biometric credential data store 424 can store biometric data for entities, such as administrators, intermediate-system agents and/or users. The biometric data can include any of a variety of biometric signatures of users, which can be challenged or verified by comparing the stored biometric data against new biometric data obtained in real-time from a user. Useful biometric data includes, but is not limited to, fingerprints, iris scans, facial images, voice prints, palm prints, retinal images, and the like.

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 425, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 425, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
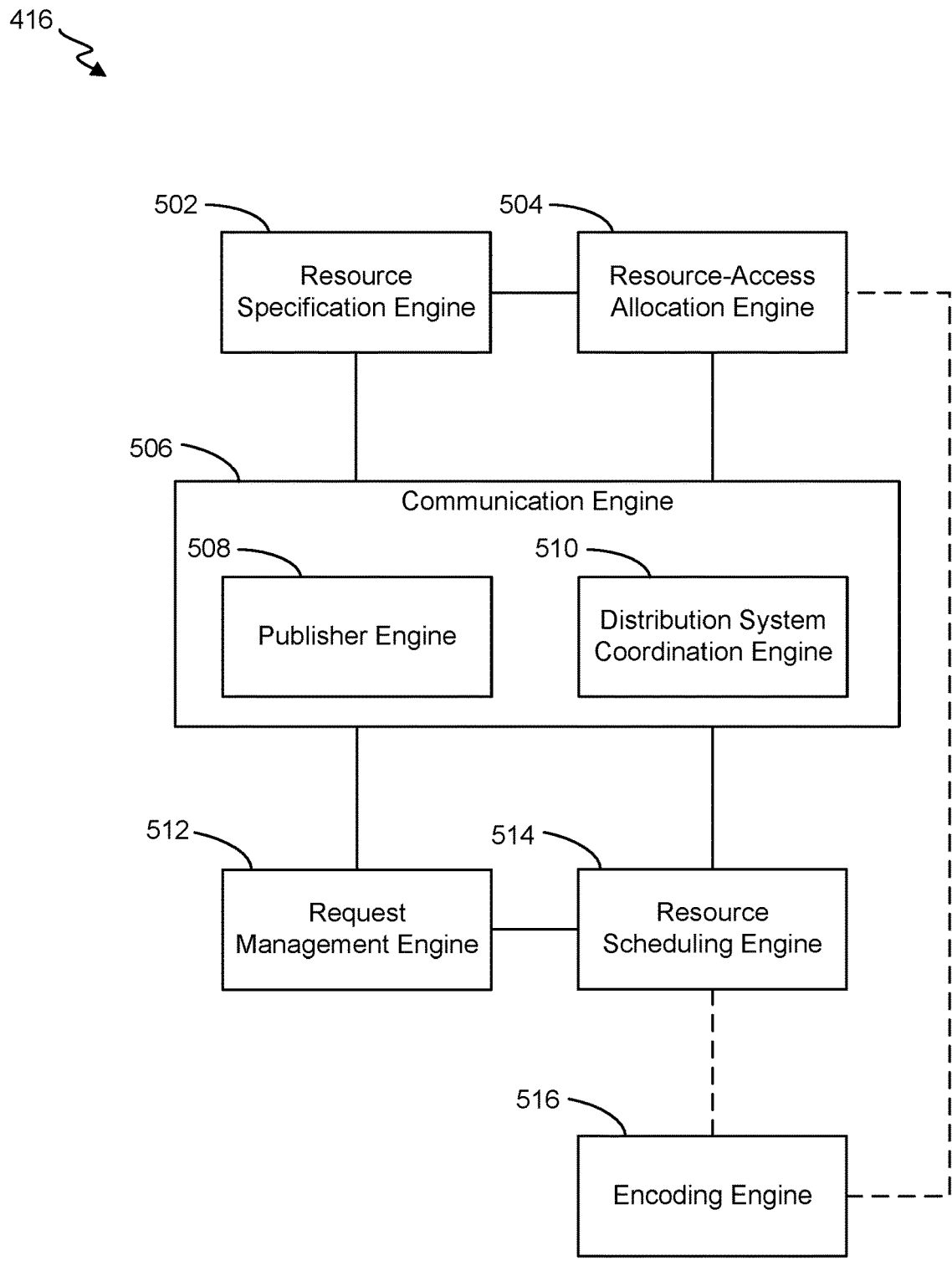
FIG. 5 illustrates example components of resource access coordinator module that may operate, at least in part, at an access management system according to an embodiment of the invention.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because, for example, association of an access right with an entity can, in some instances, be conditioned on fee payment or authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name, biometric credentials), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 512 can request authorization for an amount of the requested access rights. In some instances, payment assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or payment information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, or purchase history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, a biometric credential, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 425, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment. The data can include an indication that access rights have been assigned and/or details as to which rights have been assigned. The data can also or alternatively include access-enabling codes associated with assigned access rights.

While FIG. 5 depicts components of resource access coordinator module 416 that may be present on an access management system 185, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

In some configurations, device 400 can be a user device that electronically receives a communication with an access-enabling code from a client device. Code verification module 418 can then determine whether user-identifying information in the code is consistent with the user of device 400, such as by comparing a biometric credential obtained from the user, such as a self-portrait photograph.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is affected. For example, upon a code verification, a user device and/or user may be permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitor the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can be processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from receiver 435, which may be a GPS receiver. For example, a location of device 400 can be estimated based on signals received by another and/or received from different sources (e.g., base stations, client point devices or Wi-Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
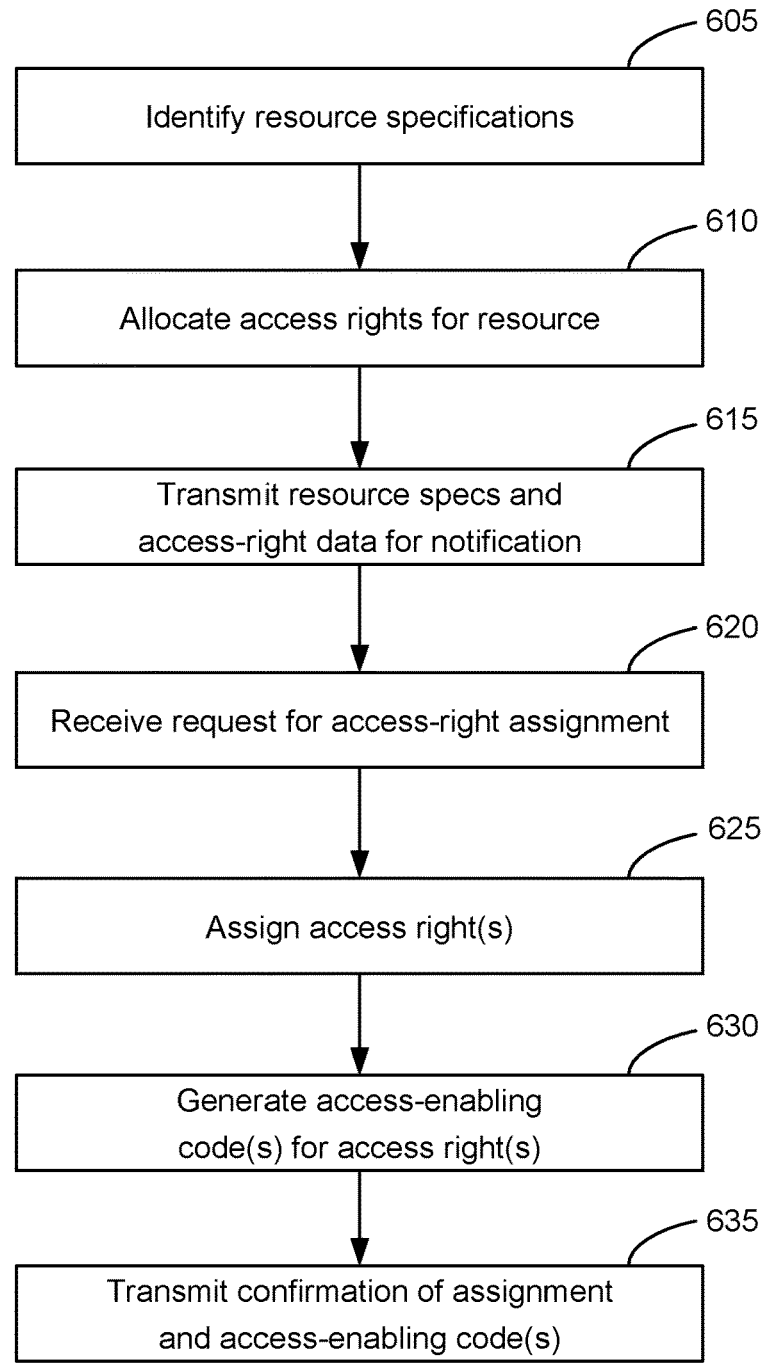
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 185. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to be assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such as one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7:
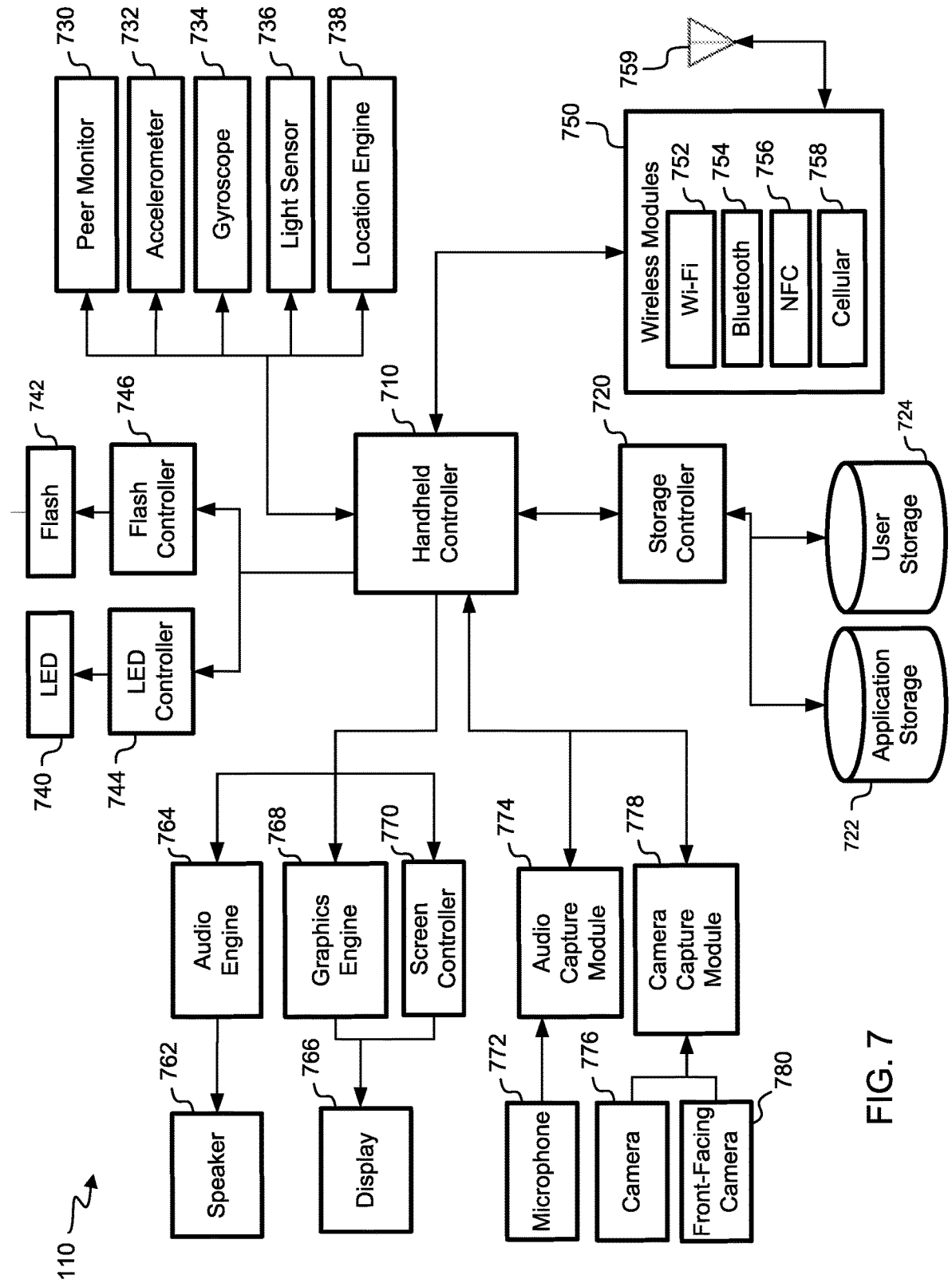
FIG. 7 shows a block diagram of user device according to an embodiment.

FIG. 7 shows a block diagram of User Device A 110 according to an embodiment. User Device A 110 includes a handheld controller 710 that can be sized and shaped so as enable the controller and User Device A 110 in a hand. Handheld controller 710 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 710 can communicate with a storage controller 720 so as to facilitate local storage and/or retrieval of data. It will be appreciated that handheld controller 710 can further facilitate storage and/or retrieval of data at a remote source via generation of communications including the data (e.g., with a storage instruction) and/or requesting particular data.

Storage controller 720 can be configured to write and/or read data from one or more data stores, such as an application storage 722 and/or a user storage 724. The one or more data stores can include, for example, a random access memory (RAM), dynamic random access memory (DRAM), read-only memory (ROM), flash-ROM, cache, storage chip, and/or removable memory. Application storage 722 can include various types of application data for each of one or more applications loaded (e.g., downloaded or pre-installed) onto User Device A 110. For example, application data can include application code, settings, profile data, databases, session data, history, cookies and/or cache data. User storage 724 can include, for example, files, documents, images, videos, voice recordings and/or audio. It will be appreciated that User Device A 110 can also include other types of storage and/or stored data, such as code, files and data for an operating system configured for execution on User Device A 110.

Handheld controller 710 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 7 shows several exemplary sensors and detection engines, including a peer monitor 730, accelerometer 732, gyroscope 734, light sensor 736 and location engine 738. Each sensor and/or detection engine can be configured to collect a measurement or make a determination, for example, at routine intervals or times and/or upon receiving a corresponding request (e.g., from a processor executing an application code).

Peer monitor 730 can monitor communications, networks, radio signals, short-range signals, etc., which can be received by a receiver of User Device A 110) Peer monitor 730 can, for example, detect a short-range communication from another device and/or use a network multicast or broadcast to request identification of nearby devices. Upon or while detecting another device, peer monitor 730 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 732 can be configured to detect a proper acceleration of User Device A 110. The acceleration may include multiple components associated with various axes and/or a total acceleration. Gyroscope 734 can be configured to detect one or more orientations (e.g., via detection of angular velocity) of User Device A 110. Gyroscope 734 can include, for example, one or more spinning wheels or discs, single- or multi-axis (e.g., three-axis) MEMS-based gyroscopes.

Light sensor 736 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 738 can be configured to detect (e.g., estimate) a location of User Device A 110. For example, location engine 738 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 738 can process signals from multiple sources and can estimate a location of User Device A 110 using a triangulation technique. In some instances, location engine 738 can process a single signal and estimate its location as being the same as a location of a source of the signal.

User Device A 110 can include a flash 742 and flash controller 746. Flash 742 can include a light source, such as (for example), an LED, electronic flash or high-speed flash. Flash controller 746 can be configured to control when flash 742 emits light. In some instances, the determination includes identifying an ambient light level (e.g., via data received from light sensor 736) and determining that flash 742 is to emit light in response to a picture- or movie-initiating input when the light level is below a defined threshold (e.g., when a setting is in an auto-flash mode). In some additional or alternative instances, the determination includes determining that flash 746 is, or is not, to emit light in accordance with a flash on/off setting. When it is determined that flash 746 is to emit light, flash controller 746 can be configured to control a timing of the light so as to coincide, for example, with a time (or right before) at which a picture or video is taken.

User Device A 110 can also include an LED 740 and LED controller 744. LED controller 744 can be configured to control when LED 740 emits light. The light emission may be indicative of an event, such as whether a message has been received, a request has been processed, an initial access time has passed, etc.

Flash controller 746 can control whether flash 746 emits light via controlling a circuit so as to complete a circuit between a power source and flash 746 when flash 742 is to emit light. In some instances, flash controller 746 is wired to a shutter mechanism so as to synchronize light emission and collection of image or video data.

User Device A 110 can be configured to transmit and/or receive signals from other devices or systems (e.g., over one or more networks, such as network(s) 155). These signals can include wireless signals, and accordingly User Device A 110 can include one or more wireless modules 750 configured to appropriately facilitate transmission or receipt of wireless signals of a particular type. Wireless modules 750 can include a Wi-Fi module 752, Bluetooth module 754, near-field communication (NFC) module 756 and/or cellular module 758. Each module can, for example, generate a signal (e.g., which may include transforming a signal generated by another component of User Device A 110 to conform to a particular protocol and/or to process a signal (e.g., which may include transforming a signal received from another device to conform with a protocol used by another component of User Device A 110).

Wi-Fi module 752 can be configured to generate and/or process radio signals with a frequency between 2.4 gigahertz and 5 gigahertz. Wi-Fi module 752 can include a wireless network interface card that includes circuitry to facilitate communicating using a particular standard (e.g., physical and/or link layer standard).

Bluetooth module 754 can be configured to generate and/or process radio signals with a frequency between 2.4 gigahertz and 2.485 gigahertz. In some instances, bluetooth module 754 can be configured to generate and/or process Bluetooth low-energy (BLE or BTLE) signals with a frequency between 2.4 gigahertz and 2.485 gigahertz.

NFC module 756 can be configured to generate and/or process radio signals with a frequency of 13.56 megahertz. NFC module 756 can include an inductor and/or can interact with one or more loop antenna.

Cellular module 758 can be configured to generate and/or process cellular signals at ultra-high frequencies (e.g., between 698 and 2690 megahertz). For example, cellular module 758 can be configured to generate uplink signals and/or to process received downlink signals.

The signals generated by wireless modules 750 can be transmitted to one or more other devices (or broadcast) by one or more antennas 759. The signals processed by wireless modules 750 can include those received by one or more antennas 759. One or more antennas 759 can include, for example, a monopole antenna, helical antenna, intenna, Planar Inverted-F Antenna (PIFA), modified PIFA, and/or one or more loop antennae.

User Device A 110 can include various input and output components. An output component can be configured to present output. For example, a speaker 762 can be configured to present an audio output by converting an electrical signal into an audio signal. An audio engine 764 can effect particular audio characteristics, such as a volume, event-to-audio-signal mapping and/or whether an audio signal is to be avoided due to a silencing mode (e.g., a vibrate or do-not-disturb mode set at the device).

Further, a display 766 can be configured to present a visual output by converting an electrical signal into a light signal. Display 766 may include multiple pixels, each of which may be individually controllable, such that an intensity and/or color of each pixel can be independently controlled. Display 766 can include, for example, an LED- or LCD-based display.

A graphics engine 768 can determine a mapping of electronic image data to pixel variables on a screen of User Device A 110. It can further adjust lighting, texture and color characteristics in accordance with, for example, user settings.

In some instances, display 766 is a touchscreen display (e.g., a resistive or capacitive touchscreen) and is thus both an input and an output component. A screen controller 770 can be configured to detect whether, where and/or how (e.g., a force of) a user touched display 766. The determination may be made based on an analysis of capacitive or resistive data.

An input component can be configured to receive input from a user that can be translated into data. For example, as illustrated in FIG. 7, User Device A 110 can include a microphone 772 that can capture audio data and transform the audio signals into electrical signals. An audio capture module 774 can determine, for example, when an audio signal is to be collected and/or any filter, equalization, noise gate, compression and/or clipper that is to be applied to the signal.

User Device A 110 can further include one or more cameras 776, 780, each of which can be configured to capture visual data (e.g., at a given time or across an extended time period) and convert the visual data into electrical data (e.g., electronic image or video data). In some instances, User Device A 110 includes multiple cameras, at least two of which are directed in different and/or substantially opposite directions. For example, User Device A 110 can include a rear-facing camera 776 and a front-facing camera 780.

A camera capture module 778 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When User Device A 110 includes multiple cameras, camera capture module 778 may further determine which camera(s) is to collect image data (e.g., based on a setting).

Figure 8:
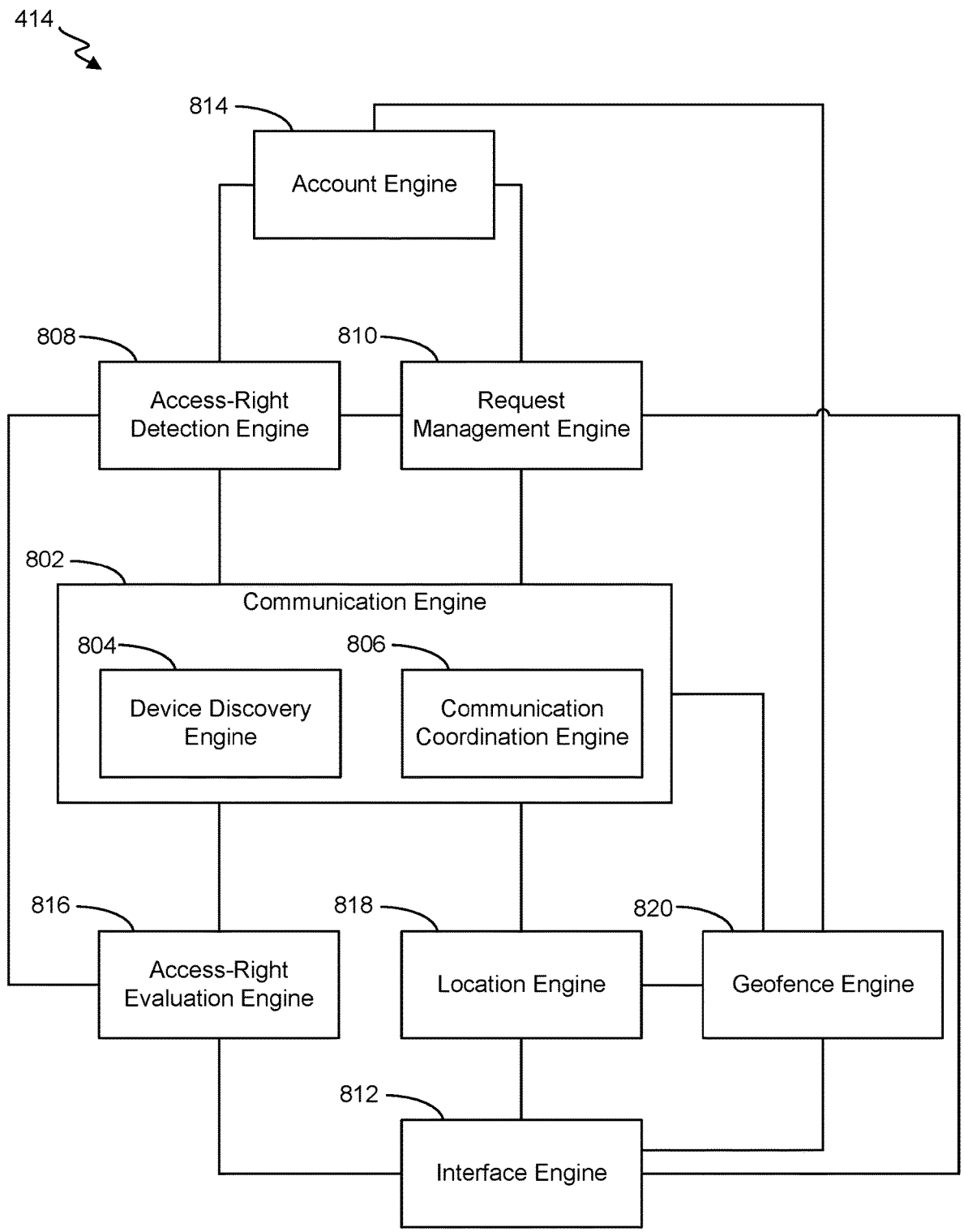
FIG. 8 illustrates example components of resource access coordinator module that may operate, at least in part, at a user device system or client device according to an embodiment of the invention.

FIG. 8 illustrates example components of resource access coordinator module 414 that may operate, at least in part, at a user device system or client device according to an embodiment of the invention. In some embodiments, components can be distributed across multiple devices or systems (e.g., a user device and a client device), a part or all of single component can be present at multiple devices or systems, or parts of a single component can be distributed across multiple devices or systems.

A communications engine 802 can facilitate communicating with one or more other devices or systems. Communications engine 802 includes a device discovery engine 804 that can discover other (e.g., nearby) devices. The device discovery can include, for example, detecting devices via BLE communication channels, near field communication channels or radio frequency identification channels. The discovery can include a passive discovery, whereby device discovery engine 804 monitors received communications (or beacons) and identifies signals having particular characteristics, being received via a particular type of communication protocol (e.g., BLE) and/or being received from a particular type of device (e.g., one indicating that it pertains to a particular resource or is associated with a particular entity). The discovery can also or alternatively include an active discovery, whereby device discovery engine 804 facilitates transmission of periodic (e.g., regular) presence-announcing signals.

Upon discovery or other establishment of a communication channel, a communication coordination engine 806 can facilitate appropriate communication with the device. For example, communication coordination engine 806 can facilitate generation of messages with pertinent content and/or detecting pertinent content from within received communications.

A device discovery, communication receipt or other event (e.g., detection of a time associated with an access right) can trigger an access-right detection engine 808 to identify data pertaining to one or more access rights. In some instances, the one or more access rights include one or more unassigned access rights for a particular resource. For example, a user device can receive a communication from a client device that identifies access rights available to access a resource being availed by a client (e.g., within a defined time period). The data can include access parameters and/or assignment criteria (e.g., fees).

In some instances, the one or more access rights include one or more access rights associated with a particular account or user device. For example, an access-right detection engine 808 on a user device can initiate a query for and/or retrieval of (e.g., from a local or remote data store) data for access rights associated with the device or an account that a user is logged into on the device. The query can further specify or constrain an access parameter (e.g., to correspond to a current time and/or location) and/or resource. To illustrate, access-right detection engine 808 on a user device may detect a signal (e.g., via communications engine 802) from a client device that identifies a resource, and access-right detection engine 808 can initiate a query for access rights that are associated with the resource and assigned to one or more particular parties and/or associated with a particular user account. The data can include, for example, one or more parameters associated with the access right(s) and/or an access-enabling code (or code-generating technique).

In some instances, the data pertaining to the one or more access rights includes data received in a communication. For example, access-right detection engine 808 can detect a signal (e.g., via communication coordination engine 806) from a user device that includes data pertaining to access rights that are being submitted for evaluation and/or redemption. The data can include, for example, one or more access-enabling codes.

A request management engine 810 can facilitate notifying a user of the access right(s). For example, a client device may push data pertaining to one or more unassigned access rights for a resource via a BLE communication channel to a nearby user device, and request management engine 810 at the user device can generate a presentation that includes or represents the data (e.g., identifying locations and prices of the access rights). As another example, request management engine 810 can facilitate dynamic updates to an app interface or web page as a user provides inputs that identifies a resource or constrains a resource identification. Such facilitation can include, for example, translating inputs into selections or constraints, identifying query constraints based on an input, and/or generating a message to send to a remote server (e.g., associated with a website or app) based on inputs that include a request for an updated or new webpage or app page or for access-right data. As yet another example, a client device can send a signal to a user device that identifies a resource. Access-right detection engine 808 can then coordinate transmission of a signal to a remote system (e.g., an access management system) that requests identifications of unassigned access rights for the resource. Request management engine 810 can generate a presentation that includes or represents data received in a responsive communication.

An interface engine 812 can present various notifications and/or presentations, such as those identifying unassigned access rights and/or those generated or requested by request management engine 810. The notifications and/or presentations can be presented, for example, on a display of a device (e.g., user device). A notification and/or presentation of one or more unassigned access right can be accompanied by one or more options to request access-right assignment (e.g., of one or more particular access rights). For example, an identification or representation of each access right may be accompanied by an option to request assignment of the access right. Interface engine 812 may detect a selection of an option (e.g., via a touch or mouse click) and can convey the selection to request management engine 810.

Request management engine 810 can collect data and generate a request communication that identifies the requested access right(s) (or requested access-right parameters) and/or other pertinent data (e.g., user identifying information and/or device information). The data can be collected based on input provided at the user device by the user (e.g., and thereby detected by interface engine), automatic detection (e.g., of device specifications and/or configurations), and/or account data.

Thus, in some instances, request management engine 810 can communicate with an account engine 814, which can determine whether a user device is logged into an account (e.g., based on past provision of a username and password), identify an account, and/or facilitate retrieval (e.g., from a local or remote data store) of account data.

Upon generating the request communication, request management engine 810 can facilitate transmitting the signal to a destination device (e.g., an access management system or client device). In some instances, a responsive communication can indicate that additional information is needed to process the request, and request management engine 810 can coordinate attempts to obtain the requested information and provide such information to the destination device. In some instances, a responsive communication can indicate that one or more access rights have been assigned (e.g., to the user or to another identified party) and may include part or all of an access-enabling code (and/or code-generating technique). Request management engine 810 can then coordinate a presentation of a notification of the assignment and/or local storage of data pertaining to the assignment (e.g., locally storing part or all of an access-enabling code and/or code-generating technique).

Various events can trigger an access-right evaluation, which can be coordinated by an access-right evaluation engine. For example, access-right detection engine 808 may detect a communication from a client device that identifies a resource and requests access-right data and/or an evaluation of access-right data. Access-right detection engine 808 may then query a local or remote data store for access-right data assigned to a particular user, associated with a particular user device and/or pertaining to the identified resource. As another example, access-right evaluation engine may detect a communication from a client device or remote system that requests data identifying a user, person, account, device and/or other variable that may be used to identify select access rights corresponding to a user device. Access-right evaluation engine 816 can then retrieve or identify such information (e.g., by retrieving the information from an account data store, by automatic detection or by prompting a user for input) and can transmit the data to the client device or remote system so as to retrieve and evaluate corresponding access-right data. As yet another example, access-right detection engine 808 can determine that a detected location of a user device and/or current time corresponds to a location and/or time period associated with one or more access rights assigned to a particular user and/or associated with a user device. Access-right detection engine 808 can then retrieve additional access-right data for the access right(s). It will therefore be appreciated that, in various instances, an evaluation of access-right data may be performed by access-right evaluation engine at a user device and/or at another device or system (e.g., client device or access management system).

The access-right data can include part or all of an access-enabling code associating with each of the one or more assigned access rights and/or a code-generating technique. For example, a code-generating technique may indicate that a fixed part of the code is static and is to be combined with another part of the code, which may be dynamic, which may depend on (for example) a current time and/or location of a user device, and/or which may be based on a characteristic of a device performing the technique (e.g., to reflect a device type and/or whether the device matches one corresponding to a party to whom the access right was assigned).

The access-right data can further or alternatively include data reflecting access-right parameters and/or a resource to which the access right(s) apply. For example, access-right data may include a location and/or time corresponding to an access right. The access-right data can also or alternatively include data pertaining to an assignment of the access right(s), such as an identifier of a user (or user account) to which the right was assigned and/or a device used or identified during the assignment.

Access-right evaluation engine 816 can coordinate an evaluation of an access right. The evaluation can include, for example, determining whether access right parameter(s) pertain to particulars (e.g., a current time, a current location of an evaluating device or of the user device, and/or a particular resource). The evaluation can further or alternatively include determining whether access-right data pertaining to assignment of the access right(s) matches that associated with a user device requesting evaluation and/or redemption of the right(s). For example, it can be determined whether a same account is logged into on an evaluating user device as the one used to request assignment of the access right(s).

The evaluation can include evaluating an access-enabling code, which can include, for example, determining whether part or all of the code matches one in a data store or one independently generated, whether part of the code matches a variable determined based on a current time and/or detected location (e.g., of an evaluating device or user device), whether the code has been previously redeemed, whether part or all of the code corresponds to a particular resource, whether a format of the code is of an approved format, whether the code exhibits an internal defined consistency, whether part or all of the code matches a variable determined based on a characteristic of a user device, and so on.

Based on the evaluation, access-right evaluation engine 816 can generate a stimulus to be presented (e.g., via interface engine 812) at a user device or client device. In some instances, a same device performs the evaluation, generates the stimulus and presents the stimulus. In some instances, different devices are involved (e.g., and appropriate data is transmitted across devices). The stimulus can include a visual, audio or haptic stimulus. Characteristics of the stimulus can include, for example, one or more spatial or temporal patterns, shapes, colors, images, overlays or dynamic elements (e.g., a degree to which and/or a frequency at which an image or tone changes). Characteristics can be determined based on, for example, a result of the evaluation performed by access-right evaluation engine 816, one or more access-right parameters, a current time and/or a pseudo-random generator.

For example, at a user device, different stimuli may be generated depending on whether one or more access rights were determined to be valid (e.g., generally, to access a particular resource and/or for a particular type of access). To illustrate, a first pattern may be included in the stimulus upon determining that the user device is not associated with any valid access rights for a resource; a second pattern may be included upon determining that the user device is associated with one or more access rights to access the resource where the access is permitted within a first geographical area; and a third pattern may be included upon determining that the user device is associated with one or more access rights to access the resource where the access is permitted within a second geographical area. As another example, a stimulus characteristic can depend on a quantity of access rights or a priority level of access rights.

An additional security feature is that, when a presentation is to be presented on a user device, access-right evaluation engine 816 can delay generation and/or presentation of a stimulus until a user device is near a check point (e.g., such as until it is within a defined distance (e.g., 5, 4, 3, 2 or 1 feet) from another device (e.g., a client device)), until it detects a stimulus-generation signal (e.g., from a client device), until it is within a defined geographical area or crosses a geofence and/or until it detects a particular device motion (e.g., corresponding to a user holding a device up to be shown to another person).

As described in further detail below, in some instances, each of a user device and a client device can include an access-right evaluation engine 816 and interface engine 812 that are each configured to, for example, evaluate an access right associated with the user device (e.g., to determine whether an access right associated with the user device exists, whether any such access right corresponds to a particular resource or access parameter, whether any pertinent access right is valid, etc.) and to generate and present a presentation indicative of a result of the evaluation. In some instances, the devices are sufficiently communicating or drawing from shared data such that the stimulus presented on the user device in part or entirely matches the stimulus presented on the client device. Further, the stimulus can indicate whether and/or to what extent the access right is valid. In some instances, whether and/or a degree to which the stimuli match is indicative of a validity and/or applicability of the access right (e.g., whether it pertains to a particular resource and/or access parameter). Thus, the multi-device stimulus presentations can allow a client agent to easily identify user devices (and associated users) not authorized to be in a particular location, receive a service, etc.

A location engine 818 can determine the current location of a device (e.g., of a user device). The location can be identified, for example, as geographic coordinates, an address, proximity to a device, proximity to a resource location, proximity to a part of a resource location (entrance, exit, gate, etc.), an indication as to whether the device is at a resource location and/or an identification of a part of a resource location that the device is at. The location can be determined by, for example, processing signals received by a receiver (e.g., in a link layer in a protocol stack) to identify which other devices signals are being received, signal strengths of one or more received signals and/or time delays of one or more received signals and to estimate the location based on the identified characteristics. One or more signals can be received by the receiver from, for example, one or more client devices, GPS satellites, BLE beacons, or Wi-Fi hot spots.

In some instances, a location is determined based on content of a communication received at a user device from another device. For example, a signal from a client device can identify a particular location. Location engine 818 may determine a user device location to be the same as the location identified in the communication, or a characteristic (e.g., signal strength or latency) of the communication and the identified location can be used to estimate a user-device location (e.g., using a triangulation technique). In some instances, a location is determined using a dead-reckoning technique. In some instances, location engine 818 can use an estimated location and/or other data to provide navigation assistance. Further, because, in some instances, location engine 818 can estimate a user device location based on communications with client devices at a resource location, navigation assistance can be provided even without connectivity to the Internet or to GPS satellites.

Location engine 818 can further or alternatively facilitate automatically obtaining access credentials, such as access-enabling codes, biometric credentials, etc., from a user by monitoring a video feed of an access point, such as a turnstile, gate or lockable door, or other entry or choke point and particularly and individually determine a user device's location, as described above, in order to obtain the credentials from the video feed. For example, access-enabling codes may be displayed on a badge or user device display and obtained in real-time from the video feed and matched to the user device's location. As another example, biometric credentials, such as facial or iris images, may be obtained in real-time from the video feed and matched to the user device's location.

Communicating system 800 can also include a geofence engine 820. Geofence engine 820 can manage one or more geofences that indicate when queries for access rights are to be initiated, access-right evaluations are to be initiated, evaluation-influenced stimulus generations are to be initiated, evaluation-influenced stimuli are to be presented and/or particular offers are to be presented. A geofence can depend on a position and/or motion (e.g., a direction of motion).

Geofence engine 820 can use a device location estimated by location engine 818 and/or one or more client-device signal properties to determine whether a user device is inside a geofence to determine an action is to be initiated or performed, such as enabling a user device to detect and/or transmit a request for one or more resource access rights or for an upgrade of an access right. In some instances, the presentation is conditioned on and/or influenced by one or more non-location factors.

It will be appreciated that engines depicted in FIG. 8 are illustrative. A device (e.g., user device) need not include all engines depicted in FIG. 8 and/or may include additional engines.

Figure 9:
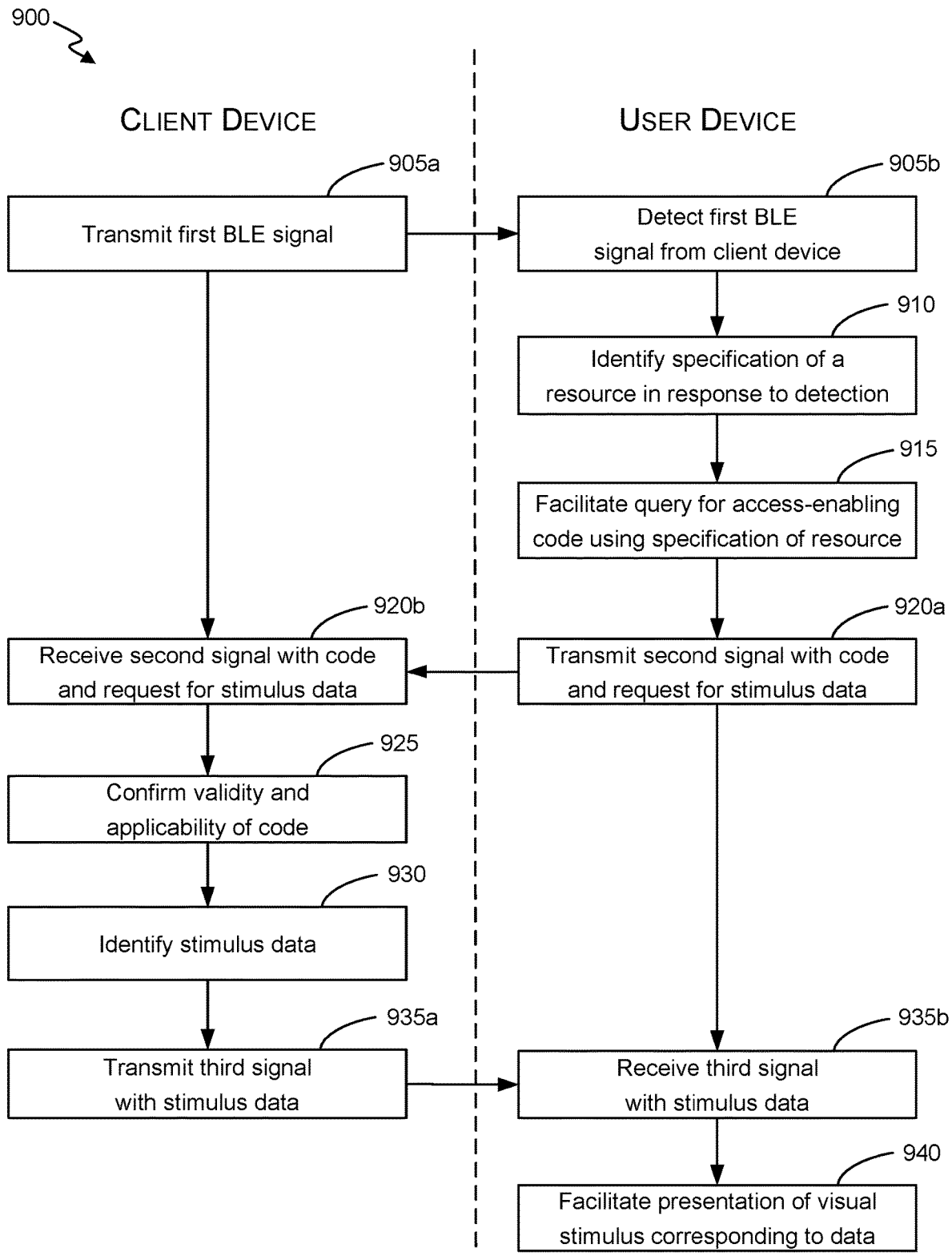
FIG. 9 illustrates a flowchart of an embodiment of a process for facilitating selective granting of resource access to authorized users based on short-range communication exchanges.

FIG. 9 illustrates a flowchart of an embodiment of a process 900 for facilitating selective granting of resource access to authorized users based on short-range communication exchanges. Process 900 can be performed, at least in part, by a user device (e.g., User Device A 110). Process 900 can further be performed, at least in part, by one or more client devices (e.g., client agent device 170, client register 160 and/or client point device 165) and/or by one or more remote servers (e.g., access management system 185).

Process 900 begins at block 905a, where a transmitter at a client device transmits a first wireless signal, which is received at a receiver at user device at block 905b. The first wireless signal can include one transmitted via BLE, Bluetooth or other short-range connection. The first wireless signal can include, for example, an identifier of the transmitting client device, an identifier of a resource, one or more specifications of a resource, an identifier of a location (e.g., of the client device and/or corresponding to the resource, such as a location of a resource-associated geographic area or structure or section), a request for an access-enabling code for a resource, an identifier of a client associated with the client device and/or resource, and/or a command to be performed at a user device.

At block 910, access-right detection engine 808 at the user device identifies a specification of a resource in response to the detection. The specification of the resource can include an identifier of the resource (e.g., a name or resource-associated code), a location of the resource (e.g., a venue), a time at which the resource is being made available for access (e.g., an event start time) or a client associated with the resource.

In some instances, the specification of the resource is identified in the first wireless signal, and block 910 includes extracting the specification from the signal. In some instances, block 910 includes using data in the signal to look up or otherwise derive the specification. For example, a first signal may include an identifier of a location, and block 910 may include transmitting a signal to a remote source with the location identifier and current time with a request for an identifier of a resource being offered at the location at the current time. In some instances, while the detection may trigger the specification identification, the specification identification may be performed independently from data in the first wireless signal. For example, block 910 may include looking up (locally or from a resource data store) an identifier of a resource associated with a current time.

The resource can include a limited-access resource, such that parties cannot indiscriminately access the resource. For example, client agents and/or client devices may selectively permit users to access the resource so long as one or more access conditions are satisfied (e.g., a device of the user transmits a signal and/or presents an indication that includes a valid an applicable code for accessing the resource and/or that indicates that a code associated with the user or device is valid and applicable to a current circumstance).

At block 915, access-right detection engine 808 at the user device facilitates a query for an access-enabling code using the specification of the resource. For example, block 915 can include querying a local access-enabling code data store using the specification, or block 915 can include transmitting a signal to a remote system that includes the specification (e.g., and other data, such as an identifier of a user, account and/or device) and a request to retrieve an access-enabling code corresponding to the specification (e.g., and other data).

At block 920a, a transmitter at the user device transmits a second signal with the access-enabling code and a request for stimulus data, and at block 920b, a receiver at the client device receives the second signal. The second signal can include one generated by access-right evaluation engine 816. The request for stimulus data can include a request for an identification of a characteristic that a visual stimulus is to have that is indicative of a validity and/or applicability of the access-enabling code. In various instances, the second signal may further request an indication as to whether the access-enabling code it determined to be (e.g., by or via the client device) valid and/or applicable. The second signal can include additional data, such as a location of the user device (e.g., as identified by a location engine of the device), a current time, a resource corresponding to the specification, the identified specification of the resource and/or an indicator of a requested type of access (e.g., as identified based on received user input or inferred based on a location).

At block 925, access-right evaluation engine 816 at the client device confirms that the code is valid and applicable to a particular resource and/or circumstance. A validity can indicate whether, for example, the access-enabling code has an approved format, has not been previously used and/or has a particular consistency (e.g., between elements within the code or between an element in the code and other data, such as a device type or location of the user device and/or current time). An approved format and/or consistency analysis may be general or may differ across, for example, resources, clients, locations, time periods and/or other factors.

An applicability can indicate whether, for example, the access-enabling code is one indicative of an access right having been assigned for a particular resource (e.g., one for which access is being requested), applies to a particular location (e.g., range of geographic coordinates), applies to a current (or particular) time or time period and/or applies to a type of requested access.

Thus, determining that an access-enabling code is applicable can include identifying a particular variable, such as the particular resource, location, time or time period and/or type of requested access (e.g., based on data in the second signal, detecting a location of the client device and/or identifying a current time). In one instance, to determine whether the code is applicable for a particular instance, access-right evaluation engine 816 at the client device may look up a variable associated with the code in a local or remote data store and compare it to the particular variable. For example, a resource associated with an access code may be looked up and compared to a resource identified in the second signal. In one instance, a data store identifying one or more codes associated with a particular variable may be queried to determine whether the access-enabling code is included in the one or more codes. In one instance, a variable for the code can be identified or determined (e.g., using a look-up technique or transformation of all or part of the code) and compared to the particular variable.

At block 930, access-right evaluation engine 816 at the client device identifies stimulus data. In some instances, the stimulus data is unique across user devices and/or identifying-stimulus-data actions. Thus, the stimulus data identified for a first user device can be different than that for a second user device, even if each user device was associated with a valid and applicable code. The stimulus data may include a stimulus and/or a stimulus characteristic (e.g., color, texture, shape, or movement velocity). The stimulus data may be generated according to an algorithm and/or, by selecting one or more stimulus characteristics or a stimulus from a set of stimulus characteristics or stimuli. For example, a pseudo-random selection technique may be used to select each of: a background color, a background texture, a foreground shape and a foreground color. A higher number of potential characteristics of each type and a higher number of characteristic types that are variable across stimuli can increase the variability across overall stimuli across selections.

In some instances, the stimulus data reflects a validity and/or applicability of the code. For example, stimulus data may be identified to facilitate presentation of a first particular shape, color, pattern and/or image size (e.g., a green circle) when the code is valid and applicable and a second particular shape, color, pattern and/or image size (e.g., red X) otherwise. In some instances, part of the stimulus data reflects a validity and/or applicability of the code and part of the stimulus data is identified according to a technique (e.g., pseudo-random selection and/or generation technique) to promote variation of stimuli across user devices.

At block 935a, a transmitter at the client device transmits the stimulus data to the user device, and the receiver at the user device receives the third signal at block 935b. In some instances, the third signal includes additional data, such as a command for the user device to execute that causes the user device to generate a visual stimulus with identified characteristic or one that causes the user device to generate a notification that (for example) audibly or visually instructs a user to show a client agent a display of the device.

Interface engine 812 at the client device may, for example, facilitate a presentation (at the client device) of a visual stimulus that corresponds to the stimulus data and has the identified characteristic. At block 940*b*, interface engine 812 at the user device facilitates a presentation (at the user device) of a visual stimulus that corresponds to the stimulus data and has the identified characteristic. In some instances, facilitating the presentation includes generating a presentation with the identified characteristic (e.g., by identifying one or more intensities, such as RGB or CMYK values, for each pixel or point in a presentation).

In some instances, the visual stimulus presented at the client device can be the same as or similar to the visual stimulus presented at the user device, can share a characteristic (e.g., a color, pattern, image and/or texture) with the visual stimulus presented at the user device and/or can include a characteristic complementary to one of the visual stimulus presented at the user device.

The client device may further present an indication that the code has been confirmed to be valid and applicable. For example, a check mark can be presented over or near the visual stimulus. A lack of an indication that the code has not been confirmed to be valid and applicable (e.g., a lack of a red X near the stimulus) may also serve to indicate the code's validity and applicability. In various embodiments, an indication (e.g., positive or negative indication reflecting a result of a validity and applicability code analysis) may or may not also be presented at the user device. In some instances, the indication is part of the visual stimulus.

It will be appreciated that process 900 is illustrative and various modifications are contemplated. For example, a presentation facilitated at the client device may not depend on the stimulus data and/or may not reflect whether the code is valid and/or applicable. Rather, the presentation may include one that is indicative of a code being valid and applicable.

As another exemplary modification, process 900 may be modified to include a block performed at the user device, parallel to block 930, at which stimulus data is identified. Stimulus data may be identified at each of block 930 and a parallel user device block based on, for example, a current time, a characteristic of the user device (e.g., which may be identified in the second signal) and/or a characteristic of the code. For example, a number may be calculated based on a current time, a date, an operating system on the user device and a last digit in a numeric access-enabling code, and the number may be used to select each of one or more stimulus characteristics.

As another exemplary modification, process 900 may be modified to facilitate a transmission of another signal from the client device to a remote server that includes the code and an identification of a processing that has been performed based on the code and/or a result of such processing. For example, the signal can indicate that the code had been determined to have been valid and/or that a status of the code is to be changed. Generation and/or transmission of such signal may be conditioned upon performance of a defined processing type using the code, detection of a defined processing result (e.g., validity and/or applicability), and/or detection of an input (e.g., indicating that resource access is being granted).

It will be appreciated that the association of particular blocks with the identification of a client or user device is illustrative and that, in some embodiments, particular actions may instead or additionally be performed by another device or system. For example, blocks 920*a*-935*a* may be performed by a remote access management system. As another example, blocks 925 and 930 may be performed by the user device (e.g., and blocks 920*a*-*b* and 935*a*-*b* may be omitted from process 900). As another example, block 940 may be performed by the client device (e.g., and blocks 935*a*-*b* may be omitted from process 900). As yet another example, block 915 may be performed by the client device (e.g., using an identifier of the user device).

It will further be appreciated that a given device (e.g., a user device) can include one or more transmitters, receivers and/or transceivers to transmit and/or receive signals disclosed herein. Use of multiple transmitters, receivers and/or transceivers may, in some instances, facilitate data communication over different types of connections.

Figure 10:
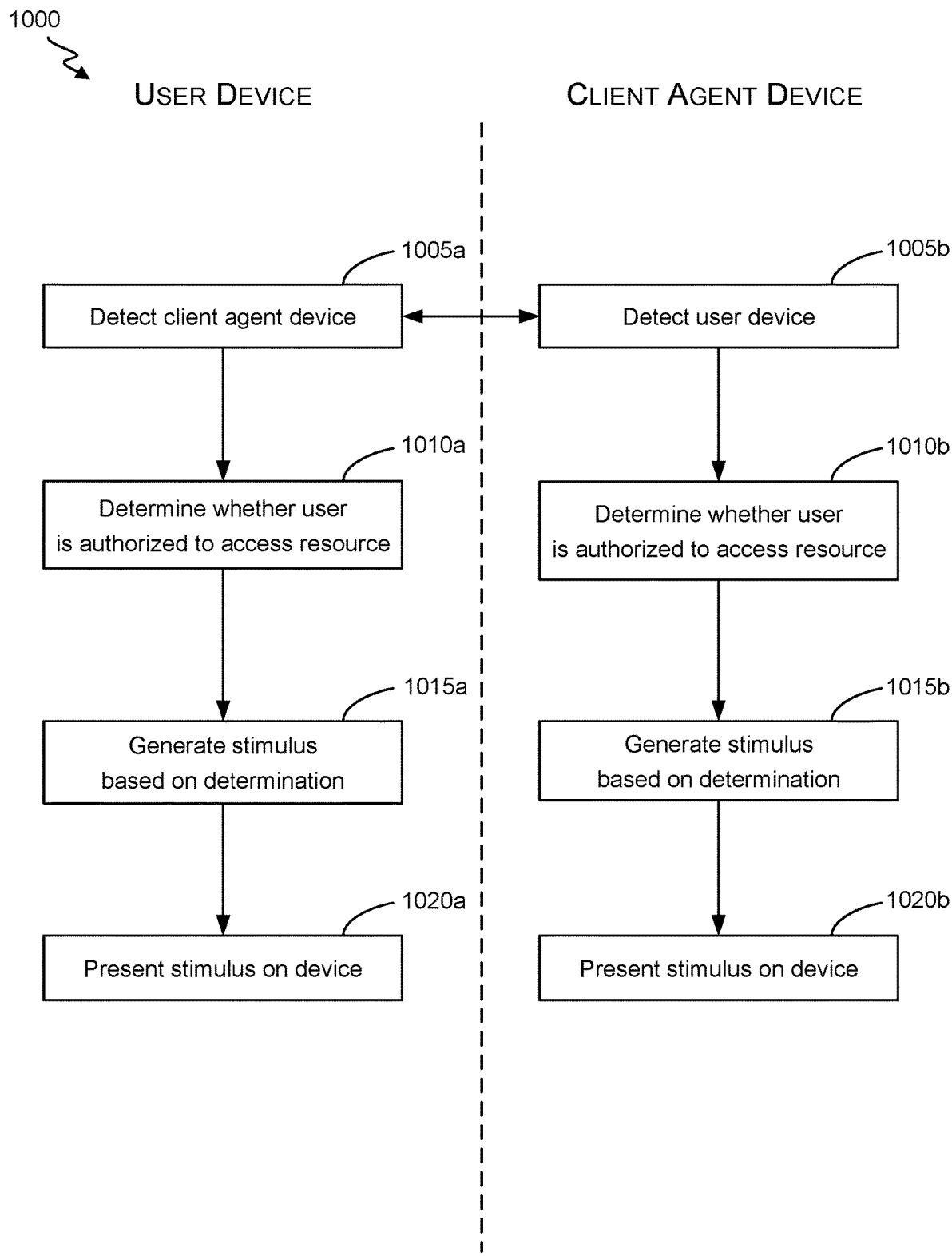
FIG. 10 illustrates a flowchart of an embodiment of a process for generating and presenting corresponding stimuli on user and client agent device.

FIG. 10 illustrates a flowchart of an embodiment of a process 1000 for generating and presenting corresponding stimuli on user and client agent device. Process 1000 begins at blocks 1005*a* and 1005*b*, where a user device and a client agent device detect each other. The devices can detect each other, for example, over a short-range network, such as over a BLE connection. One or both of the user device and client agent device can routinely broadcast transmissions (e.g., BLE transmissions) to alert other devices of its presence and/or other information (e.g., a location of the device).

At block 1010*a*, the user device determines whether a user associated with the user device is authorized to access a resource. In some instances, a current location is used to identify a resource to evaluate in the determination. For example, a user device can determine that it is near the entrance to "Section 11" and thereafter determine whether the device is associated with an access-enabling code that authorizes entrance to Section 11. The determination can be based on, for example, determining whether a data store (e.g., a local data store and/or data store associated with a user device or account) includes data identifying a right to access the resource (e.g., whether a local data store includes an access-enabling code corresponding to the resource), such as whether it includes an access-enabling code. The determination can also or alternatively be based on whether data identifying a right to access the resource is valid (e.g., has not yet been used, is not expired, etc.).

At block 1010*b*, the client agent device similarly determines whether access to the resource is authorized. The determination can be based on determining whether data (e.g., access-right data) exists that associates the user device with an access-enabling code, access right, or other resource-associated data and/or whether such data is valid (e.g., has not been used, includes consistent information and/or has not expired). In some instances, the client agent device queries a different data store than the one queried in block 1010*a*.

In some instances, a determination made in block 1010*a* or 1010*b* is based on data in a communication from the other device. For example, the user device can send locally stored data (e.g., access-right data) or data retrieved from a remote source to the client agent device.

At blocks 1015*a* and 1015*b*, the user device and client agent device generate a stimulus based on the determination. The stimulus can include a visual stimulus, such as an image and/or visual pattern. The stimulus can be indicative of the determination, such that, for example, a stimulus generated at one or both of the user device and client agent device can indicate whether access the resource is authorized or can indicate which resource is authorized for access. In some instances, the stimuli generated at blocks 1015*a-b* are the same and/or include a similar characteristic. In some instances, the stimuli are the same when it is determined that resource access is authorized.

At blocks 1020*a-b*, the user device and client agent device present the respective stimuli. The presentation on one or both devices can, in some instances, be delayed until a presentation criterion is satisfied. For example, the presentation can be delayed until the user device is within a threshold distance from the client agent device and/or until the user device is moved in a particular manner or held in a particular orientation (e.g., corresponding to a movement or orientation common to showing another person a screen of a device). Presentation of a particular stimulus on one or both of the user device and the client agent device and/or consistency between the stimuli can indicate that resource access is to be permitted.

The stimulus can include a visual stimulus, such as an image. In some instances, part or all of the stimulus is dynamic. For example, the stimulus can include a movie or a stimulus presented over a dynamic background. A dynamic background can include, for example, a pattern or image that moves along an axis (e.g., a horizontal, vertical or diagonal axis), that rotates, that jitters or that changes in time. The movement may be continuous (e.g., as in a movie) or can occur via changes happening at defined times (e.g., changing the background every 5 seconds). In one instance, a new stimulus is selected for a background at each of defined times (e.g., every 15 minutes), and between the defined times, the stimulus is moved while serving as a background.

A background stimulus and/or movement of the stimulus may or may not be the same across user devices (e.g., generally or at a given time). For example, a moving background may be indicative of an access-enabling code's validity and/or its applicability for a resource being provided at a given location (e.g., corresponding to the device's location as estimated based on BLE signals). A characteristic of the moving background (e.g., a color of a background stimulus) may be indicative of which section the code is valid for. In some embodiments, the background stimulus may be a sequence or series of images or a motion picture or video. In one specific implementation, a sequence of images may be repeatedly displayed in sequence to represent motion, such as three images representing motion from right-to-left. Displaying the sequence of images out of order, such as displaying the three images so that the motion appears from left-to-right, in embodiments, could be easily recognized by a client agent as different from right-to-left motion Optionally, the background stimulus may, at least in some aspects, relate to an event or venue, and may be indicative of which event or venue a code is valid for. Optionally, a user may define, select, or otherwise provide the background stimulus. For example, the background stimulus may be an image of the user, a sequence of images of the user, or a video of the user. In some embodiments, the client or a client agent may select from a variety of client provided images, image sequences or videos or user provided images, image sequences or video to define which background stimulus indicative of a code's validity, such as for a particular entry point. Optionally, different entry points to a restricted venue may require different background stimuli to indicate a particular code is valid.

An overlay stimulus presented over a background stimulus may include, for example, a barcode, access-right characteristic, picture of a user, pseudo-randomly selected image, spatial/colored pattern, etc. The stimulus can include a background that moves in time. If a person attempts to generate a code or copy another valid code, presentation of the mere code would not be associated with the moving background. Meanwhile, by also including a static overlay (or a static portion that is alongside a dynamic portion), a client agent can take time to scan or assess the static portion.

Optionally, the stimulus may change as a function of time surrounding the period during which an access-enabling code is valid or applicable. For example, in one embodiment, the motion or directionality of motion of the stimulus prior to the access-enabling code being valid or applicable may be different from the period of time during which the access-enabling code is valid or applicable. Alternatively or additionally, the motion or directionality of motion of the stimulus during the time period in which the access-enabling code is valid or applicable may be different from a subsequent period of time after which the access-enabling code is no longer valid or applicable. Further, the motion or directionality of motion of the stimulus prior to the access-enabling code being valid or applicable may optionally be different from the period of after which the access-enabling code is no longer valid or applicable. In this way, a client agent may be able to determine quickly whether or not an access-enabling code even needs to have its validity or applicability checked by observing the motion or directionality of motion of the stimulus. As one specific example, a background stimulus may be stationary before and after an event, during which times valid access codes are not applicable, but during the period before, during and after an event for which the valid access codes are applicable, the background stimulus may move. Other implementations are possible, including where a background stimulus changes direction (e.g., changes from moving left to right to moving right to left, etc.).

The times and/or periods at which the motion or directionality of motion of the stimulus is changed may optionally be defined by the client. For example, a time window before (e.g., 30 minutes, 1 hour, etc.) an event is scheduled to occur may be defined to exhibit the same stimulus motion or directionality of motion as during the event, so as to allow users to enter a restricted area in advance of the start of the event, but not before that time window. Similarly, for example, a time window after (e.g., 30 minutes, 1 hour, etc.) an event is scheduled to occur or end may alternatively or additionally be defined to exhibit the same stimulus motion or directionality of motion as during the event, so as to allow users to enter a restricted area after the event ends, but only for a limited time period.

In some instances, the client agent device further transmits a communication (directly or indirectly) to the user device upon determining whether access to the resource is to be permitted and/or upon receiving an indication that access is to be permitted. In some instances, this communication triggers block 1020*a* or causes a presented stimulus to change (e.g., which can include generating and/or presenting a new stimulus). For example, a check mark can be overlaid on the stimulus if access is granted and an "x" can be overlaid if access is denied.

It will be appreciated that process 1000 (like all processes described herein) can be modified to omit one or more of the depicted blocks and/or to include additional blocks. For example, process 1000 can be modified to omit block 1010*b*. Rather, the determination as to whether a user is authorized to access a resource can be performed at the user device (e.g., only) and a stimulus can reflect a result of the determination. Meanwhile, a stimulus generated on the client agent device can identify what a correct stimulus is to look like (e.g., and may be constant or depend on parameters such as a location, a time, and/or a pseudo-random generation value). A client agent can then determine whether the user is to be granted access depending on whether the images match.

As another example, one or both of the user device and/or client agent device may communicate with a client-control device. The communication can reflect a result of the determination at block 1010a and/or 1010b and/or a control instruction. For example, the client agent device may send an instruction to release a gate/turnstile to turn a set number of times upon determining that the user is authorized to be admitted to a section (along with one or more others).

Figure 11:
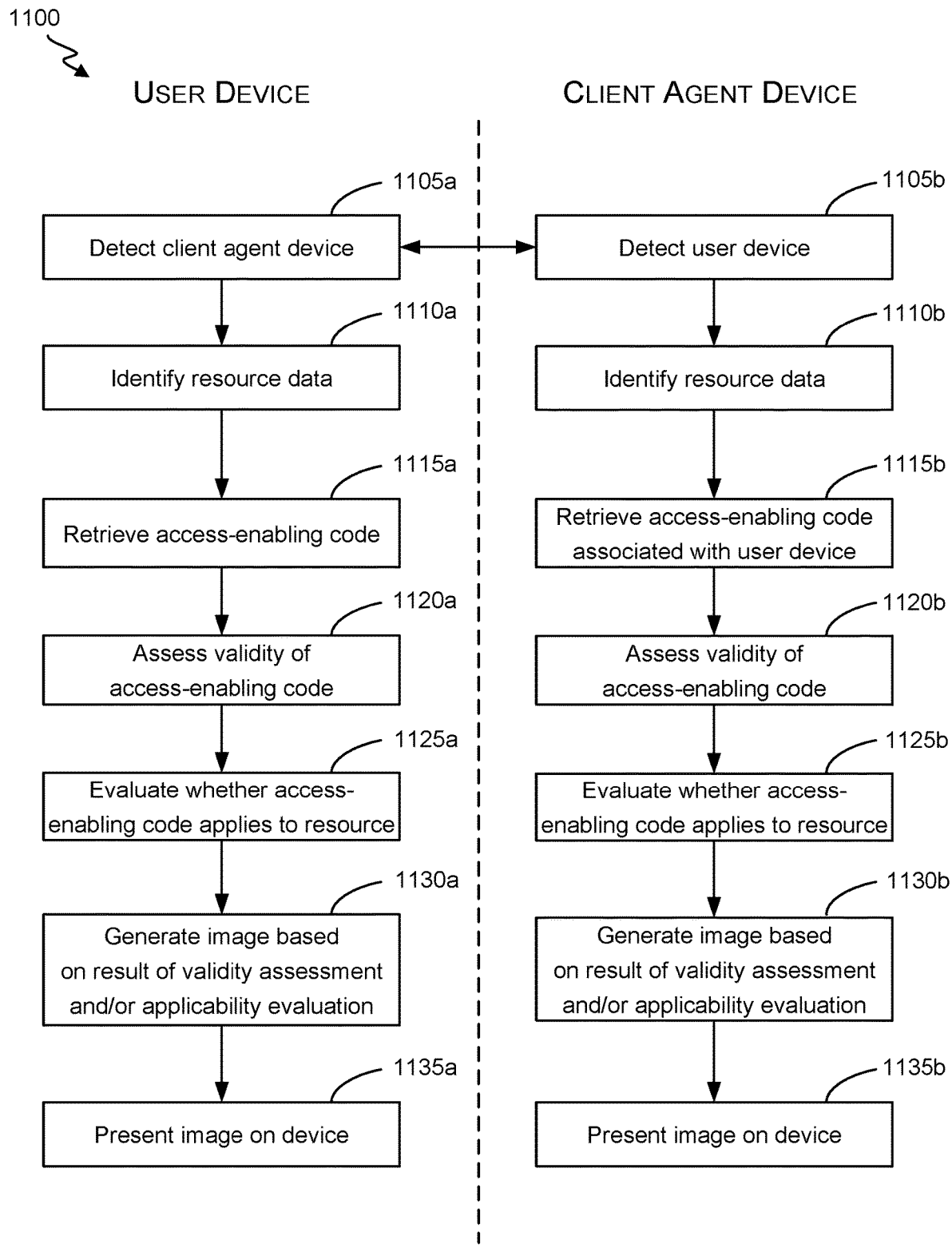
FIG. 11 illustrates a flowchart of an embodiment of another process for generating and presenting complementary stimuli on user and client agent devices.

FIG. 11 illustrates a flowchart of an embodiment of another process 1100 for generating and presenting corresponding stimuli on user and client agent devices. Blocks 1105a-1105b can optionally correspond to blocks 1005a-1005b in process 1000.

At blocks 1110a-1110b, the user device and the client agent device identify resource data. The resource data can include, for example, an identifier of a particular resource, one or more performing entities, a date and/or time of resource availability and/or a location of a resource. In some instances, the resource data includes an identification of one or more sections or other intra-resource distinctions. Such resource data can be identified by identifying resource data that corresponds to a particular location (e.g., a current location) and/or one or more client devices or client agent devices.

At blocks 1115a-1115b, the user device and client agent device retrieve an access-enabling code associated with the user data. The access-enabling code can include one corresponding to resource data (e.g., for an identified event). One or both devices can retrieve the code from a local or remote data store (e.g., via a communication from another device). In some instances, one of the user device and client agent device retrieves the code and transmits it to the other device. The access-enabling code can include data reflecting or a code based on, e.g., a resource, resource availability date and/or time, resource-involved entity, resource location, user device identifier associated with the code, and/or type of access right.

At blocks 1120a-1120b, the user device and client agent device assess whether the access-enabling code is valid. For example, blocks 1120a and/or 1120b can include determining whether an access-enabling code has already been used or whether a first portion of the access-enabling code is consistent with (e.g., the same as, complementary to, according to a defined relationship or otherwise related in a defined manner) another portion of the access-enabling code (e.g., a user device identifier).

At blocks 1125a-1125b, the user device and client agent device evaluate whether the access-enabling code matches the resource data. The evaluation can include, for example, determining whether the access-enabling code corresponds to one for a particular resource, resource-availability date, resource location, etc. (as identified in the resource data) or determining whether at least part of the code represents a specification of the resource.

At blocks 1130a-1130b, each of the user device and the client agent device generate an image based on the validity assessment and/or data-match evaluation. In some instances, one or both of the user device and the client agent device are configured to generate a different image when access-enabling code is valid and matches resource data as opposed to otherwise. In some instances, whether images generated by the user device and client agent device match depends on whether the access-enabling code is determined to be valid and/or to match the resource data.

At blocks 1135a-1135b, the images are presented on the respective devices. A client agent can then be poised to review one or both of the presented images to determine whether access is to be granted, for example, enter a geographic area. In some instances, the image is indicative of particular access authorized. For example, the image can indicate a location for which resource access is authorized.

It will be appreciated that, while depicted process 1100 includes parallel actions occurring at the user device and client agent device, various other action performances are conceived. For example, one or more of the actions shown as being performed by the client agent device may be performed by another type of client device or remote access management system. As another example, only one of user device and/or client agent device may assess a validity and/or evaluate an applicability of a code and/or generate an image. In some instances, a device performing such action(s) can transmit a communication with one or more assessment results and/or the image to the other device.

Figure 12:
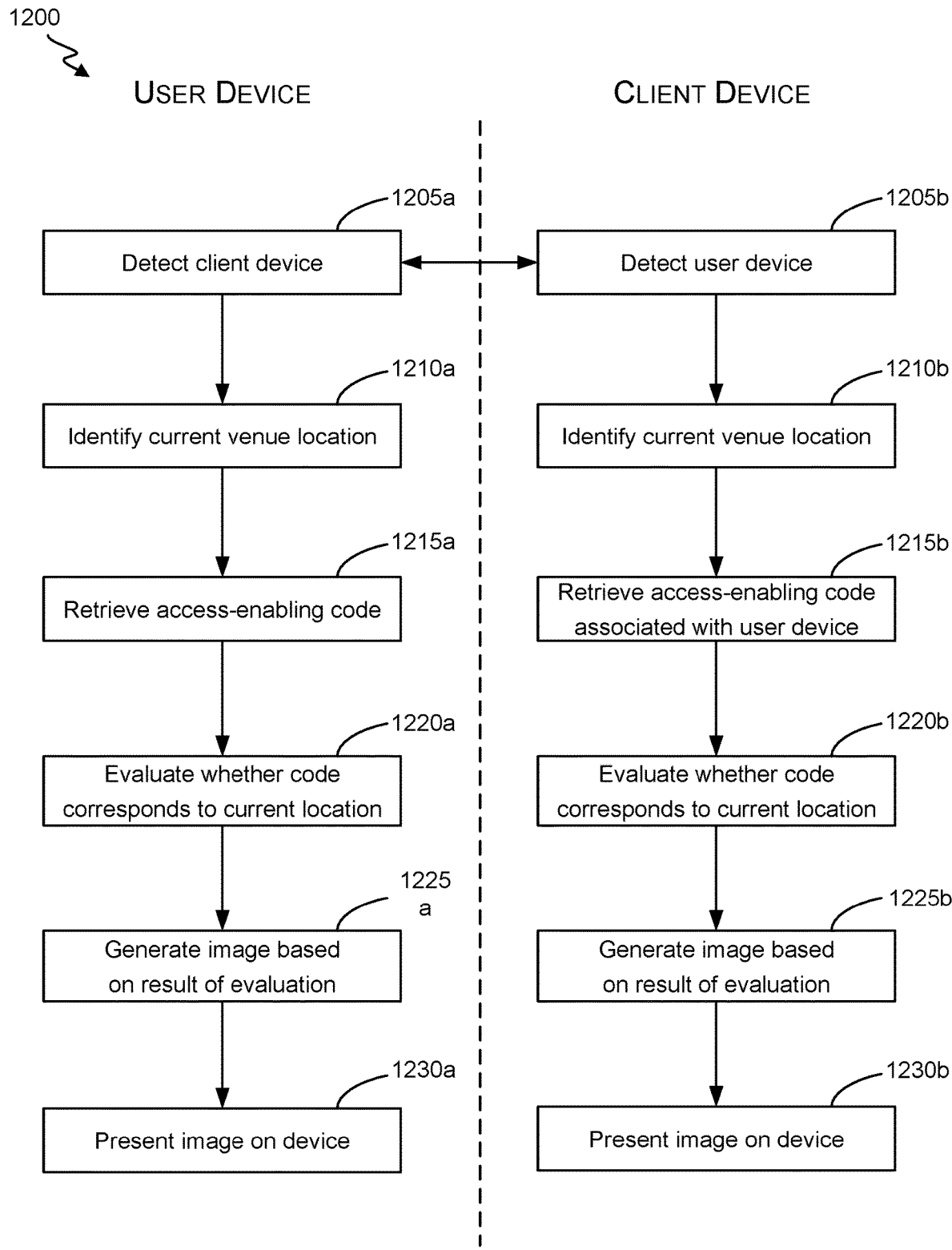
FIG. 12 illustrates a flowchart of an embodiment of another process for generating and presenting corresponding stimuli on user and client agent devices.

FIG. 12 illustrates a flowchart of an embodiment of another process 1200 for generating and presenting corresponding stimuli on user and client agent devices. Various blocks in process 1200 optionally parallel those in process 1100, e.g., blocks 1205a and 1205b.

In process 1200, at blocks 1210a and 1210b, the user device and client agent device identify a current location. The location can include an intra-venue location and/or functional location At blocks 1220a-1220b, the devices determine whether an access-enabling code associated with the user device (e.g., and a particular resource) corresponds to the location. For example, it can be determined whether the access-enabling code reflects, includes or is associated with an identifier of a section or zone associated with the location. The images can then be generated, at blocks 1225a-1225b, based on a result of this evaluation and presented, at blocks 1230a-1230b.

Figure 13:
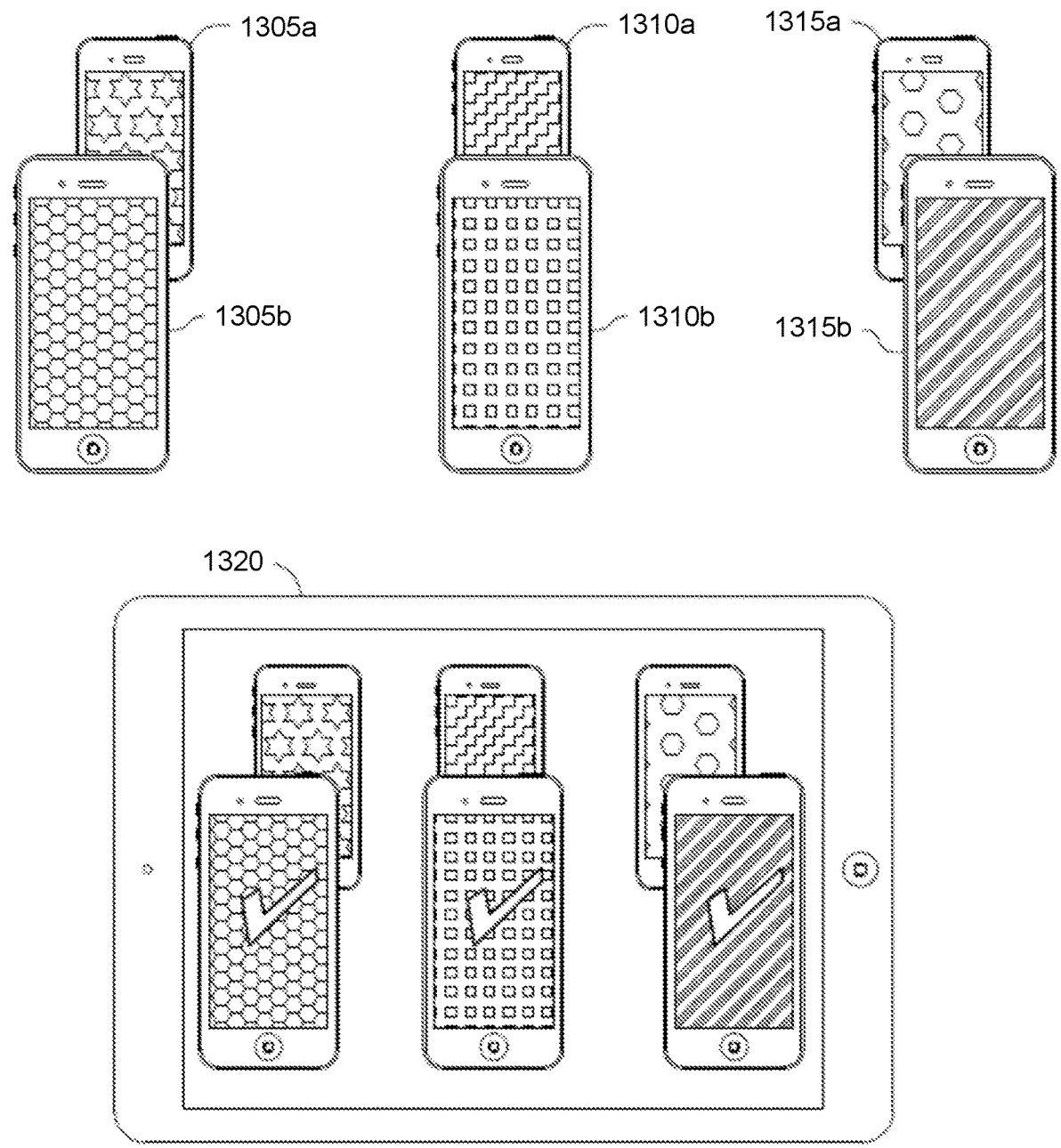
FIG. 13 illustrates stimuli that can be generated and presented using a technique described herein according to an embodiment of the invention.

FIG. 13 illustrates stimuli that can be generated and presented using a technique described herein according to an embodiment of the invention. In this illustration, each of devices 1305a-b, 1310a-b and 1315a-b is a user device. Each device is associated with an access-enabling code that corresponds to an access right to access a resource at a particular location.

Upon detecting a client agent device 1320, each user device can transmit information (e.g., an identifier of the device or an access-enabling code) to client agent device 1320. Client agent device 1320 can then evaluate, based on the information, whether a user associated with the device is to be granted access to a resource. For example, a code can be evaluated for validity and applicability.

One or both of client agent device 1320 can identify stimulus data for the user device that identifies a stimulus or stimulus characteristic for presentation at the user device and/or for presentation at client agent device 1320 (so as to identify the particular user device). In instances where only one device identifies the stimulus or stimulus characteristic, the one device can transmit the stimulus, stimulus characteristic and/or identification thereof to the other device.

Stimulus data may or may not depend on a result of the evaluation of the code. In one instance, the stimulus data may be identified so as to facilitate variability in stimuli across user devices. For example, a pattern in a set of patterns can be pseudo-randomly selected or selected in an ordered manner.

The stimulus can be presented on client agent device 1320 along with an indication as to whether the code was determined to be valid and applicable. For example, a check mark can indicate that the code was determined to be valid and applicable, while an X can indicate that the code was determined to not be valid and applicable.

When an indication represents that a code is valid and applicable to a current circumstance, a client agent can identify a user device presenting a same, similar, corresponding or complementary stimulus and can then grant resource access to the user of the device. When an indication represents not valid and/or not applicable for a current circumstance, a client agent can identify a user device presenting a same, similar, corresponding or complementary stimulus and can then deny resource access to the user of the device.

This illustration exemplifies two security features of embodiments of the invention. First, the stimulus presentation that will ultimately be reviewed by a client agent can be delayed until a user is near the agent. This limits the time that the user may have to manipulate and/or review the stimulus. Second, the stimulus presentation can vary across user devices. Thus, even if a user manipulates her device to present a stimulus corresponding to an authorizing image on a friend's device, the client agent device would not detect the appropriate information from her device to generate the same image, and so a stimulus on the client agent device would not match the one on the user's device.

Figure 14:
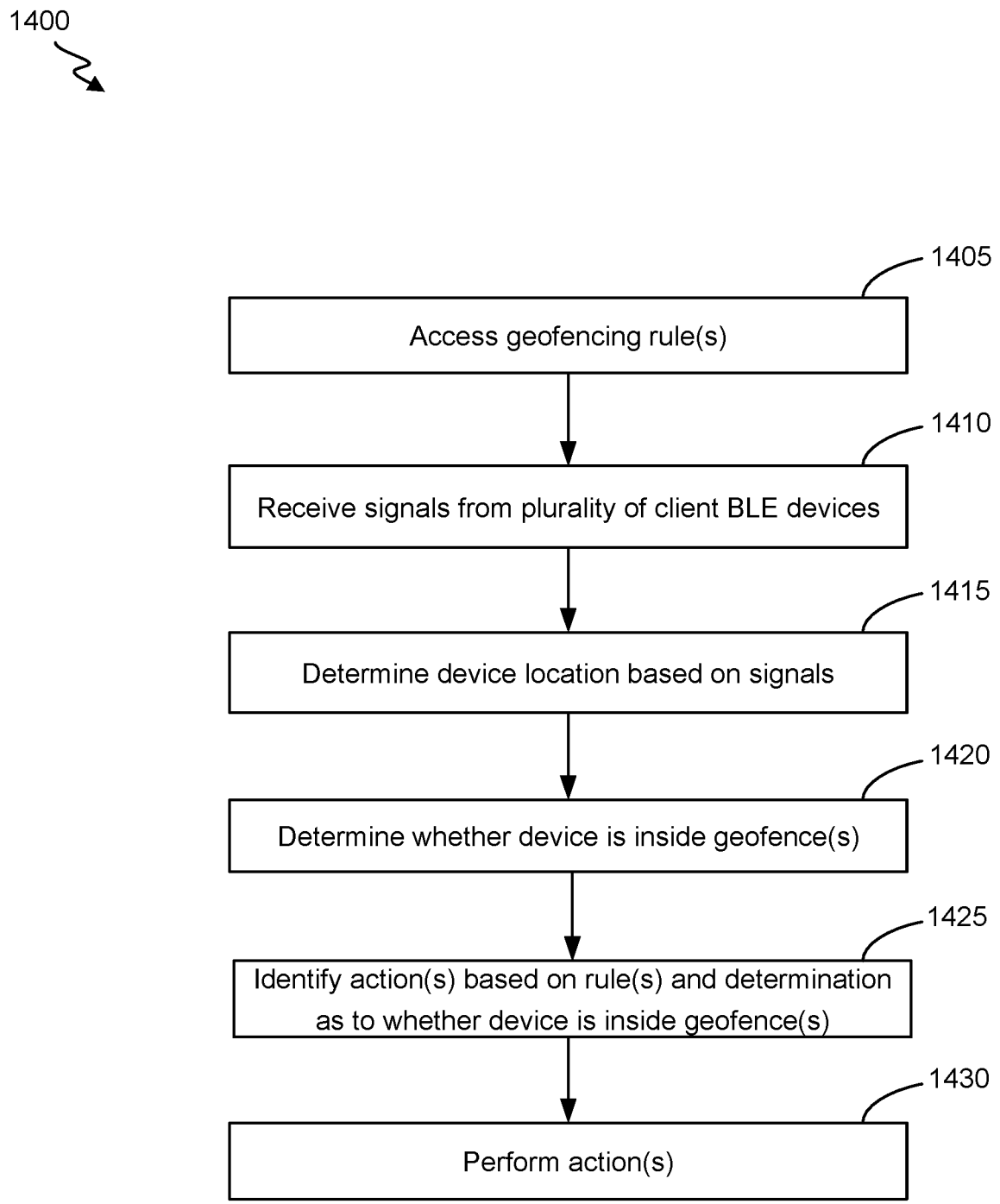
FIG. 14 illustrates a flowchart of an embodiment of a process for using device communication to enforce geofencing rules.

FIG. 14 illustrates a flowchart of an embodiment of a process 1400 for using device communication to enforce geofencing rules. Process 1400 can be performed in part or in its entirety by a user device.

Process 1400 begins at block 1405, where one or more geofencing rules are accessed. Each of the one or more geofencing rules can be associated with, for example, a resource, a resource-associated location, a time period and/or a type of resource access. For example, the one or more geofencing rules can include those determined to be applicable to a particular user device given an access-enabling code associated with the device. The geofencing rule(s) can be defined in part or in full, for example, by an entity associated with a resource-associated structure, a performing act, a concession operation and/or an access management system.

Each geofencing rule can define a geofence and can identify an action consequence of being inside the geofence, being outside of the geofence, and/or crossing the geofence (generally or in a particular direction). For example, a geofence can be defined as a perimeter, an area, a set of geographic coordinates, a distance from a point location, and/or a functional distance (e.g., being inside the fence so long as the user device can communicate with a particular client device over a certain short-range communication channel, such as BLE or Bluetooth).

At block 1410, a signal can be received from each of one or more client devices. The one or more client devices can include a device at a fixed location and/or a mobile device. Each of the one or more client devices can each be associated with a known location. For example, a map, table or other data structure identifying a location of each of the one or more client devices can be transmitted to and/or stored on the user device upon (for example) arriving at a resource location, validating an access-enabling code, passing of a time relative to a resource access time, etc. As another example, the signal received from a device of the one or more client devices can identify the location of the client device. Each signal can include a short-range signal such as a BLE signal.

At block 1415, a location of the user device can be determined based on the signals. For example, the determination can include performing a triangulation technique based on a time delay and/or signal strength of each of the receives one or more signals. As another example, a user device location can be estimated to be a location of a client device of the one or more client devices for which a signal having a defined characteristic was received. To illustrate, a user device may receive signals from three client devices, and a location of the user device may be approximated to be a location of one of the three client devices corresponding to a signal having a shortest latency amongst the received three signals. The position can include estimated geographic coordinates, a section identifier, an intra-venue location or a location relative to one or more client devices or position features (e.g., 10 feet from Concession Stand #5).

At block 1420, the device location can be used to determine whether the device is inside a geofence (or is outside a geofence or crossed a geofence). At block 1425, one or more actions can be identified based on the geofencing rule(s) and determination. The action can include presentation of a stimulus, such as a visual stimulus, which can include an offer and/or information. For example, a geofencing rule can indicate that an offer is to be presented when a user has crossed into a geofence or that navigation assistance is to be offered while a user is inside a geofence. At block 1430, the one or more actions are performed.

It will be appreciated that, as with all depicted and described processes herein, process 1400 is illustrative and modifications including fewer, additional and/or changed actions are contemplated. For example, block 1415 may be omitted from process 1400, and a determination as to whether a device is within a geofence can be made based on whether the user device can communicate with a particular client device.

In various embodiments, user devices may be implemented as a variety of devices including, but not limited to, a smartphone device, a wristband device, a wireless keycard device, a wireless fob device, and the like. In various aspects, the user devices described herein may be assembled at a location or venue in real-time and provided to users on demand immediately after assembly. In some embodiments, the user device is provided as a wireless device included on a card or sticker and placed on or otherwise fixed to an attachment device, such as a wristband or fob. In some embodiments, the user devices can advantageously receive data over a short-range wireless connection, to allow the user devices to store access credentials, biometric credentials, and/or other access-right related information associated with the user. Client devices and related systems may optionally interact with the user devices in order to obtain the access credentials, biometric credentials, and/or other access-right related information associated with the user and store this information to the user's device or read this information from the user's device for verification and/or access control purposes.

Figure 15A:
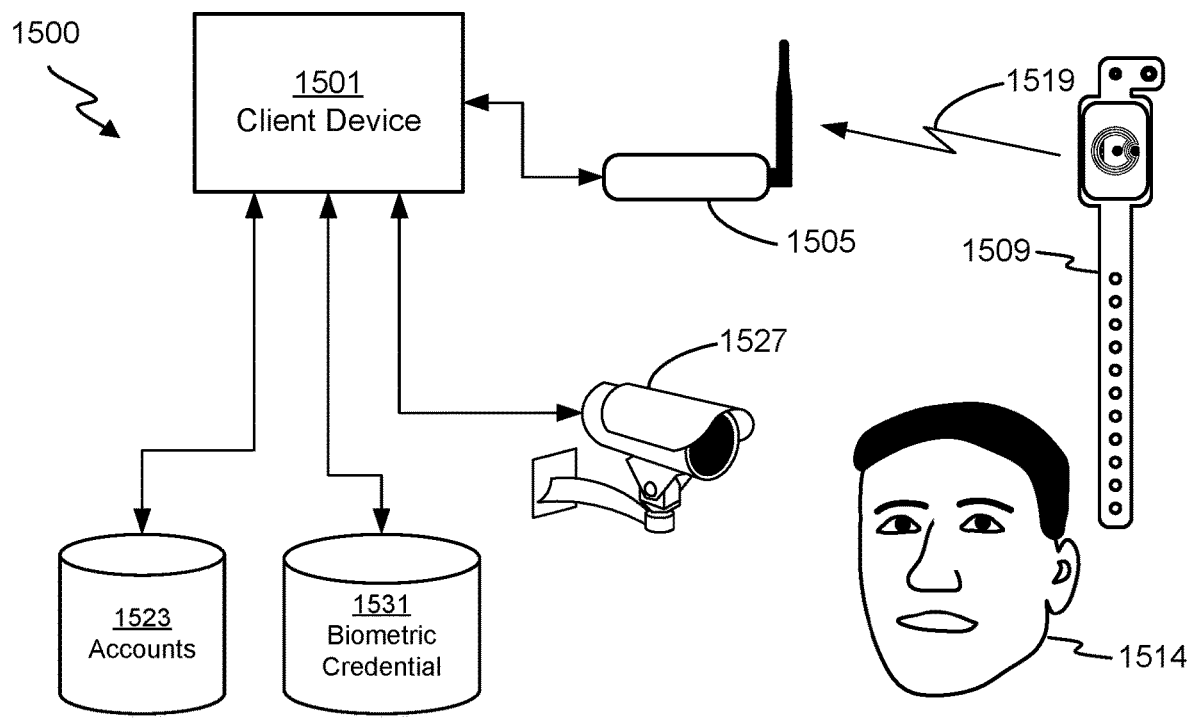
FIG. 15A illustrates example components of a resource access-facilitating interaction system for obtaining biometric credentials.

FIG. 15A illustrates example components of a resource access-facilitating system 1500 for obtaining biometric credentials. Client device 1501 may correspond to any of client agent device 170, client register 160 or client point device 165 illustrated in FIG. 1. Client device 1501 may further correspond to intermediate system 150 or access management system 185 illustrated in FIG. 1, depending on the specific configuration. Client device 1501 may include or be in data communication with a short-range transceiver 1505, useful for short-range wireless communications with user device 1509. User device 1509 is illustrated as a wristband including a short-range wireless device, such as a BLE device, a radio frequency identifier device or a near field communication device. In some cases, the short-range wireless device is incorporated into user device 1509 as part of the manufacturing or assembly process. The short-range wireless device may, in real-time, be generated, modified, created, or otherwise assigned to authorized user 1514, and applied and/or attached to user device 1509 shortly thereafter. As examples, the short-range wireless device may be applied to the user device 1509 as a sticker, or may be attached to user device by passing user device 1509 through openings in a card containing the short-range wireless device.

When brought into proximity of short-range transceiver 1505, communication with user device 1509 may be established. In embodiments, the communication may be one-way or two-way. Two-way communication may be useful for retrieving information from and/or storing information in user device 1509. As an example, in response to detecting a wireless signal from short-range transceiver 1505, user device 1509 may transmit a wireless signal 1519, which may include information stored within user device 1509, such as a device identifier, or other device or user information. Upon initial configuration, client device 1501 may use the device identifier included in wireless signal 1519 to associate the user device 1509 with the user 1514 or a user account stored in account data store 1523. In this way, the device identifier may be used at a later time to look up an identifier for the user 1514 or user's account, or retrieve other information associated with the user 1514, such as an access-enabling code, a biometric credential, etc.

As used herein, a biometric credential refers to a piece of identifying information about a user that is representative of a physical, biophysical or biological characteristic of the user. Exemplary biometric credentials include, but are not limited to, fingerprints, palm prints, retinal scans, iris scans, facial images, voice prints, and other biometric characteristics known in the art. A biometric credential further includes information that may be derived from a biometric characteristic, such as an encoded or encrypted version of the biometric characteristic. As an example, a fingerprint may be a biometric credential. As another example, information derived from a fingerprint may be a biometric credential, such as a numerical value representative of a unique pattern in the fingerprint. Biometric credentials are useful for later reidentification of a user, such as in an identity challenge, by comparing the biometric credential to the user or a newly obtained biometric credential from the user.

Client device 1501 may further include or be in data communication with one or more biometric capture devices. As illustrated, client device 1501 is in communication with a camera 1527, which may be used to obtain a facial image of authorized user 1514. It will be appreciated that other biometric capture devices can be incorporated into, attached to, or otherwise in communication with client device 1501, such as fingerprint or palm print scanners, iris scanners, retinal scanners, microphones, such as for voice recognition, and the like. Optionally, client agent may activate the biometric capture device in order to obtain a biometric credential from the authorized user 1514 for the first time. Optionally, client device 1501 may prompt authorized user to activate the biometric capture device, such as through a user interface of client device 1501. Optionally, client device 1501 may activate the biometric capture device and obtain the biometric credential. Client device 1501 may store the obtained biometric credential, here a facial image, in biometric credential data store 1531, and may facilitate creation of an association between the facial image of the authorized user 1514 with the device identifier of user device 1509 or user's account, an access-enabling code, etc. Client device 1501 may also use the device identifier to determine a specification of a limited-access resource, which may, in turn, be used to determine an access-enabling code for the user.

As will be appreciated by the skilled artisan, client device 1501 may include or be in data communication with, such as using one or more intermediate networks and/or other devices, short-range wireless transceiver 1505, account data store 1523, camera 1527, and/or biometric credential data store 1531.

Figure 15B:
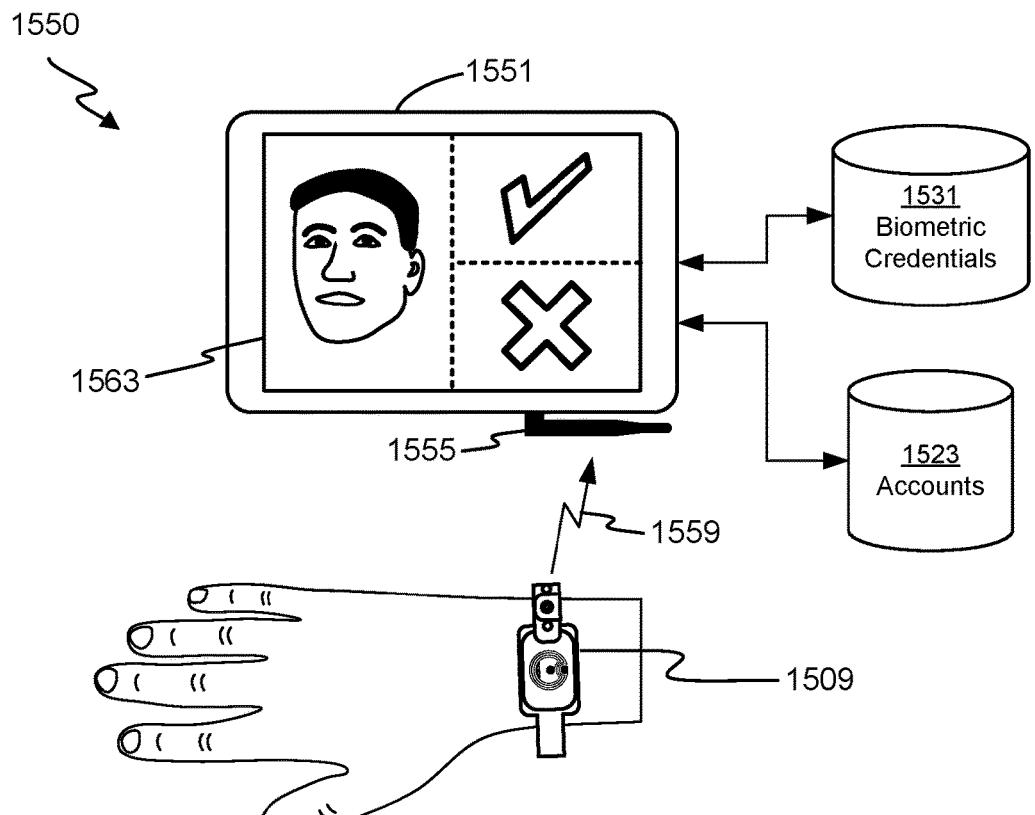
FIG. 15B illustrates example components of a resource access-facilitating interaction system for verification of biometric credentials.

FIG. 15B illustrates example components of a resource access-facilitating interaction system 1550 for verification of biometric credentials. Client device 1551 may be constructed and/or operate similarly to client device 1501 described with reference to FIG. 15A. As illustrated in FIG. 15B, client device 1551 is useful for verifying the identity of the user, such as by challenging the user against the biometric credentials stored in biometric credential data store 1531.

As illustrated, client device 1551 includes an antenna 1555, which may be a portion of or associated with a short-range transceiver included in client device 1551. Upon being brought into proximity with antenna 1555, user device 1509 may detect a wireless signal transmitted by client device 1551 and, in response, transmit wireless signal 1559, which may include the device identifier of user device 1509. The device identifier of user device 1509, may be used by client device 1551 to retrieve a stored biometric credential from biometric credential data store 1531, to query account data store for user account information, or to query another data store, such as for an access-enabling code data store assigned to the authorized user 1514 and/or the user device 1509, etc.

Client device 1551 further includes a display 1563, such as a touchscreen display, for presenting an identity challenge against the user possessing device 1509, such as to verify the user's identity or otherwise prevent unauthorized access. Client device 1551 may query biometric credential data store 1531 using the device identifier of user device 1509 to obtain the stored facial image of authorized user 1514. The retrieved image may be displayed on display 1563 of user device, and a client agent may verify that the user's appearance matches that shown on the display.

Although described in terms of comparison by a client agent, it will be appreciated that comparison may be performed, such as by a client device or other intermediate system that may include a biometric capture device to obtain a new biometric credential from the user in real-time at the moment of the challenge.

In some embodiments, biometric credentials may be obtained by a client device without user interaction. For example, cameras stationed at traffic bottlenecks, such as turnstiles, gates, lockable doors or other entry or limited traffic flow points, can be used to monitor users entering a restricted location and obtain facial images of the users. The facial images may optionally be match to the user by identifying a location of a user device associated with the user in space and time and determining that a particular facial image of a user matches the location and time observed for the user's device.

Figure 16:
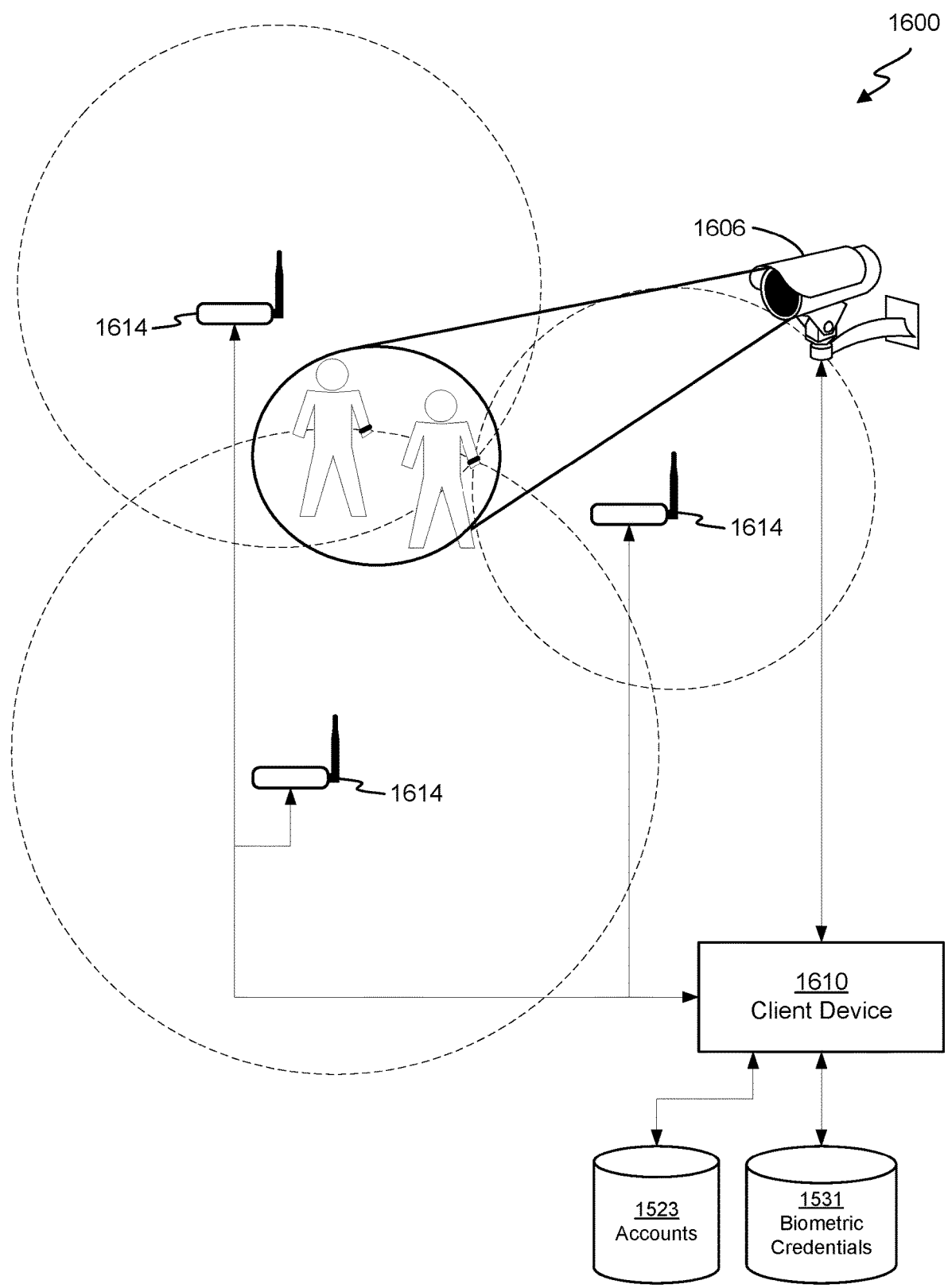
FIG. 16 illustrates example components of a resource access-facilitating interaction system for locating electronic devices and obtaining biometric credentials.

FIG. 16 illustrates example components of a resource access-facilitating interaction system 1600 for locating electronic devices and obtaining biometric credentials. Here, the authorized users 1601 and 1602 are present in view of camera 1606, which is included in or otherwise in data communication with client device 1610. Camera 1606 may provide images of users, such as in the form of a video feed to client device 1610

Locations of the user devices possessed by authorized users 1601 and 1602 may be determined by a location engine that is included in otherwise in data communication with client device 1610. It will be appreciated that any of a variety of locating techniques are useful with system 1600. As illustrated, client device includes or is otherwise in data communication with one or more short-range wireless transceivers 1614, which may be deployed in the vicinity of camera 1606 and used by the location engine for wireless triangulation of the user devices possessed by authorized users 1601 and 1602. Timing information may optionally be included in the location information determined by location engine or may be determined separately.

The location information obtained by location engine may be combined at client device 1610, such as a by a matching engine, with the video feed from camera 1606 to match, for example, an image of authorized user 1601 with the location of the user device and/or to associate the user 1601 with the image and the user device. For example, timestamps of the video feed may be matched with the timestamps and locations of the user devices to particularly determine which user possesses which device. Client device 1610 may store the image and in one or more data stores, such as biometric credential data store 1531, and may optionally associate the image with other stored information, such as a device identifier, account identifier, user identity or other information that may be stored in a data store, such as account data store 1523.

Such a technique may be useful for particularly distinguishing two authorized users 1601 and 1602 from one another when obtaining biometric credentials (e.g., facial images) of the authorized users 1601 and 1602. Further, this technique advantageously allows for more quickly obtaining a biometric credential from a user, such as with minimal interruption or participation from the user. Such a technique can further be enhanced when the camera 1606 is placed at a natural or artificial traffic bottleneck or choke point that can minimize the number of users simultaneously imaged by camera 1606, like an access control point, turnstile, locked gate, etc.

Figure 17:
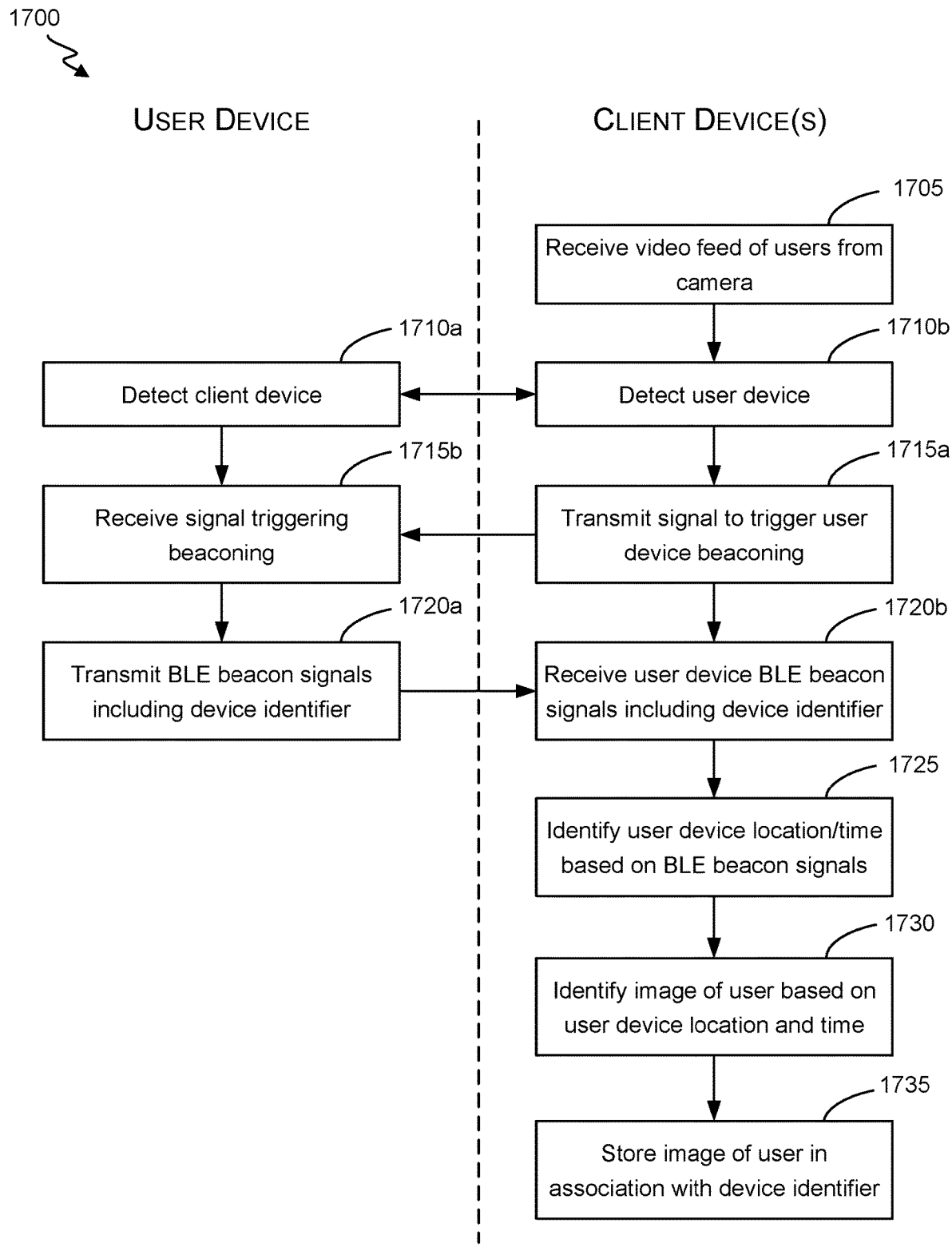
FIG. 17 illustrates a flowchart of an embodiment of a process for obtaining biometric credentials based on user device location.

FIG. 17 illustrates a flowchart of an embodiment of a process for obtaining biometric credentials based on user device location. Initially, a video feed of users is obtained at block 1705. At block 1710a the user device detects the client device and the client device detects the user device at block 1710b. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals are used for the communication exchanges illustrated in FIG. 17.

In order for the location of the user device to be determinable by a wireless triangulation technique, the user device may either locate itself or the location of the user device may be determined by the client device. A user device may optionally locate itself using a variety of techniques, including GPS-based techniques, Wi-Fi-based techniques, BLE proximity based techniques, and the like. In embodiments where the user device locates itself, it may communicate this information to the client agent device, which may then use this information for additional purposes.

Alternatively or additionally, the client device may locate the user device. In the embodiment illustrated in FIG. 17, at block 1715a, the client agent device transmits a signal to user device to trigger the user device to transmit beacon signals, which can be used for locating the user device. The trigger signal may optionally include a time duration for the beaconing. Optionally, a further signal indicating that the user device is to stop beaconing may be transmitted by the client agent device and received at the user device. Alternatively, the user device may stop beaconing after a preset time. The trigger signal is received, at block 1715b, by user device and, at block 1720a, the user device begins transmitting beacon signals, such as BLE beacon signals, which optionally include a device identifier for the user device, allowing the beacons from the user device to be distinguishable from beacons from other user devices. At block 1720b, one or more BLE beacon signals are received by wireless transceivers of the client device, which may be used, at block 1725, to identify the location of the user device (e.g., as identified by a location engine of the device). The location may also provide time information associated with the location. At block 1730, an image of the user is identified based on the location/time of the user device, such as by a matching engine of the user device. At block 1735, the image of the user is stored in association with the user device identifier to allow for later retrieval and/or comparison with the user.

This process can advantageously allow for images of users to be matched to the user with minimal user interaction other than possessing the user device. By obtaining the images of the user at a location where the user is likely to slow down, such as a traffic bottleneck, multiple images and/or more clear images of the user can be obtained. The process can be further automated, allowing for a user account to be updated with a current image of the user in real-time for later comparison at a credential or identity challenge.

It will be appreciated that, as with all depicted and described processes herein, process 1700 is illustrative and modifications including fewer, additional and/or changed actions are contemplated. For example, blocks 1715a and 1715b may be omitted from process 1700, and the user device can periodically transmit beacon signals or beacon type signals to discover nearby client devices. Alternatively or additionally, the user device can transmit beacon signals upon activation of an application present on user device, such as an application specific for interaction with a client system.

Figure 18A:
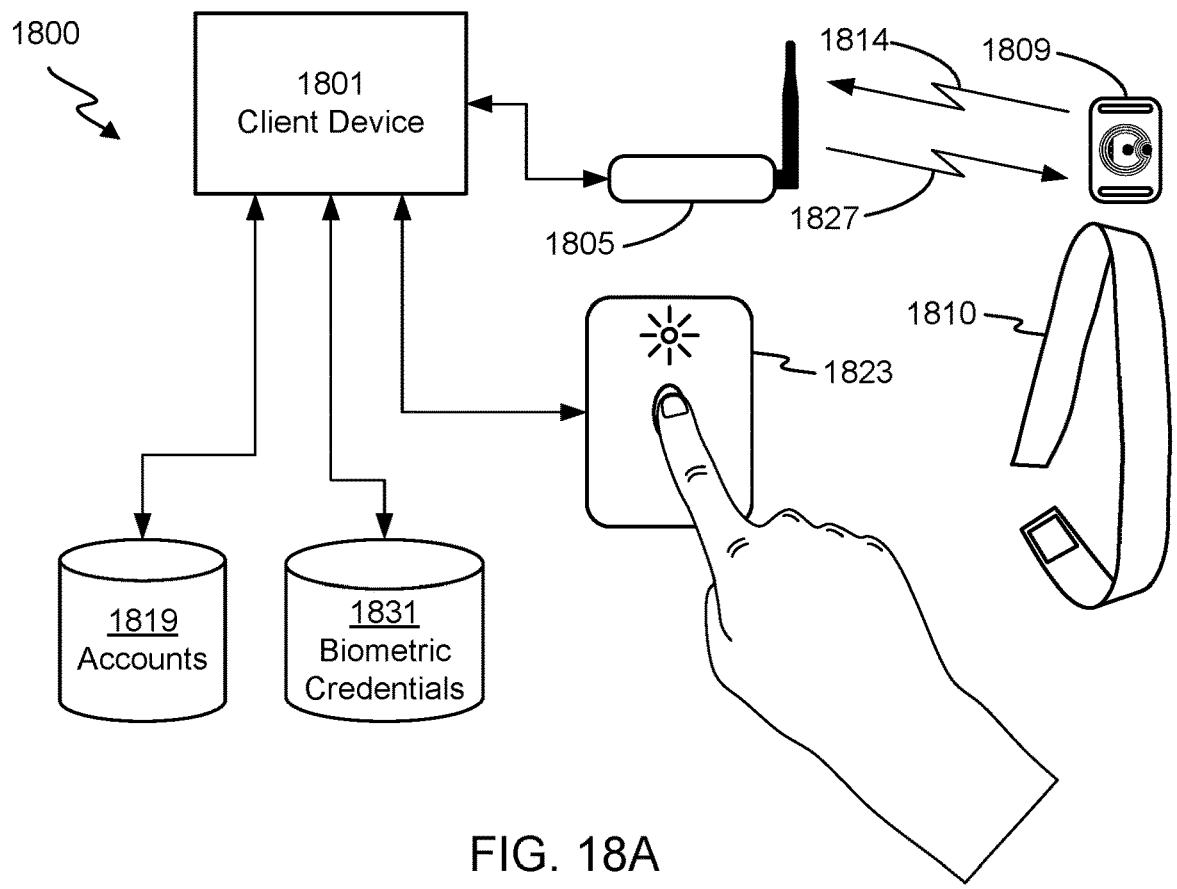
FIG. 18A illustrates example components of a resource access-facilitating interaction system for obtaining biometric credentials.

FIG. 18A illustrates example components of a resource access-facilitating system 1800 for obtaining biometric credentials. Client device 1801 may correspond to any of client agent device 170, client register 160 or client point device 165 illustrated in FIG. 1. Client device 1801 may further correspond to intermediate system 150 or access management system 185 illustrated in FIG. 1, depending on the specific configuration. Client device 1801 may include or be in data communication with a short-range transceiver 1805, useful for short-range wireless communications with user device 1809. User device 1809 is illustrated as a card including a short-range wireless device, such as a BLE device, a radio frequency identifier device or a near field communication device, with apertures for attaching the card to a strap. In some cases, the short-range wireless device is incorporated into user device 1809 as part of the manufacturing or assembly process. The short-range wireless device may, in real-time, be generated, modified, created, or otherwise assigned to an authorized user, and applied and/or attached to user device 1809 shortly thereafter. As examples, the short-range wireless device may be applied to the user device 1809 as a sticker, or may be attached to user device by passing a strap through openings in user device 1810 when implemented as a card containing the short-range wireless device.

When brought into proximity of short-range transceiver 1805, communication with user device 1809 may be established. Here, the communication are two-way, allowing transmission of data from the short-range transceiver 1805 to user device 1809 for processing and/or storage by user device 1809. As an example, in response to detecting a first wireless signal from short-range transceiver 1805, user device 1809 may transmit a wireless signal 1814, which may include information stored within user device 1809, such as a device identifier, or other device or user information.

Upon initial configuration, client device 1801 may use the device identifier included in wireless signal 1814 to associate the user device 1809 with the user or a user account stored in account data store 1819. In this way, the device identifier may be used at a later time to look up an identifier for the user or user's account, or retrieve other information associated with the user, such as an access-enabling code, a biometric credential, etc. Client device 1801 may also use the device identifier to determine a specification of a limited-access resource, which may, in turn, be used to determine an access-enabling code for the user (e.g., by way of an access-right determination engine).

Client device 1801 further includes or is otherwise in data communication with one or more biometric capture devices. As illustrated, client device 1801 is in communication with a fingerprint reader 1823, which may be used to obtain a fingerprint from an authorized user. It will be appreciated that other biometric capture devices can be incorporated into, attached to, or otherwise in communication with client device 1801, such as cameras, palm print scanners, iris scanners, retinal scanners, microphones, such as for voice recognition, and the like. Optionally, client agent may activate the biometric capture device in order to obtain a biometric credential from the authorized user for the first time. Optionally, client device 1801 may prompt authorized user to activate the biometric capture device, such as through a user interface of client device 1801. Optionally, client device 1801 may activate the biometric capture device and obtain the biometric credential. Fingerprint reader 1823 may include an indicator of successful or unsuccessful capture of fingerprints from the user, such as a light or other notification device, as will be appreciated by the skilled artisan.

Client device 1801 may facilitate transmission of a further wireless signal 1827, e.g., by using a communication engine of client device and short-range transceiver 1805, to be received by user device 1809, such as a further wireless signal 1827 that includes the biometric credential (i.e., the fingerprint or data derived therefrom). The biometric credential may be then stored by user device 1809 for later presentation and/or recall.

Further, client device 1801 may also obtain an access-enabling code for the user, such as using techniques described previously, and provide the access-enabling code to the user device, such as with one or more short-range wireless signals.

Client device 1801 may optionally store the obtained biometric credential in biometric credential data store 1831, and may facilitate creation of an association between the fingerprint or data derived therefrom of the authorized user with the device identifier of user device 1809 or user's account, an access-enabling code, etc.

As will be appreciated by the skilled artisan, client device 1801 may include or be in data communication with, such as using one or more intermediate networks and/or other devices, short-range wireless transceiver 1805, account data store 1819, fingerprint reader 1823, and/or biometric credential data store 1831.

Figure 18B:
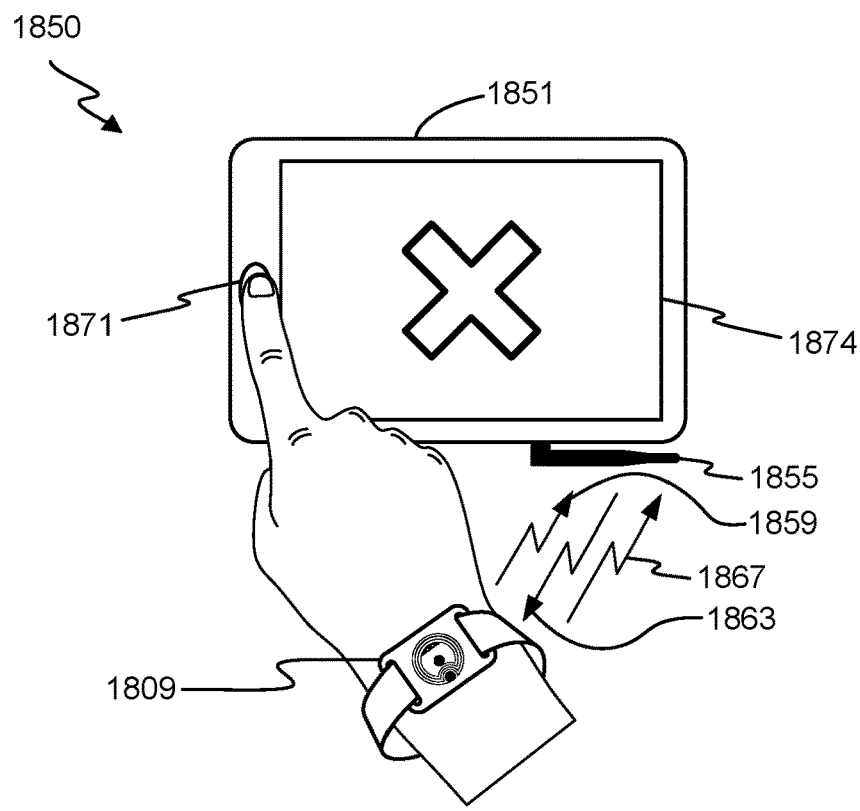
FIG. 18B illustrates example components of a resource access-facilitating interaction system for verification of biometric credentials.

FIG. 18B illustrates example components of a resource access-facilitating interaction system 1850 for verification of biometric credentials. Client device 1851 may be constructed and/or operate similarly to client device 1801 described with reference to FIG. 18A. As illustrated in FIG. 18B, client device 1851 is useful for verifying the identity of the user, such as by challenging the user against the biometric credentials stored in biometric credential data store 1831.

As illustrated, client device 1851 includes an antenna 1855, which may be a portion of or associated with a short-range transceiver included in client device 1851. Upon being brought into proximity with antenna 1855, user device 1809 may detect a short-range wireless signal transmitted by client device 1851 and, in response, transmit short-range wireless signal 1859, which may include the device identifier of user device 1809. In response, client device may transmit a second short-range wireless signal 1863, such as a signal that includes a biometric credential request. As a response to the request, the user device 1809 may transmit a third short-range wireless signal 1867 that includes the stored biometric credential. Alternatively, user device 1809 may transmit the biometric credential immediately after or as part of the first short-range wireless signal 1859. Alternatively or additionally, user device 1809 may treat an acknowledgment signal, which may optionally be transmitted by client device 1851, as a biometric credential request.

Upon receiving the third short-range wireless signal 1867 including the biometric credential, the client device 1851 may present a challenge to the user to verify the user's identity against the biometric credential. As illustrated, client device 1851 includes a biometric capture device, such as a fingerprint reader 1871. The client device may include a comparison engine for comparing the new fingerprint obtained by fingerprint reader 1871 with the fingerprint received from client device 1851. Such a configuration may advantageously allow for simplification of the client device 1851, as this device may not need to include or be in data communication with the biometric credential data store 1831. As will be appreciated by the skilled artisan with reference to the preceding disclosure, verification of an access right may further be performed to ensure that not only is the user verified, but that the user has a valid access right.

In an exemplary embodiment, the fingerprint stored on user device 1809 corresponds to that obtained at the initial time of configuration of user device 1809, which may have been performed with the aid of a client agent and, thus, the stored fingerprint has been previously authenticated as belonging to the authorized user, making the subsequent comparison illustrated here a valid identity challenge.

Client device 1851 further includes a display 1863, such as a touchscreen display, for presenting results of the identity challenge against the user possessing client device 1809. Although described in terms of automatic comparison by the client device, it will be appreciated that manual comparison may be performed, such as by a client agent. For example, the client device 1851 can present the biometric credential (e.g., a photograph via display 1863 or a voice recording via a speaker) for direct comparison with the user by a client agent. Optionally, input may be provided via a touchscreen display by the client agent to confirm the identity of the user.

Further, client device 1851 may also obtain and/or verify an access-enabling code for the user, such as using techniques described previously, to confirm whether the user has a valid access right for a particular location, venue, etc.

Biometric credentials obtained and optionally stored on a user device are useful for a variety of purposes. As one example, a user can be compared with biometric information stored on the user device, such as in an identity challenge, to confirm that the user in possession of the user device is the authorized user associated with the biometric information stored on the device and that the device has not been lost, stolen or otherwise provided to an unauthorized user. The identity challenge can also be useful for allowing a client system to create or update data records associated with the user, such as for tracking or other account management purposes.

Figure 19:
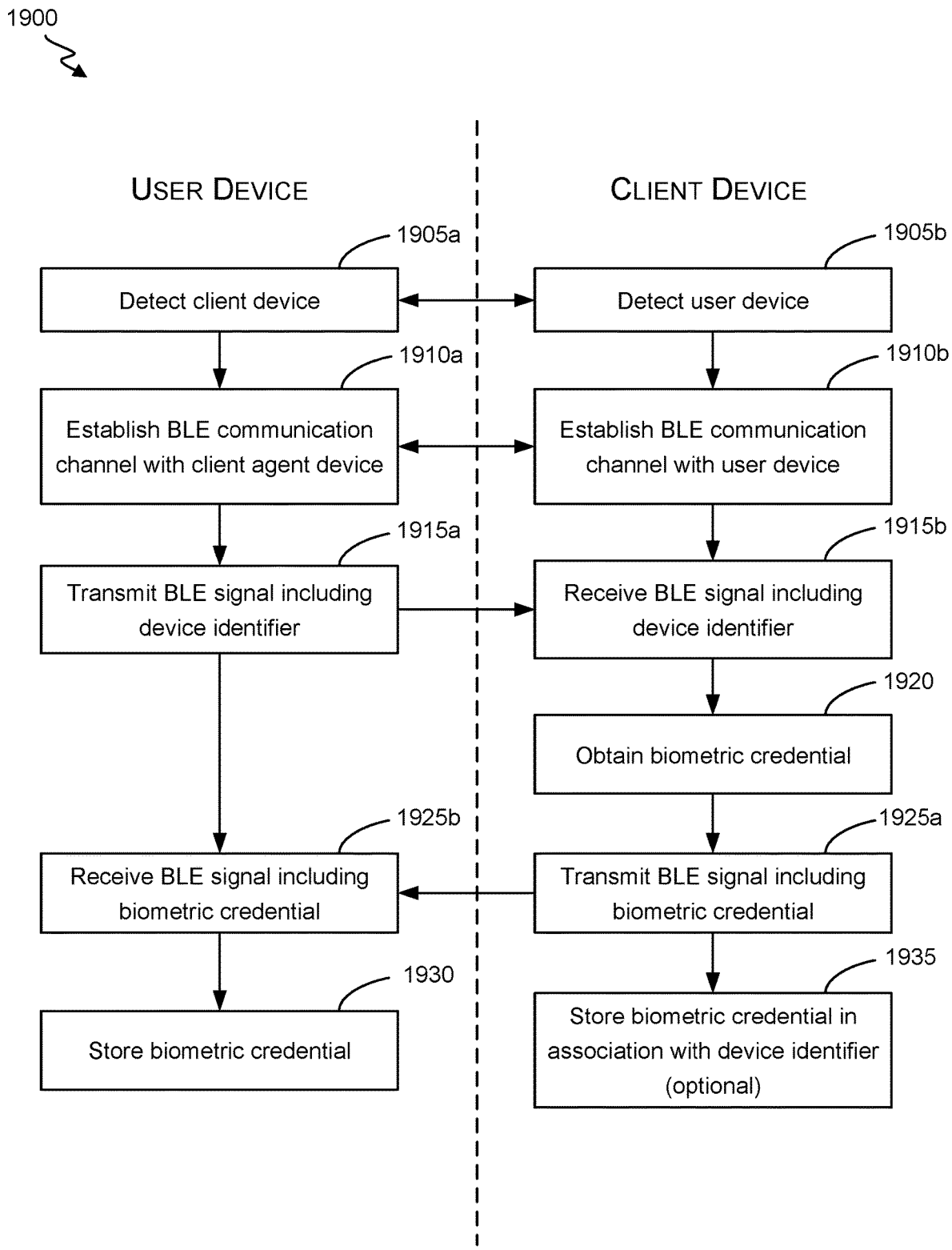
FIG. 19 illustrates a flowchart of an embodiment of a process for obtaining and storing biometric credentials using short-range communication exchanges.

FIG. 19 illustrates a flowchart of an embodiment of a process for obtaining and storing biometric credentials using short-range communication exchanges. Initially, at blocks 1905a and 1905b the user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 19.

At blocks 1910a and 1910b the user device and client device establish a BLE communication channel with one another. At block 1915a, the user device transmits a BLE signal including a device identifier, such as a device serial number, network address, unique identifier, etc. At block 1915b, the device identifier is received by the client device as part of the transmitted BLE signal. It will be appreciated that the device identifier may be an access-enabling code specifying access rights for a user associated with the user device. Although not illustrated, the client device may optionally facilitate verification of the access-enabling code to determine whether the user associated with the user device has a valid access right.

At block 1920 the client device obtains one or more biometric credentials from the user, such as using one or more biometric capture devices. The skilled artisan will appreciate that obtaining a biometric credential may occur before or after communications are exchanged between the user device and the client device. Further, a biometric credential can be obtained at another time, such as previous to assignment of the user device to the user, and may be stored by the client device and/or retrieved by the client device from a data store.

At block 1925a, the client device transmits a BLE signal to send the biometric credential over the BLE communication channel. At block 1925b, the BLE signal is received by the user device such that the user device possesses the biometric credential. At 1930, the biometric credential is stored by the user device, such as in a data store. It will be appreciated that various components of the user device and client device can implement and facilitate the various transmissions and storage of the biometric credential, such as a communication engine or various application modules.

It will be appreciated that, as with all depicted and described processes herein, process 1900 is illustrative and modifications including fewer, additional, combined, and/or changed actions are contemplated. For example, block 1935 may be omitted from process 1900, and the user device can be the sole location of the storage of the biometric credential. Alternatively or additionally, the client device can immediately present an identity challenge to the user to verify that the biometric credential stored on the user device matches the user and that the user can reliably pass the identity challenge against the biometric previously obtained. Such additional steps may minimize errors in biometric validation of the user at a later time and simplify and expedite access for the user when presented with an identity challenge. Alternatively or additionally, blocks 1915a and 1915b may be omitted or may be incorporated into blocks 1905a and 1905b, respectively, or block 1910a and 1910b, respectively.

Biometric information stored by the user device can be retrieved and used for identity challenges in variety of scenarios. In an exemplary embodiment, an identity challenge may be useful for confirming a user's identity when the user is attempting to access a restricted resource, such as a restricted facility, geographic area, etc. Such an identity challenge may be useful or necessary to ensure that a lost or stolen user device is not used by an unauthorized user for attempting to access the restricted resource.

Figure 20:
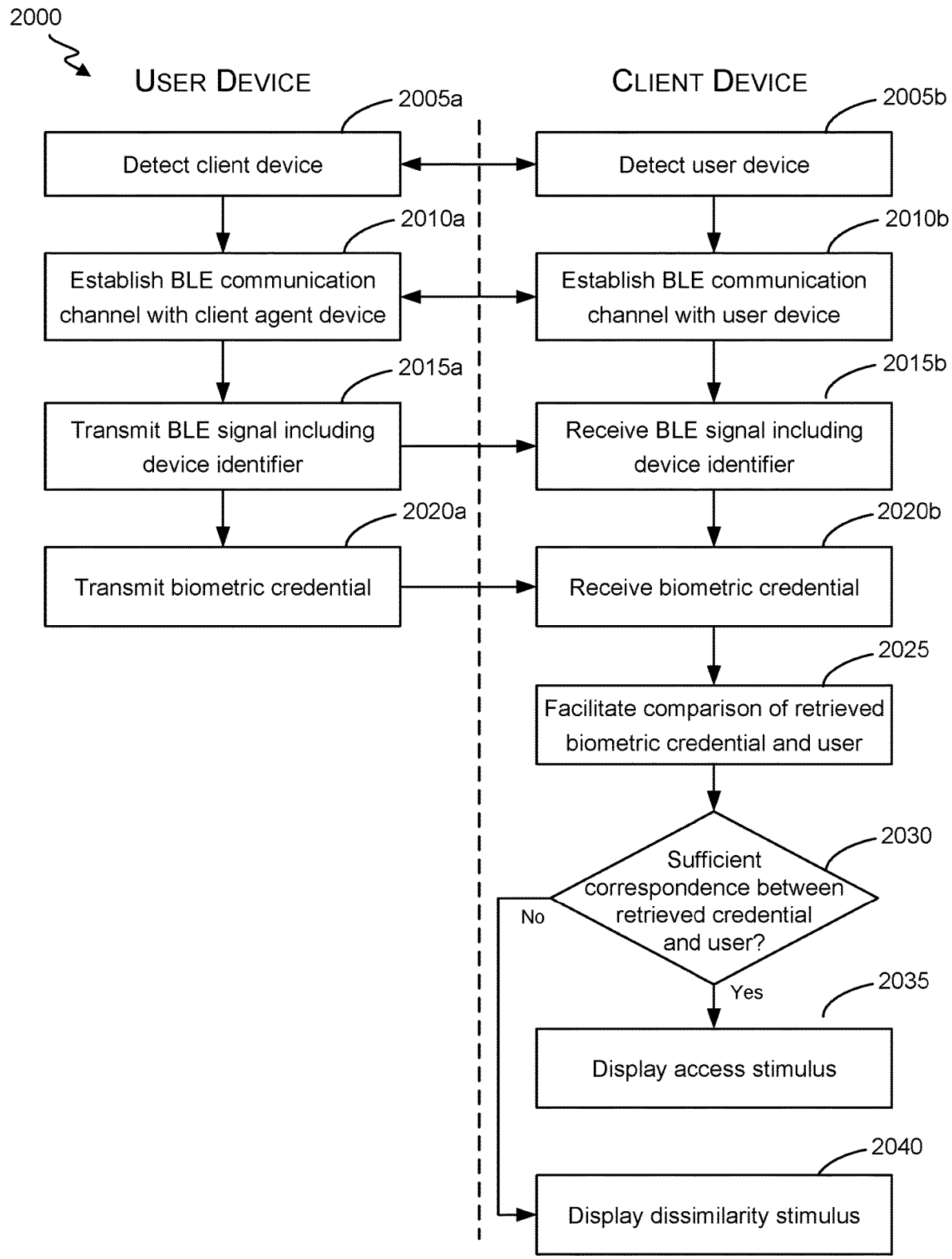
FIG. 20 illustrates a flowchart of an embodiment of a process for facilitating selective granting of resource access to authorized users based on verification of biometric credentials using short-range communication exchanges.

FIG. 20 illustrates a flowchart of an embodiment of a process for facilitating selective granting of resource access to authorized users based on verification of biometric credentials using short-range communication exchanges. Initially, at blocks 2005a and 2005b the user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 20.

At blocks 2010a and 2010b the user device and client device establish a BLE communication channel with one another. At block 2015a, the user device transmits a BLE signal including a device identifier, such as a device serial number, network address, unique identifier, etc. At block 2015b, the device identifier is received by the client device as part of the transmitted BLE signal. It will be appreciated that the device identifier may be an access-enabling code specifying access rights for a user associated with the user device. Although not illustrated, the client device may optionally facilitate verification of the access-enabling code to determine whether the user associated with the user device has a valid access right.

At block 2020a the client device transmits a BLE signal including the biometric credential, which may be retrieved from a data store on the user device. At block 2020b, the client device receives the BLE signal including the biometric credential. It will be appreciated that the biometric credential may represent a biometric credential obtained from the user and stored in the user device, such as using the techniques described with reference to FIGS. 18A, 18B and 19.

Upon receiving the biometric credential, the client device may present an identity challenge to the user associated with the user device before the user is granted access to a resource. For example, at block 2025, the client device facilitates comparison of the received biometric credential and the user. As will be appreciated in view of the disclosure herein, a variety of comparisons can be performed. For example, the client device may obtain a new biometric credential from the user and compare the new biometric credential with the received biometric credential. In specific embodiments, the biometric credential may include a fingerprint or a voice print and the client device may obtain a new fingerprint or voice print and make a comparison. As another example, the client device may display or otherwise present the biometric credential, such that a client agent may manually compare the displayed or presented biometric credential with the user. In a specific embodiment, the biometric credential may be a facial photograph and the client device may display the facial photograph such that a client agent can compare the user against the facial photograph.

At block 2030, it is determined whether there is a sufficient correspondence between the received biometric credential and the user. If it is determined that sufficient correspondence exists, the user's identity is verified. For example, block 2035 indicates that when there is sufficient correspondence an access stimulus may be displayed, indicated that the user should be granted access, as appropriate provided that a sufficient access right for the user exists.

If it is determined that the correspondence between the user and the received biometric credential is insufficient, the user is not verified. At block 2040, the client device may display a dissimilarity status, such as an alert that the identity challenge has not been passed. Optionally, the identity challenge may be repeated, allowing a user who is truly authorized additional attempts to verify their identity.

It will be appreciated that, as with all depicted and described processes herein, process 2000 is illustrative and modifications including fewer, additional, combined, and/or changed actions are contemplated. For example, an additional process associated with block 2035 (i.e., before, after or simultaneous with block 2035) of verifying that a valid access right for the user exists may be included in process 2000. Alternatively or additionally, blocks 2015a and 2015b may be omitted or may be incorporated into blocks 2005a and 2005b, respectively, or block 2010a and 2010b, respectively. As another example, any of blocks 2005a, 2010a, 2015a and 2020a may be combined and/or re-ordered and any of blocks 2005b, 2010b, 2015b and 2020b may be combined and/or re-ordered.

As another example of where an identity challenge using biometric information stored on a user device may be useful, a venue or location may feature vendors providing items for purchase by users having a valid access right and a user may wish to purchase items from such vendors. Embodiments are contemplated herein where the user device is associated with a user account that may include or otherwise make available credit, such as of a particular monetary value, which may be used for purchasing goods or services. However, in order to ensure that a lost or stolen electronic user device is not used by another, for example, an identity challenge may be presented when attempting to use the value associated with the user device to ensure the attempt is valid by verifying the user's identity.

Figure 21:
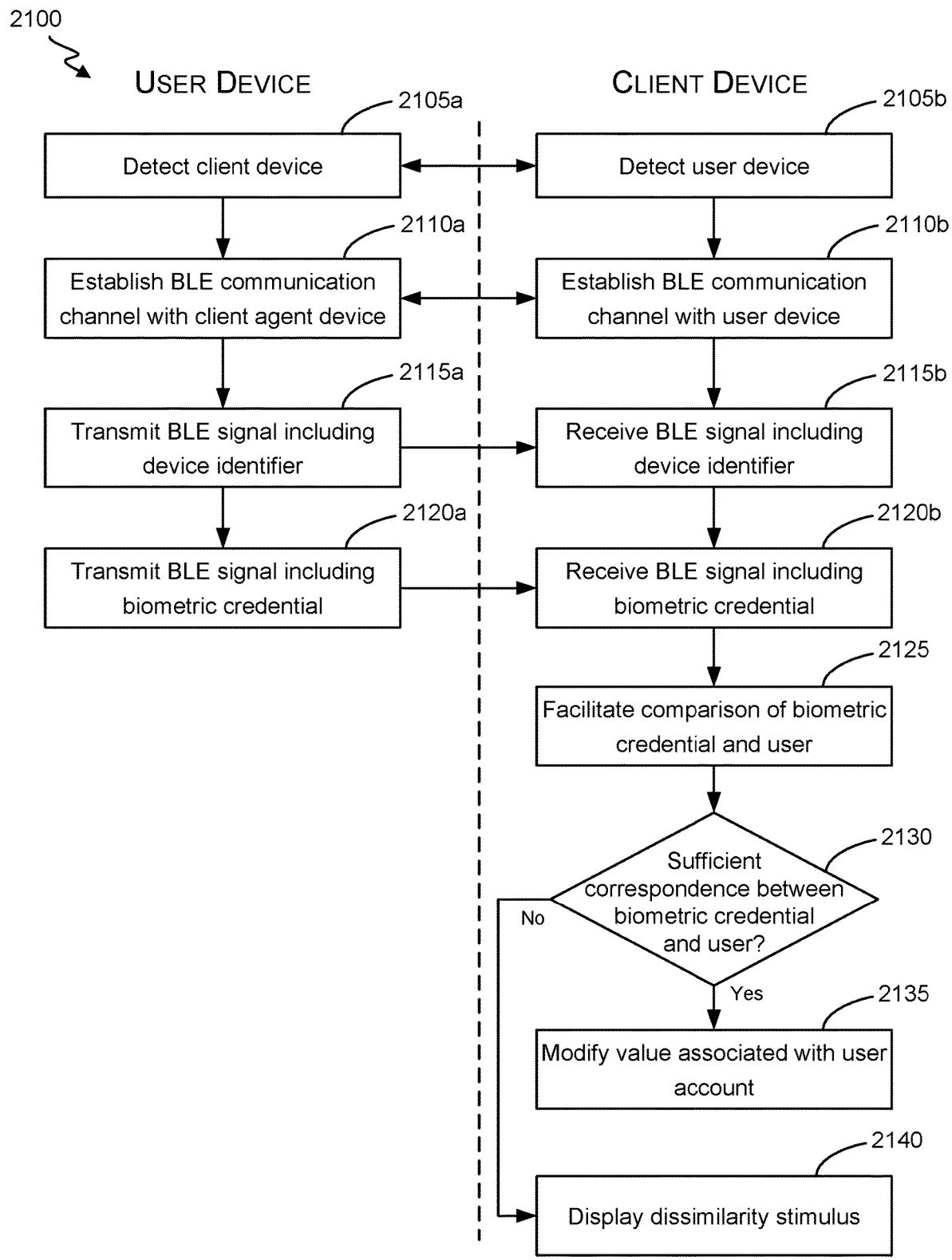
FIG. 21 illustrates a flowchart of an embodiment of a process for facilitating modification of user information based on verification of biometric credentials using short-range communication exchanges.

FIG. 21 illustrates a flowchart of an embodiment of a process for facilitating modification of user information based on verification of biometric credentials using short-range communication exchanges. Initially, at blocks 2105a and 2105b the user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 21.

At blocks 2110a and 2110b the user device and client device establish a BLE communication channel with one another. At block 2115a, the user device transmits a BLE signal including a device identifier, such as a device serial number, network address, unique identifier, etc. At block 2115b, the device identifier is received by the client device as part of the transmitted BLE signal. It will be appreciated that the device identifier may be an access-enabling code specifying access rights for a user associated with the user device. Although not illustrated, the client device may optionally facilitate verification of the access-enabling code to determine whether the user associated with the user device has a valid access right.

At block 2120a the client device transmits a BLE signal including the biometric credential, which may be retrieved from a data store on the user device. At block 2120b, the client device receives the BLE signal including the biometric credential. It will be appreciated that the biometric credential may represent a biometric credential obtained from the user and stored in the user device, such as using the techniques described with reference to FIGS. 18A, 18B and 19.

Upon receiving the biometric credential, the client device may present an identity challenge to the user associated with the user device. For example, at block 2125, the client device facilitates comparison of the received biometric credential and the user. As will be appreciated in view of the disclosure herein, a variety of comparisons can be performed. For example, the client device may obtain a new biometric credential from the user and compare the new biometric credential with the received biometric credential. In specific embodiments, the biometric credential may include a fingerprint or a voice print and the client device may obtain a new fingerprint or voice print and make a comparison. As another example, the client device may display or otherwise present the biometric credential, such that a client agent may manually compare the displayed or presented biometric credential with the user. In a specific embodiment, the biometric credential may be a facial photograph and the client device may display the facial photograph such that a client agent can compare the user against the facial photograph.

At block 2130, it is determined whether there is a sufficient correspondence between the received biometric credential and the user. If it is determined that sufficient correspondence exists, the user's identity is verified. For example, block 2135 indicates that when there is sufficient correspondence, a value associated with the user's account may be modified. As described above, this value may represent a dollar value that can be used for purchase of goods or services. Alternatively or additionally, the value may also represent other account information, which may be used in various ways for tracking the user device.

If it is determined that the correspondence between the user and the received biometric credential is insufficient, the user is not verified. At block 2140, the client device may display a dissimilarity status, such as an alert that the identity challenge has not been passed. Optionally, the identity challenge may be repeated, allowing a user who is truly authorized additional attempts to verify their identity.

It will be appreciated that, in various embodiments, a client agent may override the correspondence determination, depending on the situation. For example, in one embodiment, two users may inadvertently switch user devices, but be in each other's presence, such that no truly unauthorized attempt to use another's user device exists. It is possible that such a situation may inadvertently occur when the user device is to be fixed to the user (e.g., a wristband), but a mix-up of the user devices occurs prior to fixing the devices to the users. In some situations, the client device may facilitate re-association of the user devices to the correct users, though this may not be necessary, practicable, or desired in all situations.

It will be appreciated that, as with all depicted and described processes herein, process 2100 is illustrative and modifications including fewer, additional, combined, and/or changed actions are contemplated. For example, block 2140 may be omitted from process 2100. Optionally, an additional process associated with block 2135 (i.e., before, after or simultaneous with block 2135) of displaying a similarity status may be included in process 2100. Alternatively or additionally, blocks 2115a and 2115b may be omitted or may be incorporated into blocks 2105a and 2105b, respectively, or block 2110a and 2110b, respectively. As another example, any of blocks 2105a, 2110a, 2115a and 2120a may be combined and/or re-ordered and any of blocks 2105b, 2110b, 2115b and 2120b may be combined and/or re-ordered.

In some embodiments, access-enabling codes may be provided in two-part form or encrypted form. For example, a first part or encrypted version of an access-enabling code may be provided to a user or user device in advance of being needed to enter a restricted- or limited-access environment, such as upon user account creation, identification or changing of an access-right for the user. The second part of the access-enabling code or the decryption key may, for example, be provided to the user device prior to being needed to enter the restricted- or limited-access environment. Optionally, the second part or decryption key may be provided using a short-range wireless communication technique that limits the ability of the second part or decryption key from being received unless the user device is proximate to the client device transmitting the information over the short-range wireless communication connection.

Figure 22:
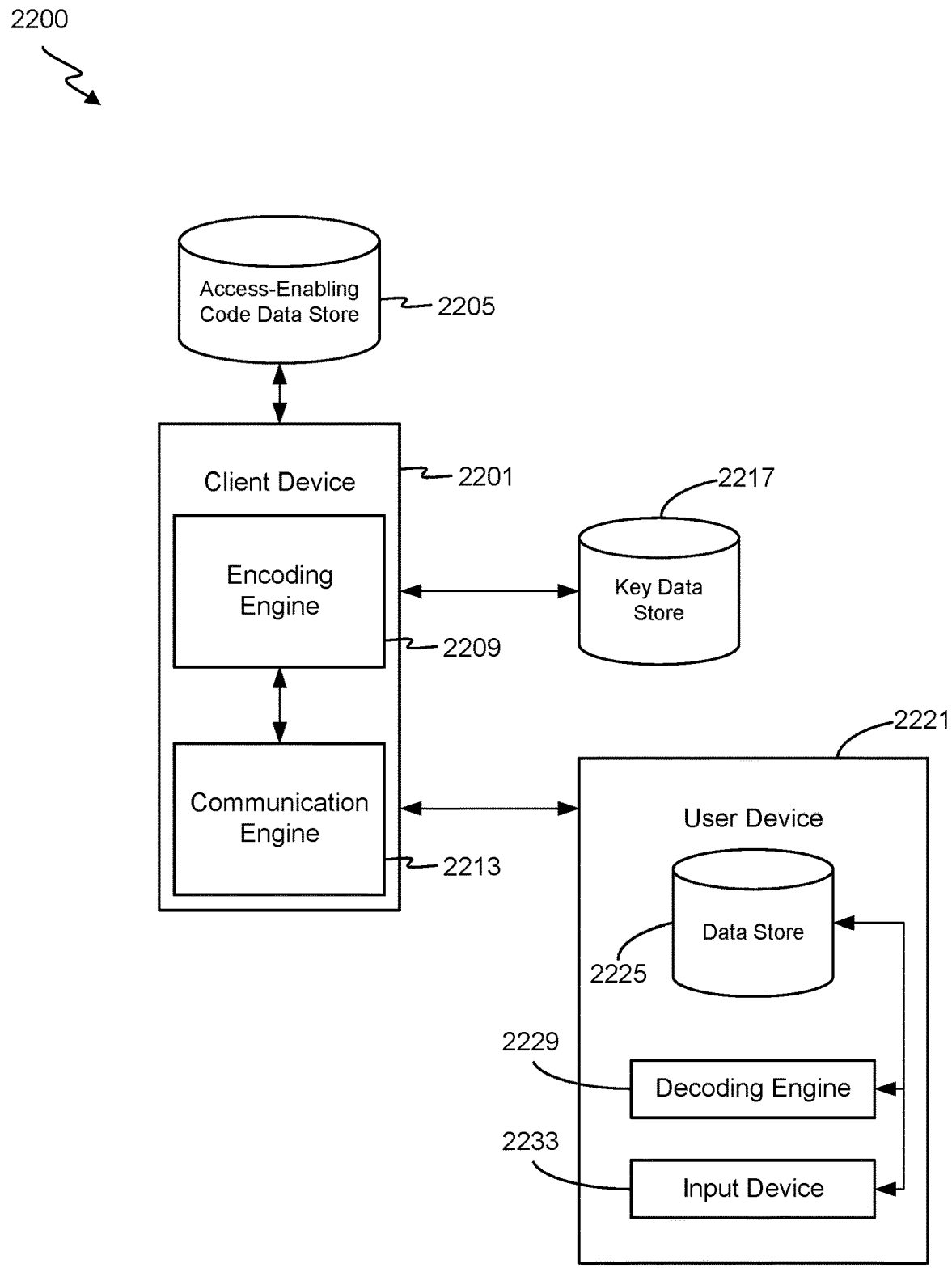
FIG. 22 illustrates example components of a resource access-facilitating interaction environment for encryption and decryption of credentials.

FIG. 22 illustrates example components of a resource access-facilitating interaction environment 2200 for encryption and decryption of credentials. In FIG. 22, a client device 2201 is in data communication with an access enabling code data store 2205. Optionally, client device 2201 includes the access-enabling code data store 2205. Client device 2201 may include, for example, an encoding engine 2209 and a communication engine 2213, in addition to other components. Encoding engine 2209 may be useful, for example, for encrypting access-enabling codes and biometric credentials, for example. Client device 2201 may further be in communication with or include key data store 2217. Keys from key data store 2217 may be retrieved and used by encoding engine for encrypting credentials, such as access-enabling codes from access-enabling code data store or biometric credentials, for example. Optionally, keys may be generated by client device and subsequently stored in key data store 2217.

Communication engine 2213 may allow client device 2201 to transmit and receive short-range wireless signals, for example, to/from user device 2221. User device 2221 may, in turn, include its own communication engine (not shown) to transmit and receive short-range wireless signals, for example, to/from client device 2201.

In FIG. 22, user device 2221 includes data store 2225 and decoding engine 2229. It will be appreciated that user device 2221 may include other components not illustrated here. Data store 2225 may be used by user device 2221 for storage of various information, such as device identifiers, access-enabling codes, decryption keys, encryption keys, biometric credentials, etc. Decoding engine 2229 may provide functionality to user device 2221 to decrypt encrypted data that is generated or received by user device 2221. For example, decoding engine 2229 may be useful for decrypting encrypted access enabling codes.

As illustrated, user device 2221 also includes input device 2233, which may represent any of various input elements, such as a touchscreen display, keyboard, camera, microphone, biometric capture device, wireless transceiver, etc. As one example, input device 2233 may include a camera, which may be useful for capturing images of data, such as an access-enabling code or decryption key displayed by client device 2201. As another example, input device 2233 may include a wireless transceiver, which may be useful for receiving wireless signals from user device 2221 that include an access-enabling code or a decryption key, for example.

It will be appreciated that client device 2201 and user device 2221 may each contain more or fewer components. For example, client device 2201 may further include a display or other output device. Similarly, user device 2221 may further include a display or other output device. In various embodiments, user device 2221 may be a smartphone device, wristband device or other personal or wearable device, such as a smart watch.

In some situations, it may be desirable to split an access-enabling code or a biometric credential into two parts—one part to be provided to a user device and a second part to be retained by a client device or system until just or shortly before access to a resource is needed by a user or user device. In this way, the complete access-enabling code or biometric credential can be protected until needed, preventing copying, fraud, modification, duplication, etc.

Various techniques are contemplated for splitting an access-enabling code or a biometric credential into two parts including extracting portions of a digital data file representing the access-enabling code or the biometric credential and storing the extracted or unextracted portions with the user, with the remaining or full information held by the client device or client system until access to the resource is needed. Various techniques for such data separation are possible. As one example, every other bit or byte may be extracted from a digital file. As another example, known sequences of bits or bytes of a data file may be extracted.

As another example technique, an access-enabling code or a biometric credential may be split into two parts using encryption, where the encrypted code or credential and the decryption key each represent parts of the access-enabling code or biometric credential. In some embodiments, the encrypted code or credential can be provided to the user device, with the decryption key provided when or shortly before access to a resource is needed by the user or user device. In other embodiments, the decryption key can be provided to the user device, with the encrypted code or credential held by the client device or system and provided when or shortly before access to a resource is needed by the user or user device. In still other embodiments, portions of each of the encrypted code or credential and the decryption key are provided to the user device with the remaining portions held by the client device or system and provided when or shortly before access to a resource is needed by the user or user device. Other implementations are possible.

Figure 23:
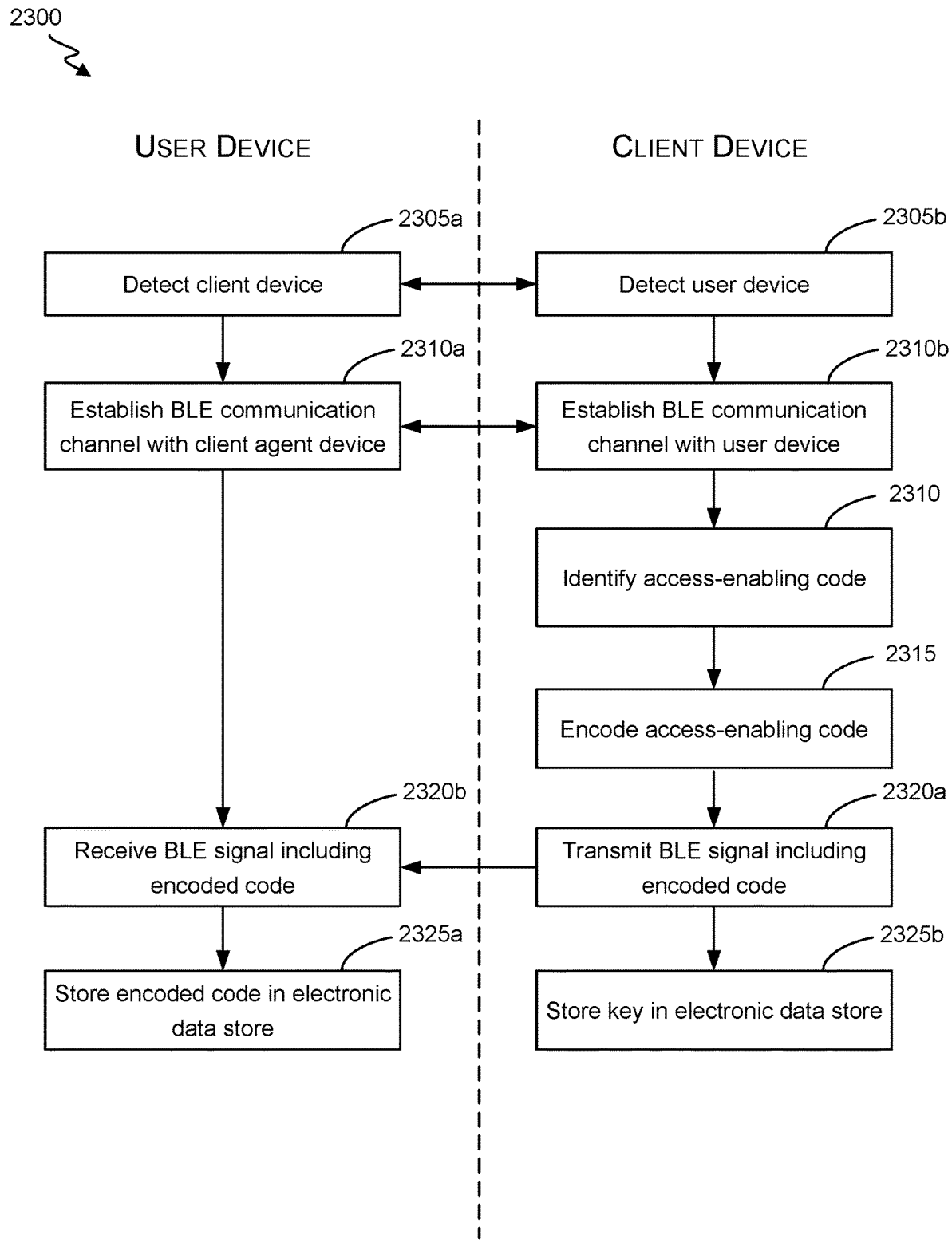
FIG. 23 illustrates a flowchart of an embodiment of a process for controlling availability of access control credentials using short-range communication exchanges.

FIG. 23 illustrates a flowchart of an embodiment of a process 2300 for controlling availability of access control credentials using short-range communication exchanges, such as by splitting an access control credential into two parts. Initially, at blocks 2305*a* and 2305*b* a user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 23.

At blocks 2310*a* and 2310*b* the user device and client device establish a BLE communication channel with one another. Optionally, the user device transmits a BLE signal including a device identifier, such as a device serial number, network address, unique identifier, user identifier, etc. An access-enabling code is identified at block 2310, and may use such identifying information for the generation. As an example, an access-right determination engine of the client device may generate or otherwise identify the access-enabling code, such as by identifying a specification of a limited-access resource and/or querying a data store, for example using a device identifier or the identified specification to obtain the access-enabling code.

At block 2315, the access-enabling code is encoded. Various encoding techniques are possible and will be appreciated by the skilled artisan. In one embodiment, the encoding technique is an encryption using an encryption key, for example. The encoded access-enabling code is then transmitted, at block 2320*a*, in a BLE signal to be received by the user device at block 2320*b*.

The encoded access-enabling code is stored by the user device at block 2325*a*, such as in an electronic data store in the user device. When the access-enabling code is needed by user device for resource access, the encoded code can be retrieved from the data store for further processing and decryption. At block 2325*b*, the decryption key is stored by the client device in an electronic data store until it is needed at a later time. The client device may store the key locally or in a global data store available to other client devices or client systems.

When access to the resource is needed, the user device may interact with the same or a different client device to obtain the residual portion of the access-enabling code or biometric credential needed to obtain access to the resource. Provided that the client device that the user device interacts with has access to the necessary information needed to complete the full access-enabling code or biometric credential, such as a decryption key, the client device may be able to provide this information to the user device.

As described above, in some embodiments, the client device may transmit, such as over a Bluetooth low energy or other short-range data communication channel, the necessary information to the user device to complete the access-enabling code or biometric credential. In other embodiments, the client device may display the necessary information such that it can be obtained using a camera of the user device. Optionally, combinations may be employed, such as where certain information is provided via display and certain information is provided via wireless data communication. In some situations, audio messages may include the necessary information or portions thereof.

In some situations, however, no interactions with a client device are necessary. For example, the necessary portions of the access-enabling code or biometric credential may be provided in written or audio form, and user input can provide the information to the user device.

It will be appreciated that, as with all depicted and described processes herein, process 2300 is illustrative and modifications including fewer, additional, combined, and/or changed actions are contemplated. For example, blocks 2305*a* and 2305*b* may be omitted from process 2300. Alternatively or additionally, blocks 2305*a* and 2310*a* may be combined and/or blocks 2305*b* and 2310*b* may be combined. Further, the procedure illustrated in FIG. 23 may be combined with any one or more the blocks illustrated in FIG. 24 to provide a complete encoding and decoding sequence.

Figure 24:
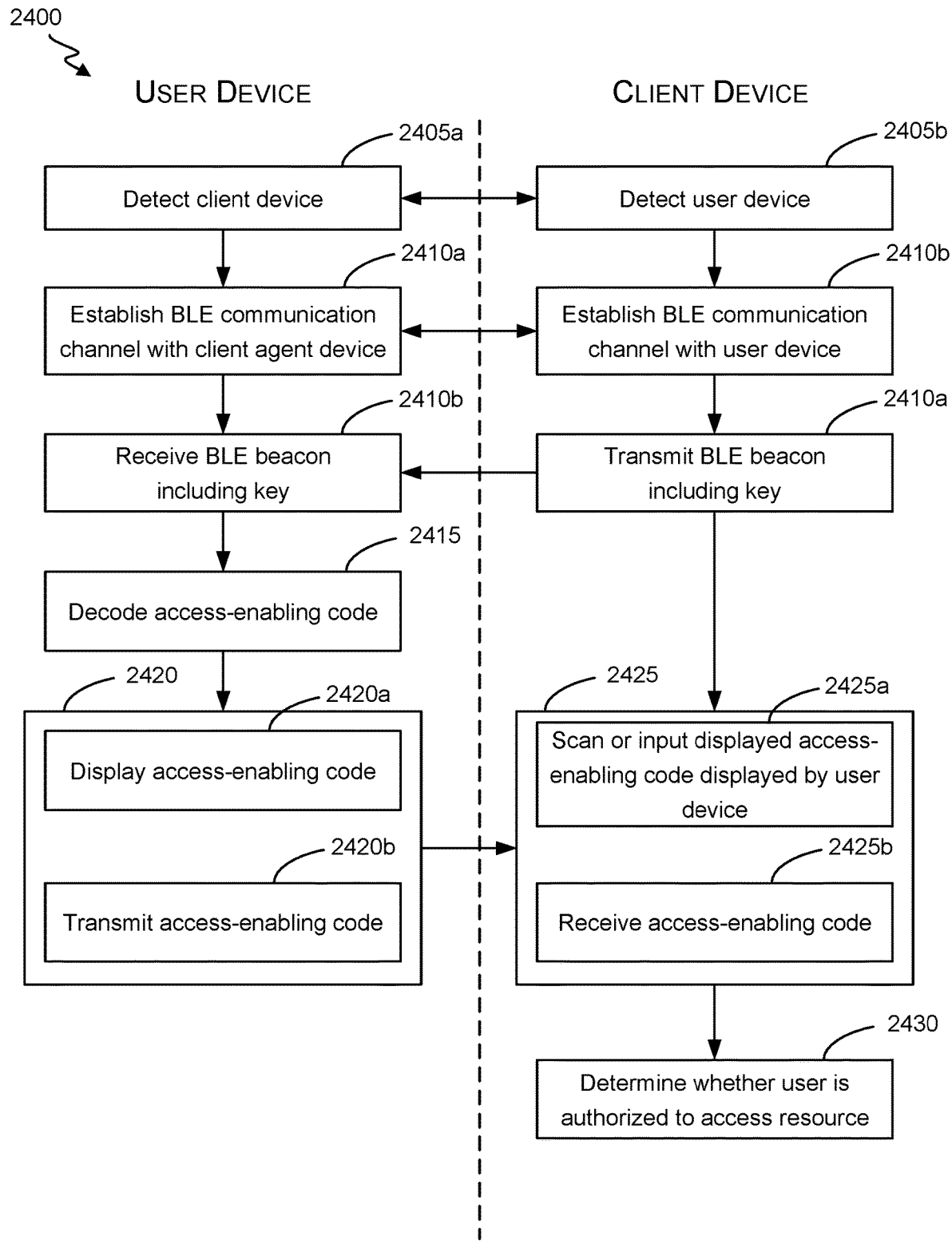
FIG. 24 illustrates a flowchart of an embodiment of a process for facilitating selective granting of resource access to authorized users using control over availability of access control credentials using short-range communication exchanges.

FIG. 24 illustrates a flowchart of an embodiment of a process 2400 for facilitating selective granting of resource access to authorized users using control over availability of access control credentials using short-range communication exchanges. FIG. 24 is described as an expansion on and/or continuation of FIG. 23, where the user device is stores, in possession of, or otherwise has access to an encoded access-enabling code. Initially, at blocks 2405*a* and 2405*b* a user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 24.

At blocks 2410*a* and 2410*b* the user device and client device establish a BLE communication channel with one another. Optionally, the user device transmits a BLE signal including a device identifier, such as a device serial number, network address, unique identifier, user identifier, etc., to aid in identification of the user device or the authorized user associated with the device.

Next the decode key or decryption key for the encoded access-enabling code is received by the user device. As described above, various implementations are contemplated for providing the decode key to the user device. As illustrated in FIG. 24, at block 2410*a*, the client device transmits a BLE beacon that includes the key. Transmission of BLE beacons by a client device may provide similar advantages as the previously described techniques making use of geofencing. One advantage of use of BLE beacons for such a process is that BLE signals may inherently have short range, due to physical characteristics of the signals, and so can provide a proximity limiting effect, restricting transmission of the key for the encoded access-enabling code only to those devices in detection proximity to the client device. If the client device is provided at the location where access to a resource is restricted, this may simplify the efforts to provide additional information needed to access the resource to the user device at the last necessary moment.

It will be appreciated that a BLE beacon refers to a BLE signal that is transmitted, such as on a periodic or repeated basis, by a BLE compliant device, which may provide information, such as proximity information or other data, and for which no response from another device may be requested, required, and/or possible. As illustrated in block 2410*a* of FIG. 24, the key for decoding the access enabling code is provided as part of the BLE beacon signal. At block 2410*b*, the BLE beacon is received by the client device, essentially providing the client device with the information necessary to complete, decrypt, or otherwise reveal the access-enabling code. At block 2415, the user device decodes the access-enabling code.

Block 2420 represents presentation of the access enabling code and block 2425 represents receipt of the presentation of the access enabling code to facilitate selective granting of access to a restricted resource. In blocks 2420 and 2425, two scenarios are illustrated, either and/or both of which may be employed by the user device and client device. Block 2420a represents display of the access-enabling code, such as on a display of the user device. Block 2420b represents presentation of the access-enabling code by wireless transmission, such as a BLE or other short-range data transmission.

Block 2420b represents the client device imaging or otherwise receiving input corresponding to the display of the access-enabling code by the user device. Block 2420b similarly represents receipt of the access-enabling code by wireless transmission, such as a BLE or other short-range data transmission. After the access-enabling code is presented by the user device at block 2420 and received by the client device at block 2425, the client device may determine or otherwise facilitate determination of whether the user is authorized to access the resource, at block 2430.

It will be appreciated that, as with all depicted and described processes herein, process 2400 is illustrative and modifications including fewer, additional, combined, and/or changed actions are contemplated. For example, blocks 2405a, 2415b, 2410a and 2410b may be omitted from process 2400. Optionally, an additional process associated with block 2430 of displaying a status indicative of authorization may be included in process 2400. Alternatively or additionally, blocks 2405a and 2405b may be incorporated into blocks 2410a and 2410b, respectively. As another example, aspects of other processes, such as those described with reference to FIGS. 11-13 may be incorporated into process 2400.

For some embodiments, user devices may include biometric capture devices and allow the user to obtain his or her own biometric credentials for transmission to and/or storage by a client device or system. In one embodiment, a user device embodied as a smartphone may include a user facing camera that is useful for obtaining a self-portrait image that can be used later for identity verification, for example.

Figure 25A:
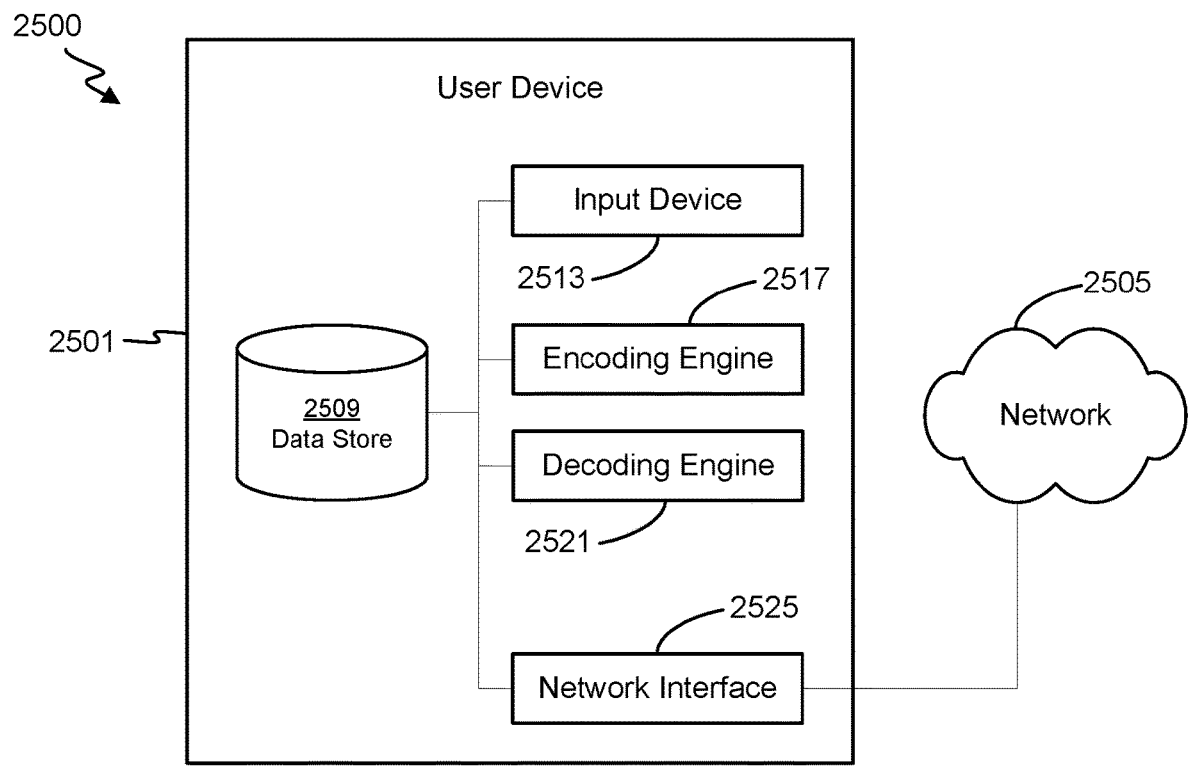
FIG. 25A illustrates a block diagram of an embodiment of an electronic user device.

FIG. 25A illustrates a block diagram of an embodiment of a user device environment 2500 including electronic user device 2501. It will be appreciated that electronic user device 2501 may include more or fewer components, including multiple of the depicted components, or may be in data communication with other devices, such as by way of network 2505, that may provide aspects of the electronic user device 2501. As illustrated, user device 2501 includes a data store 2509, which may be used for storage of encryption keys, decryption keys, biometric credentials, access-enabling codes, etc. User device 2501 further includes an input device 2513, such as a camera, touch-screen, keyboard, or biometric capture device. User device 2501 further includes an encoding engine 2517, a decoding engine 2521 and a network interface 2525, which may provide data connectivity to network 2505.

Figure 25B:
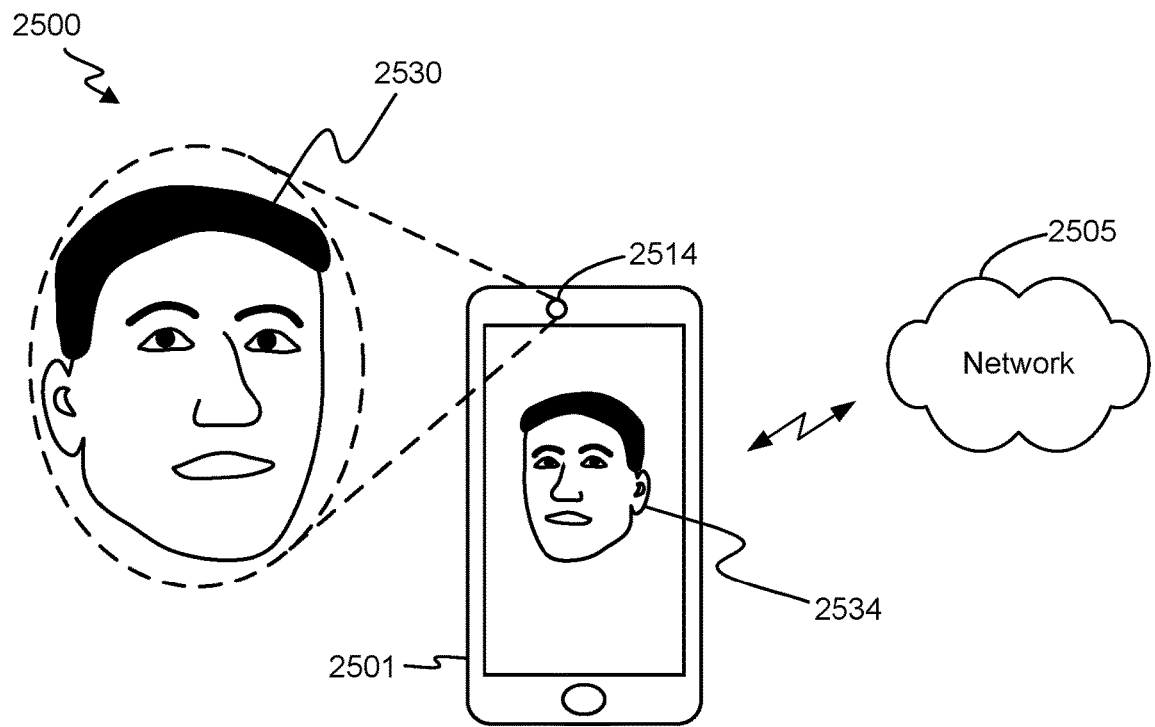
FIG. 25B provides a schematic illustration of an embodiment of an electronic user device and use for capturing a biometric credential.

FIG. 25B provides a schematic illustration of an embodiment of the user device environment 2500 including electronic user device 2501 when used for capturing a biometric credential of user 2530. As illustrated, user device 2501 is exemplified as a smartphone including camera 2514, which is used to obtain a self-portrait image 2534 of user 2530. User device 2501 may transmit the self-portrait image to another device, such as a client device by way of network 2505. Optionally, user device 2501 encrypts the self-portrait image 2534 using encoding engine 2517 before storing in data store 2509 or transmitting to another device by way of network 2505.

It will be appreciated that the schematic illustration shown in FIG. 25B is merely exemplary and other embodiments are possible, including use of and capture of other biometric information from the user 2530, such as a fingerprint, a voice print, etc.

Figure 26:
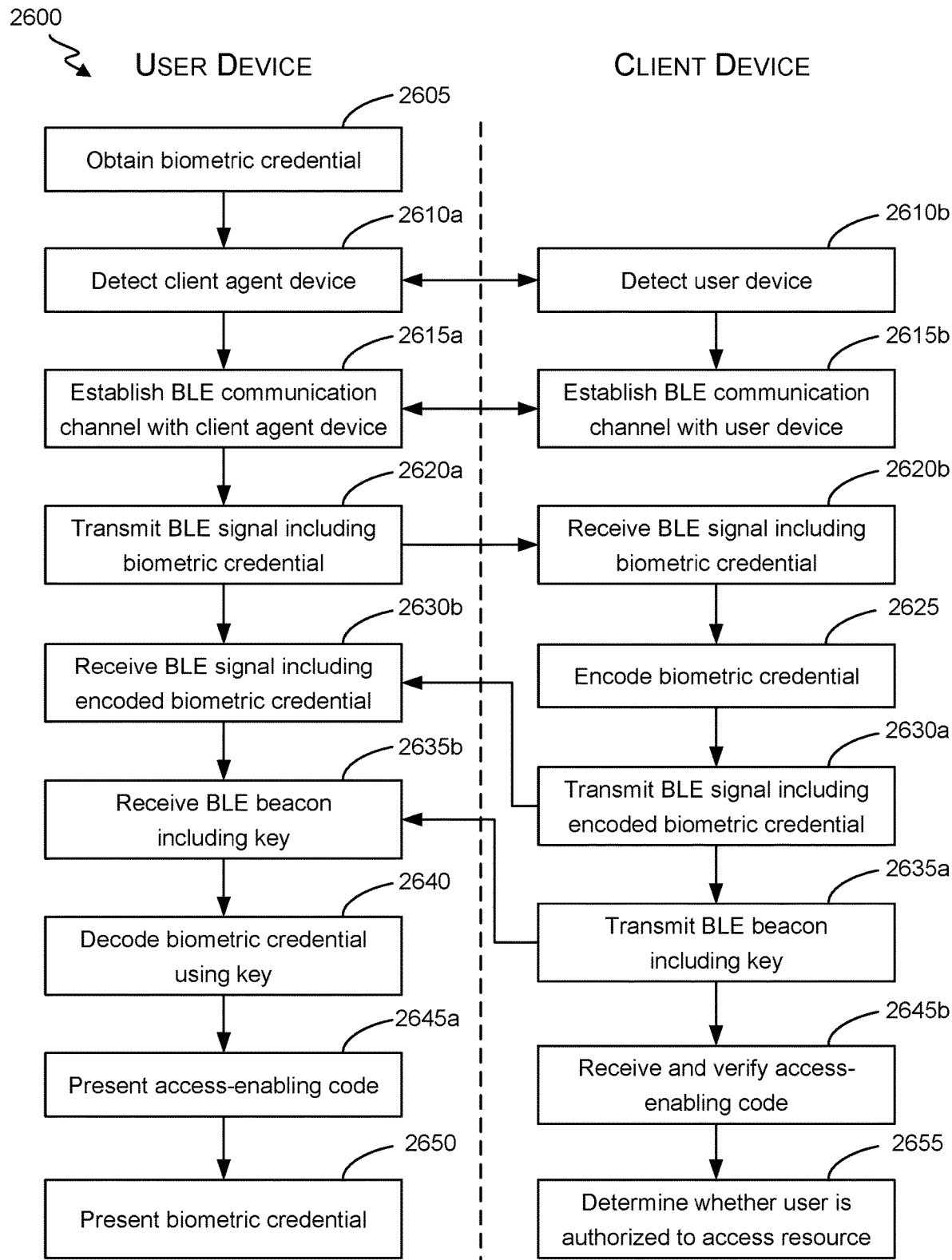
FIG. 26 illustrates a flowchart of an embodiment of a process for facilitating selective granting of resource access to authorized users using short-range communication exchanges and based on biometric credentials obtained by an electronic user device.

FIG. 26 illustrates a flowchart of an embodiment of a process 2600 for facilitating selective granting of resource access to authorized users using short-range communication exchanges and based on biometric credentials obtained by an electronic user device. Initially, at block 2605, the user device obtains a biometric credential, such as a self-portrait, a fingerprint, a voice print, etc. Advantageously, use of the user device for obtaining a biometric credential can provide flexibility to the user or allow the user, when located at a location remote from any client device, to provide biometric credentials for identity verification.

At blocks 2610a and 2610b the user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 26.

At blocks 2615a and 2615b the user device and client device establish a BLE communication channel with one another. At block 2620a, the user device transmits a BLE signal including the biometric credential. At block 2620b, the biometric credential is received by the client device as part of the transmitted BLE signal. Although not illustrated, the client device may optionally identify and provide an access-enabling code to the user device. Optionally, the user device may self-determine an access-enabling code, such as by using information received from the client device or provided to the client device, such as in one more application modules.

At 2625, the client device encodes the biometric credential, such as to create an encrypted parcel containing the biometric credential, for example using an encode engine included in the client device. At 2630a, the client device transmits a BLE signal including the encoded biometric credential, which is received, at block 2630b, by the user device. In order for the user device to make use of the encoded biometric credential, access to the decode/decryption key is necessary. Various techniques for providing the decode key are contemplated, as described previously.

In the example illustrated in FIG. 26, the client device transmits a BLE beacon that includes the decode key at block 2635a. At block 2635b, the user device receives the BLE beacon including the key. It will be appreciated that various techniques may be used for receipt of the BLE beacon by the user device, including activating the user device into BLE beacon detection mode, such as may be facilitated by one or more geofencing schemes. Additionally or alternatively, user device may begin monitoring for the BLE beacon including the key upon activation of an application on the user device. At 2640, the key is used by the user device, such as using one or more decode engines, to decode the biometric credential.

Although not illustrated, in the embodiment shown in FIG. 26, the user device possesses an access-enabling code, such as may have been received or generated in advance of obtaining the biometric credential. At block 2645a, the access enabling code is presented by the user device. Again, various techniques may be used to implement the presentation of the access-enabling code, including displaying the access-enabling code, or a representation thereof, on a user display, transmitting the access-enabling code, such as by way of a BLE or other short-range wireless communication, or generating an audio output providing the access enabling code or a representation thereof. At block 2645b, the access enabling code is received and verified by client device, such as to determine whether the access-enabling code represents a valid access right to a restricted resource.

As described above, the access-enabling code may be used to indicate whether the user has access rights to a restricted resource, while the biometric credential may be used to verify the identity of a user. At block 2650, the biometric credential is presented to the client device or a client agent to verify the identity of the user. Again, various techniques may be used to implement the presentation of the biometric credential. In the situation where the biometric credential is a self-portrait image, the presentation may be as simple as displaying the self-portrait image. A client agent may observe the self-portrait image and the user and make an on the spot determination that the user matches the image. At block 2655, the client device determines whether the user is authorized to access the resource. Such determination may be facilitated by a client agent providing input to the client device indicating whether the user does or does not match the self-portrait image.

It will be appreciated that elements of FIG. 26 may be performed at different times, such as days apart. For example, blocks 2605-2635b may be performed at a first time, such as when the client device may first facilitate registration for an access right, and blocks 2635a-2655 may be performed at a later time and/or in a separate location.

It will be further appreciated that, as with all depicted and described processes herein, process 2600 is illustrative and modifications including fewer, additional, combined, and/or changed actions are contemplated. For example, blocks 2615a and 2615b may be omitted or may be incorporated into blocks 2610a and 2610b. As another example, blocks 2645a and 2650 may be combined and/or re-ordered and blocks 2645b and 2655 may be combined and/or re-ordered.

Optionally, public-private key encryption may be employed as a further measure to secure access to the biometric credentials or access-enabling code, such that only the user or user device possessing the private key can decrypt the biometric credentials or access-enabling code.

Figure 27:
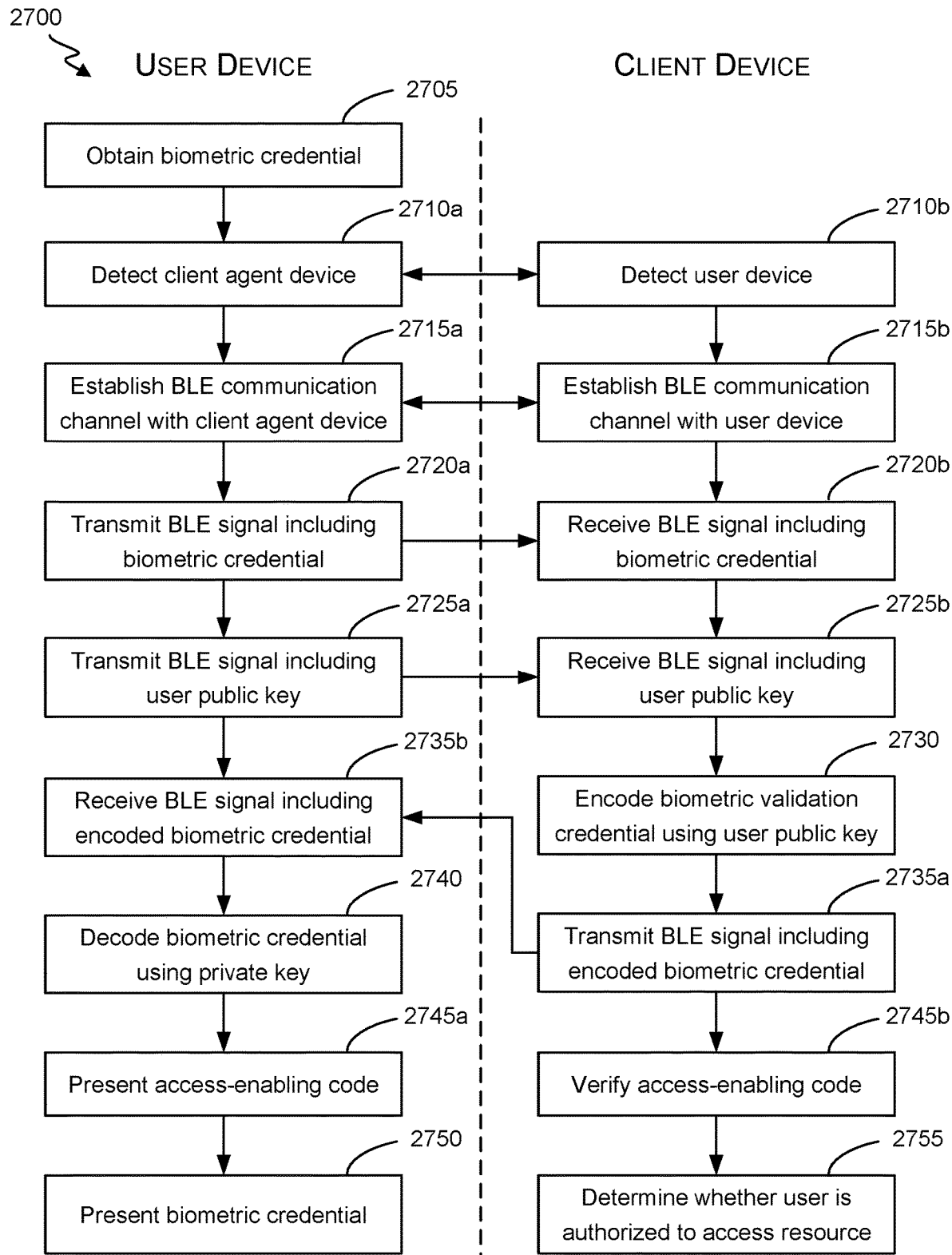
FIG. 27 illustrates a flowchart of an embodiment of a process for facilitating selective granting of resource access to authorized users using short-range communication exchanges and based on biometric credentials obtained by an electronic user device.

FIG. 27 illustrates a flowchart of an embodiment of a process 2700 for facilitating selective granting of resource access to authorized users using short-range communication exchanges and based on biometric credentials obtained by an electronic user device and secured using public-private key cryptography. Initially, at block 2705, the user device obtains a biometric credential, such as a self-portrait, a fingerprint, a voice print, etc. Advantageously, use of the user device for obtaining a biometric credential can provide flexibility to the user or allow the user, when located at a location remote from any client device, to provide biometric credentials for identity verification.

At blocks 2710a and 2710b the user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 27.

At blocks 2715a and 2715b the user device and client device establish a BLE communication channel with one another. At block 2720a, the user device transmits a BLE signal including the biometric credential. At block 2720b, the biometric credential is received by the client device as part of the transmitted BLE signal. Although not illustrated, the client device may optionally identify and provide an access-enabling code to the user device. Optionally, the user device may self-determine an access-enabling code, such as by using information received from the client device or provided to the client device, such as in one more application modules.

As will be understood by the skilled artisan, public-private key cryptography allows a user to share their public key with others in order to secure communications or data sent back to the user, which can only be decrypted using the corresponding private key. At block 2725a, the user device transmits a BLE signal including the public key. At block 2725b, the private key is received by the client device as part of the transmitted BLE signal. Although not illustrated, the client device may optionally request the public key in advance of the user device transmitting the public key, such as in one or more wireless data communications.

At 2730, the client device encodes the biometric credential using the public key, such as to create an encrypted parcel containing the biometric credential, for example using an encode engine included in the client device. At 2735a, the client device transmits a BLE signal including the encoded biometric credential, which is received, at block 2735b, by the user device. Since the user is in possession of the user's private key, the encoded biometric credential can be decrypted, at block 2740, without further information needed from the client device.

Although not illustrated, in the embodiment shown in FIG. 27, the user device may possess an access-enabling code, such as may have been received or generated in advance of obtaining the biometric credential. At block 2745a, the access enabling code is presented by the user device. Again, various techniques may be used to implement the presentation of the access-enabling code, including displaying the access-enabling code, or a representation thereof, on a user display, transmitting the access-enabling code, such as by way of a BLE or other short-range wireless communication, or generating an audio output providing the access enabling code or a representation thereof. At block 2745b, the access enabling code is received and verified by client device, such as to determine whether the access-enabling code represents a valid access right to a restricted resource.

As described above, the access-enabling code may be used to indicate whether the user has access rights to a restricted resource, while the biometric credential may be used to verify the identity of a user. At block 2750, the biometric credential is presented to the client device or a client agent to verify the identity of the user. Again, various techniques may be used to implement the presentation of the biometric credential. In the situation where the biometric credential is a self-portrait image, the presentation may be as simple as displaying the self-portrait image. A client agent may observe the self-portrait image and the user and make an on the spot determination that the user matches the image. At block 2755, the client device determines whether the user is authorized to access the resource. Such determination may be facilitated by a client agent providing input to the client device indicating whether the user does or does not match the self-portrait image.

It will be appreciated that elements of FIG. 27 may be performed at different times, such as days apart. For example, blocks 2705-2725b may be performed at a first time, such as when the client device may first facilitate registration for an access right, and blocks 2730-2755 may be performed at a later time and/or in a separate location.

It will be further appreciated that, as with all depicted and described processes herein, process 2700 is illustrative and modifications including fewer, additional, combined, and/or changed actions are contemplated. For example, blocks 2715*a* and 2715*b* may be omitted or may be incorporated into blocks 2710*a* and 2710*b*. As another example, blocks 2745*a* and 2750 may be combined and/or re-ordered and blocks 2745*b* and 2755 may be combined and/or re-ordered.

In various embodiments, it may be useful for a client device including one or more input devices to function as the device which verifies an access-enabling code. Such a configuration is useful as some user devices, such as smartphones, may include a variety of input devices that can be used to image or otherwise receive access enabling codes. This can simplify the hardware needed for client devices, such that they may not need to include a camera, barcode reader, or other imaging device.

In some aspects, use of the user device for verification of an access-enabling code may reverse aspects of the roles played by user and client devices in the embodiments and processes described above and may make user and client devices generally equivalent for some purposes.

Figure 28:
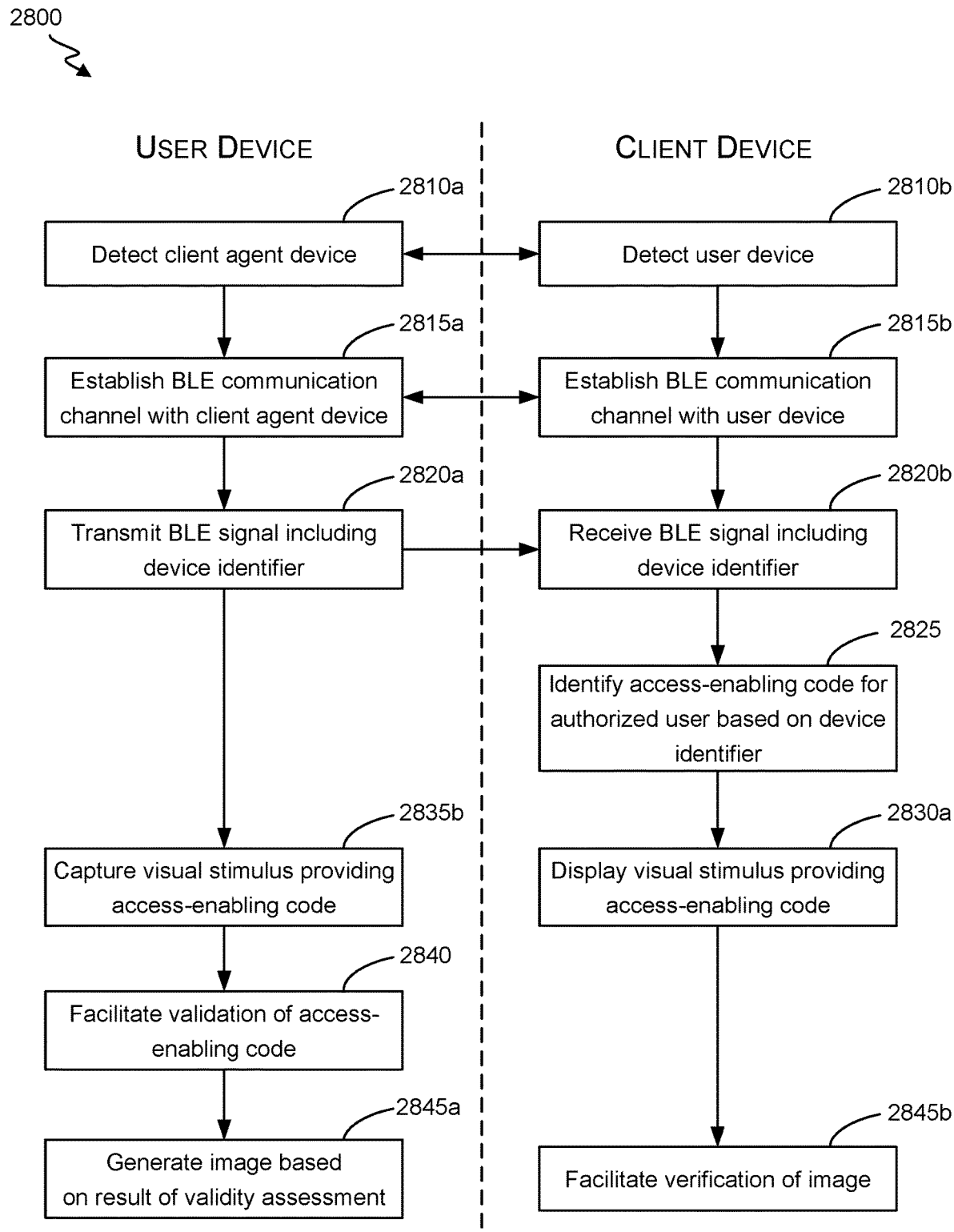
FIG. 28 illustrates a flowchart of an embodiment of a process for facilitating selective granting of resource access to authorized users using short-range communication exchanges.

FIG. 28 illustrates a flowchart of an embodiment of a process 2800 for facilitating selective granting of resource access to authorized users using short-range communication exchanges. Initially, at blocks 2805*a* and 2805*b* the user device and client device detect one another. Such detection may optionally include transmission and receipt of one or more wireless signals by one or more transceivers in the user device and the client device, such as one or more BLE signals transmitted and/or received by the user device and/or the client device. It will be appreciated that, in some embodiments, RFID or NFC signals can alternatively be used for the communication exchanges illustrated in FIG. 28.

At blocks 2810*a* and 2810*b* the user device and client device establish a BLE communication channel with one another. At block 2815*a*, the user device transmits a BLE signal including a device identifier, such as a device serial number, network address, unique identifier, etc. At block 2815*b*, the device identifier is received by the client device as part of the transmitted BLE signal.

At block 2820 the client device identifies an access-enabling code for the authorized users, such as by using the user device identifier to determine a specification of a limited-access resource and then using the specification to obtain the access-enabling code. One or more access-right determination engines in the client device may facilitate the identification of the access-enabling code. Again, as described above, the process of FIG. 28 may enable a client device of limited hardware resources to be useful for limiting access to a restricted resource. Additionally, the process of FIG. 28 may also enable a client with limited or no connectivity to other client devices or networks to be useful for limiting access to a restricted resource in a selective way. In one embodiment, the client device does not include hardware to connect to or is not connected to a network or any other client devices, but instead maintains a database or has a copy of a database including all valid access-enabling codes for access to a particular restricted resource. In some embodiments, however, the client device may have network connectivity with other client devices or systems but maintains a copy of the access-enabling codes for simplicity of access control.

At block 2825*a*, the access enabling code is displayed as a visual stimulus by the client device. As described above, various techniques are contemplated for displaying a visual stimulus providing the access-enabling code, including as one or more machine readable codes. At block 2825*b*, the visual stimulus displayed by the client device is captured by the user device, such as by using a camera included in the user device. As will be appreciated, some user devices may include cameras, such as smartphone devices, and may be useful for imaging the visual stimulus displayed by a client device, which may be activated using an application or software element provided on the user device.

At block 2830, the user device facilitates validation of the access-enabling code. The user device may facilitate validation of the access-enabling code using a number of techniques, such as by analyzing the code to determine whether the code satisfies one or more rules which govern the form and/or content of the code. Optionally, the user device may facilitate validation by transmitting a wireless signal to a remote client device, such as over one or more wireless or cellular networks, with information about the code or with the code itself and receive in response a validity assessment performed by the remote client device.

At block 2835*a*, the user device generates an image based on the result of the validity assessment and, at block 2835*b*, the client device facilitates verification of the image. For example, the user device may display a difficult to replicate image based on the validity assessment, such as an image that changes over time, which may be verified or compared against an image generated by the client device, for example. It will be appreciated that the techniques described above with respect to FIGS. 10-13 may be used for verification of the image generated by the user device.

Such a configuration further provides the additional advantages of limiting availability of the access-enabling code until it is needed for access to the restricted resource, which may prevent, limit or otherwise reduce copying, fraud, modification, duplication, etc.

As user devices are more commonly including biometric capture devices (cameras, fingerprint scanners, etc.), additional embodiments are contemplated where the client device alternatively or additionally provides a biometric credential to the user device at the time access to the restricted resource is needed by a user and the user device initiates an identity challenge. In this way, the client device can maintain known and/or validated biometric credentials and provide an identity challenge to the user by presenting the known and/or validated biometric credentials to the user when access to the restricted resource is needed, such as using a visual stimulus, similar to the embodiment described above with reference to block 2825*a*, or using transmission of the known and/or validated biometric credential via a short-range wireless communication, such as a BLE wireless signal. Alternatively, the client device can provide the biometric credentials obtained by the user device to the client device for verification against the known and/or validated biometric credentials.

It will be appreciated that, as with all depicted and described processes herein, process 2800 is illustrative and modifications including fewer, additional, combined, and/or changed actions are contemplated. For example, block 2815*a* and 2815*b* may be omitted from process 2800. Alternatively or additionally, blocks 2815*a* and 2815*b* may be omitted or may be incorporated into blocks 2810*a* and 2810*b*, respectively or blocks 2805*a* and 2805*b*, respectively. Optionally, the client device or the user device may update a database or facilitate updating of a database to indicate the access-enabling code as used.

Specific details are given in the above description to provide a thorough understanding of the embodiments. However, it is understood that the embodiments can be practiced without these specific details. For example, circuits may be shown or omitted in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An electronic client device for facilitating access to a limited-access resource through a short-range connection with an electronic user device, wherein the electronic client device is located at a location of a limited-access resource and configured to transmit a first wireless signal over the short-range connection, the electronic client device comprising:
   a transceiver for transmitting and receiving signals, over the short-range connection;
   a communication engine that is configured to detect a wireless signal from the electronic user device in response to the first wireless signal, wherein the first wireless signal having been received by a transceiver at the electronic user device, and wherein the first wireless signal being associated with a request for one or more users to receive authentication data, via the electronic user device, for accessing the limited-access resource;
   an access-right detection engine that is configured to:
      analyzes a second wireless signal generated by the electronic user device in response to receiving the first wireless signal, wherein the second wireless signal comprises an access-enabling code and request for the authentication data, the second wireless signal being received by the transceiver of the electronic client device is used to identify a specification of the limited-access resource based on an identifier associated with the electronic user device;
   an access-right evaluation engine that is configured to:
      validate authenticity of the request for authentication data and the access-enabling code, and
      transmit a third wireless signal by the transceiver, wherein the third wireless signal having been transmitted over the short-range connection by the electronic client device and having been received by the transceiver at the electronic user device for confirmation of the validation of authenticity of the access-enabling code, thereby enabling a generation of a presentation of a visual confirmation, at the electronic user device, used to grant access to the limited-access resource based on the visual confirmation.

2. The electronic client device as recited in claim 1, wherein the third wireless signal includes a determination that the access-enabling code is proper based on a result of comparison between credentials of the third wireless signal with pre-stored credentials associated with an authorized user, and wherein the second wireless signal is transmitted to the electronic client device over the short-range connection and the third wireless signal is received from the electronic client device over the short-range connection.

3. The electronic client device as recited in claim 1, wherein the specification of the limited-access resource includes a resource identifier of the limited-access resource, a client identifier of a client associated with the limited-access resource or a location associated with the limited-access resource.

4. The electronic client device as recited in claim 1, further comprising:
    transmitting a fourth wireless signal over a new short-range connection between the electronic client device and the electronic user device, the fourth wireless signal transmitted using the transceiver, wherein the fourth wireless signal includes a biometric credential request;
    detecting a fifth wireless signal transmitted over the new short-range connection by the electronic user device and received by the transceiver, wherein the fifth wireless signal includes a responsive biometric credential; and
    facilitating verification of the responsive biometric credential with a biometric credential.

5. The electronic client device as recited in claim 4, wherein the verification of the biometric credential is indicative of a validity or applicability of the access-enabling code for permitting access to a defined geographical region associated with the limited-access resource.

6. A computer-implemented method for facilitating access to a limited-access resource through a short-range connection between an electronic client device and an electronic user device, wherein the electronic client device is located at a location of a limited-access resource and configured to transmit a first wireless signal over the short-range connection, the computer-implemented method comprising:
    receiving signals, via a transceiver, wherein the transceiver being configured to receive signals transmitted over the short-range connection;
    detecting a wireless signal from the electronic user device in response to the first wireless signal, wherein the first wireless signal having been received by the transceiver at the electronic user device, and wherein the first wireless signal being associated with a request for one or more users to receive authentication data, via the electronic user device, for accessing the limited-access resource;
    analyzing a second wireless signal generated by the electronic user device in response to receiving the first wireless signal, wherein the second wireless signal comprises an access-enabling code and request for the authentication data, the second wireless signal being received by the transceiver of the electronic client device is used to identify a specification of the limited-access resource based on an identifier associated with the electronic user device;
    validating authenticity of the request for authentication data and the access-enabling code; and
    transmitting a third wireless signal by the transceiver, wherein the third wireless signal having been transmitted over the short-range connection by the electronic client device and having been received by the transceiver at the electronic user device for confirmation of the validation of authenticity of the access-enabling code, thereby enabling a generation of a presentation of a visual confirmation, at the electronic user device, used to grant access to the limited-access resource based on the visual confirmation.

7. The computer-implemented method of claim 6, wherein the second wireless signal is transmitted to the electronic client device over the short-range connection and the third wireless signal is received from the electronic client device over the short-range connection.

8. The computer-implemented method of claim 6, wherein the specification of the limited-access resource includes a resource identifier of the limited-access resource, a client identifier of a client associated with the limited-access resource or a location associated with the limited-access resource.

9. The computer-implemented method of claim 6, further comprising:
    transmitting a fourth wireless signal over a new short-range connection between the electronic client device and the electronic user device, the fourth wireless signal transmitted using the transceiver, wherein the fourth wireless signal includes a biometric credential request;
    detecting a fifth wireless signal transmitted over the new short-range connection by the electronic user device and received by the transceiver, wherein the fifth wireless signal includes a responsive biometric credential; and
    facilitating verification of the responsive biometric credential with a biometric credential.

10. The computer-implemented method of claim 9, wherein the verification of the biometric credential is indicative of a validity or applicability of the access-enabling code for permitting access to a defined geographical region associated with the limited-access resource.

11. A computer-program product tangibly embodied in a non-transitory machine-readable storage medium, including instructions configured to cause a processing apparatus to perform operations for facilitating access to a limited-access resource through a short-range connection between an electronic client device and an electronic user device, wherein the electronic client device is located at a location of a limited-access resource and configured to transmit a first wireless signal over the short-range connection, the operations including:
    a transceiver for receiving signals, the transceiver being configured to receive signals transmitted over the short-range connection;
    a communication engine that is configured to detect a wireless signal from the electronic user device in response to the first wireless signal, wherein the first wireless signal having been received by a transceiver at the electronic user device, and wherein the first wireless signal being associated with a request for one or more users to receive authentication data, via the electronic user device, for accessing the limited-access resource;
    an access-right detection engine that is configured to:
        analyzes a second wireless signal generated by the electronic user device in response to receiving the first wireless signal, wherein the second wireless signal comprises an access-enabling code and request for the authentication data, the second wireless signal being received by the transceiver of the electronic client device is used to identify a specification of the limited-access resource based on an identifier associated with the electronic user device, and an access-right evaluation engine that is configured to:

validate authenticity of the request for authentication data and the access-enabling code, and transmit a third wireless signal by the transceiver, wherein the third wireless signal having been transmitted over the short-range connection by the electronic client device and having been received by the transceiver at the electronic user device for confirmation of the validation of authenticity of the access-enabling code, thereby enabling a generation of a presentation of a visual confirmation, at the electronic user device, used to grant access to the limited-access resource based on the visual confirmation.

12. The computer-program product tangibly embodied in a non-transitory machine-readable storage medium of claim 11, wherein the second wireless signal is transmitted to the electronic client device over the short-range connection and the third wireless signal is received from the electronic client device over the short-range connection.

13. The computer-program product tangibly embodied in a non-transitory machine-readable storage medium of claim 11, wherein the specification of the limited-access resource includes a resource identifier of the limited-access resource, a client identifier of a client associated with the limited-access resource or a location associated with the limited-access resource.

14. The computer-program product tangibly embodied in a non-transitory machine-readable storage medium of claim 11, further comprising:

transmitting a fourth wireless signal over a new short-range connection between the electronic client device and the electronic user device, the fourth wireless signal transmitted using the transceiver, wherein the fourth wireless signal includes a biometric credential request;

detecting a fifth wireless signal transmitted over the new short-range connection by the electronic user device and received by the transceiver, wherein the fifth wireless signal includes a responsive biometric credential; and facilitating verification of the responsive biometric credential with a biometric credential.

15. The computer-program product tangibly embodied in a non-transitory machine-readable storage medium of claim 14, wherein the verification of the biometric credential is indicative of a validity or applicability of the access-enabling code for permitting access to a defined geographical region associated with the limited-access resource.

\* \* \* \* \*